(12) United States Patent
St. John et al.

(10) Patent No.: US 10,308,526 B2
(45) Date of Patent: *Jun. 4, 2019

(54) METHODS AND SYSTEMS FOR PRODUCING TREATED BRINES FOR DESALINATION

(71) Applicant: Gradiant Corporation, Woburn, MA (US)

(72) Inventors: Maximus G. St. John, Boston, MA (US); Steven Lam, Medford, MA (US); Prakash Narayan Govindan, Melrose, MA (US)

(73) Assignee: Gradiant Corporation, Woburn, MA (US)

( * ) Notice: Subject to any disclaimer, the term of this patent is extended or adjusted under 35 U.S.C. 154(b) by 463 days.

This patent is subject to a terminal disclaimer.

(21) Appl. No.: 14/719,299

(22) Filed: May 21, 2015

(65) Prior Publication Data

US 2016/0229705 A1    Aug. 11, 2016

Related U.S. Application Data

(60) Provisional application No. 62/115,120, filed on Feb. 11, 2015.

(51) Int. Cl.
*C02F 1/04* (2006.01)
*C02F 9/00* (2006.01)
(Continued)

(52) U.S. Cl.
CPC ............ *C02F 1/04* (2013.01); *C02F 9/00* (2013.01); *C02F 1/004* (2013.01); *C02F 1/20* (2013.01);
(Continued)

(58) Field of Classification Search
CPC ... B01D 21/02; C02F 9/00; C02F 1/04; C02F 2101/32; C02F 2101/10; C02F 1/42;
(Continued)

(56) References Cited

U.S. PATENT DOCUMENTS 2,151,990 A    3/1939    Ruys
2,606,820 A    8/1952    Viggo
(Continued)

FOREIGN PATENT DOCUMENTS

CA    2 779 732    12/2012
CA    2 818 055    11/2013
(Continued)

OTHER PUBLICATIONS

Office Action dated Oct. 4, 2016 for U.S. Appl. No. 14/719,295 and claims as pending.
(Continued)

*Primary Examiner* — Pamela H Weiss
(74) *Attorney, Agent, or Firm* — Wolf, Greenfield & Sacks, P.C.

(57) ABSTRACT

Water treatment systems and associated methods are generally described. Certain embodiments of the water treatment systems and methods described herein may be used to treat water comprising one or more contaminants (e.g., oil, grease, suspended solids, scale-forming ions, volatile organic material) to remove at least a portion of the one or more contaminants. In some embodiments, at least a portion of the treated water may be used directly in certain applications (e.g., oil and/or gas extraction processes). In some embodiments, at least a portion of the treated water may undergo desalination to produce substantially pure water and/or concentrated brine.

19 Claims, 12 Drawing Sheets

(51) Int. Cl.

| | | |
|---|---|---|
| *C02F 1/42* | (2006.01) | |
| *C02F 1/56* | (2006.01) | |
| *C02F 1/52* | (2006.01) | |
| *C02F 1/463* | (2006.01) | |
| *C02F 11/122* | (2019.01) | |
| *C02F 1/20* | (2006.01) | |
| C02F 1/24 | (2006.01) | |
| C02F 1/66 | (2006.01) | |
| C02F 1/40 | (2006.01) | |
| C02F 101/10 | (2006.01) | |
| C02F 101/32 | (2006.01) | |
| C02F 103/10 | (2006.01) | |
| C02F 1/00 | (2006.01) | |
| C02F 1/28 | (2006.01) | |

(52) U.S. Cl.
CPC ............... C02F 1/24 (2013.01); C02F 1/283 (2013.01); C02F 1/40 (2013.01); C02F 1/42 (2013.01); C02F 1/463 (2013.01); C02F 1/5236 (2013.01); C02F 1/56 (2013.01); C02F 1/66 (2013.01); C02F 11/122 (2013.01); C02F 2101/10 (2013.01); C02F 2101/32 (2013.01); C02F 2103/10 (2013.01); C02F 2303/22 (2013.01)

(58) Field of Classification Search
CPC .......... C02F 1/20; C02F 1/5236; C02F 1/283; C02F 11/122; C02F 1/004; C02F 1/56; C02F 1/463; C02F 2303/22; C02F 2103/10; C02F 1/24; C02F 1/66; C02F 1/40; B03D 1/1431
See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,489,652 A | 1/1970 | Williamson |
| 3,625,761 A | 12/1971 | Tate |
| 3,725,209 A | 4/1973 | Rosa |
| 3,922,154 A | 11/1975 | Kawasaki et al. |
| 3,926,739 A | 12/1975 | Izumi |
| 4,224,148 A | 9/1980 | Lindman et al. |
| 4,251,367 A | 2/1981 | Santora |
| 4,334,886 A | 6/1982 | Tani et al. |
| 4,452,696 A | 6/1984 | Lopez |
| 4,511,436 A | 4/1985 | El Din et al. |
| 4,563,337 A | 1/1986 | Kim |
| 4,576,724 A | 3/1986 | Colman et al. |
| 4,708,805 A | 11/1987 | D'Muhala |
| 4,735,722 A | 4/1988 | Krepak |
| 4,755,298 A | 7/1988 | Grinstead |
| 4,770,775 A | 9/1988 | Lopez |
| 4,806,244 A | 2/1989 | Guilhem |
| 4,843,828 A | 7/1989 | Gladman |
| 4,944,882 A | 7/1990 | Ray et al. |
| 4,956,157 A | 9/1990 | Nasu |
| 4,973,201 A | 11/1990 | Paul et al. |
| 4,980,077 A | 12/1990 | Morris et al. |
| 4,981,593 A | 1/1991 | Priestley et al. |
| 5,015,391 A | 5/1991 | Mohn |
| 5,053,132 A | 10/1991 | Sirkar |
| 5,167,828 A | 12/1992 | Emmons et al. |
| 5,190,656 A | 3/1993 | Paul et al. |
| 5,225,087 A | 7/1993 | Kardos |
| 5,238,574 A | 8/1993 | Kawahima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,656,161 A | 8/1997 | Solomon et al. |
| 5,840,195 A | 11/1998 | Delsalle et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,270,671 B1 | 8/2001 | Shorr et al. |
| 6,319,409 B1 | 11/2001 | Saitou et al. |
| 6,416,668 B1 | 7/2002 | Al-Samadi et al. |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,678,080 B2 | 3/2014 | Curole et al. |
| 8,679,347 B2 | 3/2014 | Al-Samadi |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |

(56) References Cited

U.S. PATENT DOCUMENTS

| | | |
|---|---|---|
| 9,085,971 B2 | 7/2015 | Janssen et al. |
| 9,120,033 B2 | 9/2015 | Govindan et al. |
| 9,221,694 B1 | 12/2015 | Govindan et al. |
| 9,266,748 B1* | 2/2016 | Govindan ............... C02F 1/08 |
| 9,266,762 B2* | 2/2016 | Wang ................... B01D 61/022 |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 9,957,180 B2 | 5/2018 | Govindan et al. |
| 9,969,638 B2 | 5/2018 | Govindan et al. |
| 2003/0106860 A1 | 6/2003 | Peloquin et al. |
| 2003/0132166 A1 | 7/2003 | Rey |
| 2004/0187897 A1 | 9/2004 | Kenowski et al. |
| 2005/0023222 A1 | 2/2005 | Baillie |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1* | 4/2007 | Vuong ................. B01D 61/022 210/650 |
| 2007/0084713 A1 | 4/2007 | Deep et al. |
| 2007/0102359 A1 | 5/2007 | Lombardi et al. |
| 2007/0131428 A1 | 6/2007 | den Boestert et al. |
| 2007/0181480 A1 | 8/2007 | Lee |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1 | 5/2008 | Mavis |
| 2008/0277344 A1 | 11/2008 | Sengupta et al. |
| 2009/0020289 A1 | 1/2009 | Univ Surrey |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0163471 A1 | 7/2010 | Elyanow et al. |
| 2010/0163472 A1 | 7/2010 | Thiers et al. |
| 2010/0234795 A1 | 9/2010 | Wallenás |
| 2010/0242995 A1 | 9/2010 | Xiong et al. |
| 2010/0282675 A1 | 11/2010 | Sengupta et al. |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056878 A1 | 3/2011 | Matsushiro et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1* | 8/2011 | Wallace ................. C01B 7/03 210/638 |
| 2011/0215039 A1 | 9/2011 | Acernese et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067820 A1 | 3/2012 | Henthorne et al. |
| 2012/0090833 A1 | 4/2012 | Ligtelm et al. |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0199524 A1 | 8/2012 | Bly et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0279396 A1 | 11/2012 | Brammer et al. |
| 2012/0292259 A1 | 11/2012 | Marcin |
| 2012/0312755 A1 | 12/2012 | Ryan et al. |
| 2013/0008079 A1 | 1/2013 | Chung et al. |
| 2013/0043190 A1 | 2/2013 | Al-Samadi et al. |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092626 A1* | 4/2013 | Zimmerman ........ C02F 3/2866 210/601 |
| 2013/0105323 A1 | 5/2013 | Averbeck et al. |
| 2013/0118887 A1 | 5/2013 | Frolov et al. |
| 2013/0193074 A1 | 8/2013 | Voigt et al. |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0318743 A1 | 12/2013 | Chinta et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0067958 A1 | 3/2014 | Bradley et al. |
| 2014/0069821 A1 | 3/2014 | Marcin et al. |
| 2014/0116956 A1 | 5/2014 | Yuan et al. |
| 2014/0151300 A1 | 6/2014 | Savage et al. |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |
| 2015/0129410 A1 | 5/2015 | Govindan et al. |
| 2015/0353397 A1 | 12/2015 | Cath et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2018/0008919 A1 | 1/2018 | Tierney, III et al. |
| 2018/0236372 A1 | 8/2018 | Govindan et al. |
| 2018/0236406 A1 | 8/2018 | St. John et al. |
| 2018/0244545 A1 | 8/2018 | St. John et al. |

FOREIGN PATENT DOCUMENTS

| | | |
|---|---|---|
| CA | 2 821 453 | 1/2014 |
| CA | 2 816 746 | 4/2014 |
| CA | 2 821 458 | 7/2014 |
| CN | 1623936 | 6/2005 |
| CN | 1856447 A | 11/2006 |
| CN | 100999364 A | 7/2007 |

(56) References Cited

FOREIGN PATENT DOCUMENTS

| | | |
|---|---|---|
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 102438957 A | 5/2012 |
| CN | 102725236 A | 10/2012 |
| CN | 102933507 A | 2/2013 |
| DE | 2145861 A1 | 11/1972 |
| EP | 0 207 390 | 1/1987 |
| EP | 0 253 287 A1 | 1/1988 |
| EP | 0 623 561 | 11/1994 |
| EP | 1775267 A2 | 4/2007 |
| FR | 1582201 A | 9/1969 |
| FR | 2561637 A1 | 9/1985 |
| GB | 821939 | 10/1959 |
| GB | 1013767 | 12/1965 |
| GB | 1036920 | 7/1966 |
| GB | 1444241 | 7/1976 |
| GB | 2395946 A | 6/2004 |
| JP | 55-147199 | 11/1980 |
| JP | H05-208199 A | 8/1993 |
| KR | 101229482 B1 | 2/2013 |
| WO | WO 1995/027683 | 10/1995 |
| WO | WO 2000/000273 A1 | 1/2000 |
| WO | WO 01/14256 A1 | 3/2001 |
| WO | WO 02/32813 A1 | 4/2002 |
| WO | WO 2005/012185 | 2/2005 |
| WO | WO 2007/128062 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/159203 | 11/2012 |
| WO | WO 2013/012548 A1 | 1/2013 |
| WO | WO 2013/037047 | 3/2013 |
| WO | WO 2013037047 A1 * | 3/2013 ............. B01D 65/02 |
| WO | WO 2013/078124 A1 | 5/2013 |
| WO | WO 2013/158315 A1 | 10/2013 |
| WO | WO 2013/159220 | 10/2013 |
| WO | WO 2014/058696 | 4/2014 |
| WO | WO 2014/088826 A1 | 6/2014 |
| WO | WO 2014/121153 | 8/2014 |
| WO | WO 2014/144778 A1 | 9/2014 |
| WO | WO 2014/150848 A1 | 9/2014 |
| WO | WO 2014/162094 | 10/2014 |
| WO | WO 2014/188450 A1 | 11/2014 |
| WO | WO 2014/200829 | 12/2014 |
| WO | WO 2015/021062 | 2/2015 |
| WO | WO 2015/038983 A2 | 3/2015 |
| WO | WO 2015/042584 A1 | 3/2015 |
| WO | WO 2015/061194 A1 | 4/2015 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |

OTHER PUBLICATIONS

Office Action dated Jul. 6, 2017 for U.S. Appl. No. 14/719,295 and claims as pending.

[No Author Listed], Accepta 4360 Material Safety Data Sheet. Accepta Ltd. Manchester, UK. Jul. 19, 2011. 5 pages.

[No Author Listed], Caustic Soda 50% Material Safety Data Sheet. Univar. Redmond, Washington. Apr. 8, 2013. 10 pages.

[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>.

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], Hi-Cal Hydrate Material Safety Data Sheet. Chemical Lime Co. Fort Worth, Texas. May 1, 2008. 6 pages.

[No Author Listed], Polyaluminum Chloride Solution Material Safety Data Sheet. GEO Specialty Chemicals, Ltd. Little Rock, Arkansas. Mar. 12, 2015. 11 pages.

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>.

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.

Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Govindan, Thermal Design of Humidification Dehumidificaiton Systems for Affordable and Small-scale Desalination. Doctoral Thesis. Massachusetts Institute of Technology. Sep. 2012. 286 pages.

Huang et al., The bridging force between colloidal particles in a polyelectrolyte solution. Langmuir. Nov. 27, 2012;28(47):16300-5. doi: 10.1021/la303918p.

Khayet et al., Determination of surface and bulk pore sizes of flat-sheet and hollow-fiber membranes by atomic force microscopy, gas permeation and solute transport methods. Desalination. 2003;158:57-64.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

McGinnis et al., Pilot demonstration of the NH3/CO2 forward osmosis desalination process on high salinity brines. Desalination. Mar. 2013;312:67-74. Supporting information included.

Sahin, A Mathematical Model for Explanation of Ion Exchange of the Boric Acid Adsorption. Jour. Chem. Soc. Pak. 1998;20(1):12-8.

International Preliminary Report on Patentability dated Jul. 30, 2015 for PCT/US2014/049812.

Li, Experimental Analysis of Produced Water Desalination by a Humidification-Dehumidification Process. 2009. 62 pages.

Moghadasi et al., Scale deposits in porous media and their removal by EDTA injection. ECI Symposium Series. 2007. vol. RP5. Article 10. p. 57-70.

International Search Report and Written Opinion dated Jan. 12, 2015 for Application No. PCT/US2014/049812.

Al-Hallaj et al., Solar desalination with a humidification-dehumidification cycle: performance of the unit. Desalination. 1998;120:273-80.

El-Dessouky et al., Multiple-effect evaporation desalination systems: thermal analysis. Desalination. 1999;125:259-76.

Global Water Intelligence, Water Desalination Report. Tom Pankratz, ed. Dec. 17, 2012;48(48):1-4.

Klausner et al., Evaporative heat and mass transfer for the diffusion driven desalination process. Heat Mass Transfer. 2006;42:528-36.

Li, Mineral precipitation and deposition in cooling systems using impaired waters: mechanisms, kinetics, and inhibition. Dissertation defended Jul. 27, 2010. 224 pages.

(56) References Cited

OTHER PUBLICATIONS

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Sinex, EDTA—A molecule with a complex story. University of Bristol, School of Chemistry. <www.chm.bris.ac.uk/motm/edta/edtah.htm> (accessed Jan. 8, 2013). Aug. 1, 2007.

Zamen et al., Improvement of solar humidification-dehumidification desalination using multistage process. 6 pages. Accessed Jun. 6, 2014.

Office Action dated Dec. 26, 2017 for U.S. Appl. No. 14/719,295 and claims as pending.

Office Action dated Apr. 2, 2018 for U.S. Appl. No. 15/041,977 and claims pending.

Notice of Allowance dated Aug. 7, 2018 for U.S. Appl. No. 15/041,977 and claims allowed.

Office Action dated Aug. 1, 2018 for U.S. Appl. No. 14/719,295 and claims pending.

U.S. Appl. No. 14/452,387, filed Aug. 5, 2014, Govindan et al.

U.S. Appl. No. 14/719,295, filed May 21, 2015, St. John et al.

PCT/US2014/049812, dated Jan. 12, 2015, International Search Report and Written Opinion.

* cited by examiner

METHODS AND SYSTEMS FOR PRODUCING TREATED BRINES FOR DESALINATION

RELATED APPLICATIONS

This application claims priority under 35 U.S.C. § 119(e) to U.S. Provisional Patent Application Ser. No. 62/115,120, filed Feb. 11, 2015, and entitled "Water Treatment Systems and Associated Methods," which is incorporated herein by reference in its entirety for all purposes.

TECHNICAL FIELD

Systems for the treatment of water, and associated methods, are generally described.

BACKGROUND

Extraction of oil and gas from subterranean reservoirs may produce contaminated water as a byproduct (e.g., produced water). In some cases, it may be desirable to treat the contaminated water to remove one or more contaminants. For example, treated water may be useful as a drilling fluid and/or a fracking fluid in oil and gas extraction operations. In certain cases, it may be desirable to treat the contaminated water to comply with government regulations.

In some cases, it may be desirable to feed the contaminated water to a desalination system to remove an amount of salt to produce fresh water suitable for human consumption, irrigation, and/or industrial use. However, the presence of oils, suspended solids, scale-forming ions, and other contaminants in the contaminated water can complicate and impede the operation of a desalination system. Accordingly, it may be desirable to pre-treat a contaminated water stream to remove at least a portion of one or more contaminants prior to feeding the contaminated water stream to a desalination system.

Accordingly, improved systems for treating contaminated water are needed.

SUMMARY

Water treatment systems and associated methods are generally described. The subject matter of the present invention involves, in some cases, interrelated products, alternative solutions to a particular problem, and/or a plurality of different uses of one or more systems and/or articles.

Certain aspects relate to a method for treating water. In some embodiments, the method comprises supplying a saline water input stream having a first concentration of a scale-forming ion to an ion-removal apparatus; removing, within the ion-removal apparatus, at least a portion of the scale-forming ion from the saline water input stream to produce a first ion-diminished stream having a second concentration of the scale-forming ion, wherein the second concentration is lower than the first concentration; collecting a product stream comprising at least a portion of the first ion-diminished stream; removing, within the ion-removal apparatus, at least a portion of the scale-forming ion from the saline water input stream to produce a second ion-diminished stream having a third concentration of the scale-forming ion, wherein the third concentration is lower than the second concentration; and feeding the second ion-diminished stream to a desalination system to produce a substantially pure water stream having a lower concentration of a dissolved salt than the second ion-diminished stream and a concentrated brine stream having a higher concentration of the dissolved salt than the second ion-diminished stream.

In some embodiments, the method for treating water comprises supplying a saline water input stream to a separation apparatus; removing, within the separation apparatus, at least a portion of at least one suspended and/or emulsified immiscible phase from the saline water input stream to produce an immiscible-phase-diminished stream containing less of the immiscible phase relative to the saline water input stream; supplying at least a portion of the immiscible-phase-diminished stream to an ion-removal apparatus; removing, within the ion-removal apparatus, at least a portion of at least one scale-forming ion from the immiscible-phase-diminished stream to produce an ion-diminished stream containing less of the at least one scale-forming ion relative to the immiscible-phase-diminished stream; and directing at least a portion of the ion-diminished stream to a storage tank.

Some aspects relate to a water treatment system. In some embodiments, the system comprises an ion-removal apparatus configured to remove at least a portion of a scale-forming ion from a saline water input stream having a first concentration of the scale-forming ion to produce a first ion-diminished stream having a second concentration of the scale-forming ion under a first set of operating conditions, wherein the second concentration is lower than the first concentration, and a second ion-diminished stream having a third concentration of the scale-forming ion under a second set of operating conditions, wherein the third concentration is lower than the second concentration, wherein the ion-removal apparatus comprises an outlet configured to collect a product stream comprising at least a portion of the first ion-diminished stream; and a desalination system fluidically connected to the ion-removal apparatus, wherein the desalination system is configured to receive the second ion-diminished stream and produce a substantially pure water stream having a lower concentration of a dissolved salt than the second ion-diminished stream and a concentrated brine stream having a higher concentration of the dissolved salt than the second ion-diminished stream.

According to some embodiments, a water treatment system comprises a clean brine system. In some embodiments, the clean brine system comprises a separation apparatus configured to remove at least a portion of at least one suspended and/or emulsified immiscible phase from an aqueous input stream received by the separation apparatus to produce an immiscible-phase-diminished stream containing less of the phase relative to the aqueous input stream received by the separation apparatus; an ion-removal apparatus fluidically connected to the separation apparatus and configured to remove at least a portion of at least one scale-forming ion from an aqueous input stream received by the ion-removal apparatus to produce an ion-diminished stream containing less of the at least one scale-forming ion relative to the aqueous input stream received by the ion-removal apparatus; a suspended solids removal apparatus fluidically connected to the separation apparatus and configured to remove at least a portion of suspended solids from an aqueous input stream received by the suspended solids removal apparatus to produce a suspended-solids-diminished stream containing less suspended solid material relative to the aqueous input stream received by the suspended solids removal apparatus; and a storage tank fluidically connected to at least one component of the clean brine system such that no intervening precipitation apparatus is fluidically connected between the storage tank and the component.

Certain aspects relate to a method for forming concentrated brine. In some embodiments, the method comprises supplying a saline water input stream comprising an amount of suspended solids to a suspended solids removal apparatus; removing, within the suspended solids removal apparatus, at least a portion of the suspended solids from the saline water input stream to produce a suspended-solids-diminished stream having a lower amount of suspended solids relative to the saline water input stream and a suspended-solids-enriched stream having a higher amount of suspended solids relative to the saline water input stream; supplying at least a portion of the suspended-solids-enriched stream to a filtration apparatus and removing at least a portion of liquid within the suspended-solids-enriched stream to form a filter cake; and adding an acid to the filter cake to form a brine solution comprising a dissolved salt and having a density of at least about 9 pounds/gallon.

In some embodiments, the method for forming concentrated brine comprises supplying a saline water input stream comprising an amount of suspended solids to a suspended solids removal apparatus; removing, within the suspended solids removal apparatus, at least a portion of the suspended solids from the saline water input stream to produce a suspended-solids-diminished stream having a lower amount of suspended solids relative to the saline water input stream and a suspended-solids-enriched stream having a higher amount of suspended solids relative to the saline water input stream; supplying at least a portion of the suspended-solids-enriched stream to a filtration apparatus and removing at least a portion of liquid within the suspended-solids-enriched stream to form a substantially solid material; and adding an acid to the substantially solid material to dissolve substantially all of the substantially solid material to form a brine solution comprising a dissolved salt.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
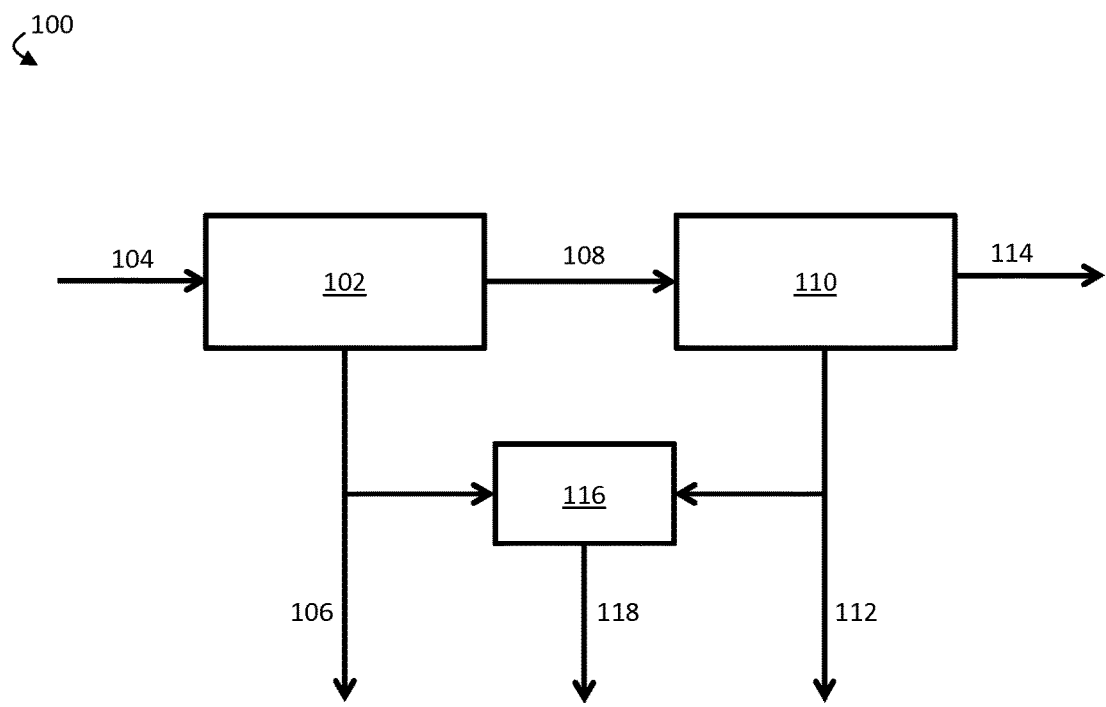
FIG. 1 shows a schematic flow diagram of an exemplary water treatment system comprising a clean brine system, a desalination system, and a mixing apparatus, according to some embodiments.

Water treatment systems and associated methods are generally described. Certain embodiments of the water treatment systems and methods described herein may be used to treat water comprising one or more contaminants (e.g., oil, grease, suspended solids, scale-forming ions, volatile organic material) to remove at least a portion of the one or more contaminants. In some embodiments, at least a portion of the treated water may be used directly in certain applications (e.g., oil and/or gas extraction processes). In some embodiments, at least a portion of the treated water may undergo desalination to produce substantially pure water and/or concentrated brine. In some embodiments, at least a portion of the treated water may be used to produce concentrated brine without the use of a desalination process.

It has been discovered within the context of this invention that a single water treatment system may be capable of producing a variety of products, including, but not limited to, clean brine, concentrated brine, ultra-high-density brine, substantially pure water, mixed water (e.g., a water product comprising a combination of clean brine and substantially pure water), and/or solid salt. In some embodiments, the water treatment system may comprise a clean brine system. According to certain embodiments, the clean brine system may be used to treat a saline water input stream comprising one or more contaminants to produce clean brine (e.g., contaminant-diminished saline water). In some embodiments, the clean brine may be collected as a product stream. In certain cases, the clean brine product stream may be directly used in certain applications (e.g., oil and/or gas extraction processes). In some cases, the same clean brine system may be used to treat a saline water input stream comprising one or more contaminants to produce clean brine suitable for desalination in a desalination system. According to some embodiments, desalination of clean brine in the desalination system may produce substantially pure water and/or concentrated brine. In some embodiments, the substantially pure water may be collected as a product stream. In certain cases, the substantially pure water product stream may be used for human consumption, irrigation, industrial use, and/or other applications. In some embodiments, the concentrated brine may be collected as a product stream. In certain cases, the concentrated brine product stream may be directly used in certain applications (e.g., as a kill fluid and/or drilling fluid in oil and/or gas extraction processes). In certain cases, at least a portion of the substantially pure water may be mixed with at least a portion of the clean brine (e.g., clean brine for direct use) to produce a mixed water product, which may be collected as a product stream. In some embodiments, one or more additional salts may be added to at least a portion of the concentrated brine to produce an ultra-high-density brine. In certain embodiments, one or more salts may be precipitated from the concentrated brine to produce solid salt. In some embodiments, the clean brine system may be used to produce concentrated brine in the absence of desalination. For example, in certain cases, a concentrated brine stream may be produced by adding an acid to a solid-containing stream produced by the clean brine system.

In some cases, it may be advantageous for a single water treatment system to be capable of producing two or more product streams. For example, it may advantageously reduce costs (e.g., capital costs) to have a single water treatment system instead of a plurality of water treatment systems, each producing a particular type of product. In addition, a single water treatment system may have reduced maintenance requirements, fewer components, and a smaller footprint than a plurality of water treatment systems. Further, water treatment systems described herein may advantageously have flexibility in producing different types of products. This flexibility may be particularly desirable in the oil and gas industries, in which frequent changes to system designs may be necessary.

FIG. 1 is a schematic diagram of an exemplary water treatment system, according to some embodiments. As shown in FIG. 1, water treatment system 100 comprises clean brine system 102, desalination system 110, and mixing apparatus 116, all of which are fluidically connected to one another. As described in further detail herein, clean brine system 102 may comprise one or more units configured to remove one or more contaminants from a saline water input stream. For example, clean brine system 102 may comprise a separation apparatus, an ion-removal apparatus, a suspended solids removal apparatus, a pH adjustment apparatus, a volatile organic material (VOM) removal apparatus, and/or a filtration apparatus. Desalination system 110 may be any type of desalination system known in the art, and mixing apparatus 116 may be any type of mixing apparatus known in the art.

In operation, a saline water input stream 104 may enter clean brine system 102 from a source of saline water comprising one or more contaminants. Non-limiting examples of the source of contaminated saline water include an oil or gas well, a separator (e.g., a gravity separator) configured to separate oil (e.g., produced oil) and water (e.g., produced water), and one or more tanks containing contaminated saline water. In some embodiments, clean brine system 102 may be configured to produce first clean brine stream 106 comprising a first concentration of one or more contaminants. First clean brine stream 106 may, in some cases, be suitable for direct use in certain applications. For example, first clean brine stream 106 may be suitable for use in oil and/or gas extraction operations as a drilling fluid (e.g., a fluid that aids in drilling a wellbore) and/or a fracking fluid (e.g., a fluid that is injected into a wellbore to assist in fracturing subterranean rock formations). In some embodiments, clean brine system 102 may be configured to produce second clean brine stream 108 comprising a second concentration of one or more contaminants. In certain cases, the second concentration may be lower than the first concentration, and second clean brine stream 108 may be a suitable feed stream for a desalination system. In certain cases, it may be desirable for second clean brine stream 108 to have a lower concentration of one or more contaminants than first clean brine stream 106. In some cases, desalination system 110 may concentrate one or more salts and may comprise one or more components (e.g., a heat exchanger) vulnerable to fouling (e.g., by salt formation). Accordingly, it may be preferred for a stream entering desalination system 110 to have lower concentrations of contaminants (e.g., scale-forming ions) to avoid forming scale within the desalination system. In order to remove more contaminants for second clean brine stream 108, chemical loading rates and/or the order of chemical loading may be modified in clean brine system 102.

Clean brine system 102 may, in some embodiments, produce first clean brine stream 106 and second clean brine stream 108 in an alternating manner (e.g., during a first period of time clean brine system 102 may produce first clean brine stream 106, and during a second period of time clean brine system 102 may produce second clean brine stream 108). In some cases, producing one or more clean brine streams in an alternating manner may advantageously reduce costs (e.g., chemical costs). For example, such a system may require a lower amount of expensive chemicals than a system in which desalination-quality brine is continuously produced.

In some embodiments, second clean brine stream 108 may enter desalination system 110. In some cases, desalination system 110 may produce substantially pure water stream 112. In certain embodiments, a first portion of substantially pure water stream 112 may optionally be recycled back to the desalination system and/or the clean brine system. In certain embodiments, a second portion of substantially pure water stream 112 may optionally be discharged from water treatment system 100 and collected as a product stream. In certain cases, a third portion of substantially pure water stream 112 may optionally be mixed with at least a portion of first clean brine stream 106 in mixing apparatus 116 to produce mixed water stream 118. In addition to substantially pure water stream 112, desalination system 110 may produce concentrated brine stream 114, which may be collected as a product stream. In some embodiments, an amount of one or more salts may be added to at least a portion of concentrated brine stream 114 to produce an ultra-high-density brine stream. In certain embodiments, one or more salts may be precipitated from the concentrated brine stream to produce a solid salt. According to certain embodiments, a precipitation apparatus (not shown in FIG. 1) may be fluidically connected to desalination system 110 to produce the solid salt.

It should be noted that water treatment system 100 may comprise additional components. For example, water treatment system 100 may further comprise one or more optional buffer tanks (not shown in FIG. 1) positioned between clean brine system 102 and desalination system 110. In some cases, the presence of one or more optional buffer tanks may facilitate continuous operation of desalination system 110. For example, the presence of a buffer tank may allow desalination system 110 to continue operating when clean brine system 102 is producing first clean brine stream 106 for direct use instead of second clean brine stream 108 for desalination.

Water treatment systems and methods described herein may be used to treat water from a variety of sources. In some embodiments, a saline water input stream comprises produced water (e.g., water that emerges from oil or gas wells along with the oil or gas). Due to the length of time produced water has spent in the ground, and due to high subterranean pressures and temperatures that may increase the solubility of certain salts and/or minerals, produced water often comprises relatively high concentrations of dissolved salts and minerals. For example, some produced water streams may comprise a supersaturated solution of dissolved strontium sulfate ($SrSO_4$). In addition, produced water may comprise a variety of other substances, including oil and/or grease, organic compounds (e.g., benzene, toluene), scale-forming ions, and/or suspended solids. In some embodiments, at least a portion of the saline water input stream comprises and/or is derived from seawater, ground water, brackish water, and/or wastewater (e.g., industrial wastewater). Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of a desalination system, or another chemical process).

Figure 2A:
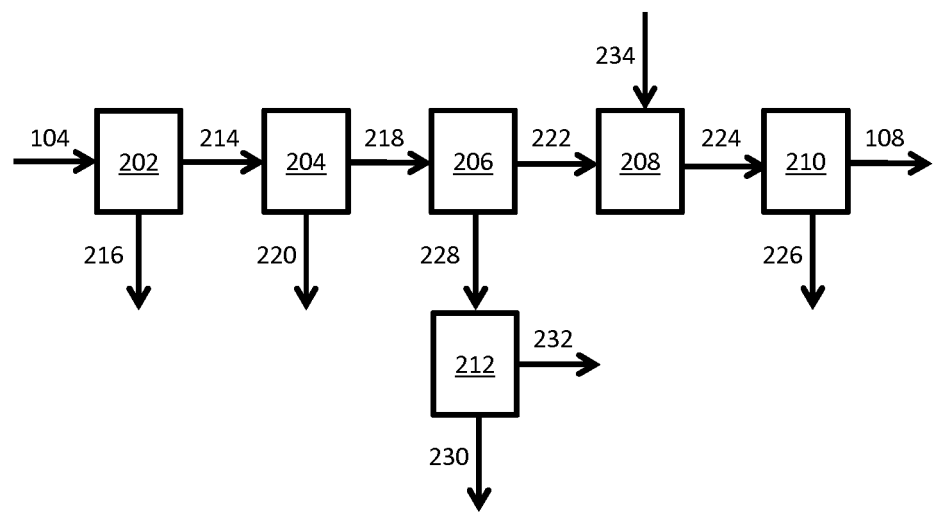
FIG. 2A shows, according to some embodiments, a schematic flow diagram of an exemplary clean brine system comprising a separation apparatus, an ion-removal apparatus, a suspended solids removal apparatus, a pH adjustment apparatus, a VOM removal apparatus, and a filtration apparatus.

In certain systems described herein, a clean brine system is configured to receive a stream of saline water comprising one or more contaminants and remove at least a portion of the one or more contaminants to produce a contaminant-diminished saline water stream (e.g., a clean brine stream). FIG. 2A is a schematic diagram of an exemplary clean brine system 102, according to some embodiments. As shown in FIG. 2A, clean brine system 102 comprises separation apparatus 202 configured to remove at least a portion of a suspended and/or emulsified immiscible phase from an aqueous stream, ion-removal apparatus 204 configured to remove at least a portion of at least one scale-forming ion from an aqueous stream, suspended solids removal apparatus 206 configured to remove at least a portion of suspended solids from an aqueous stream, pH adjustment apparatus 208 configured to increase or decrease the pH of an aqueous stream, volatile organic material (VOM) removal apparatus 210 configured to remove at least a portion of VOM from an aqueous stream, and filtration apparatus 212 configured to produce a solid product (e.g., filter cake).

In operation, saline water input stream 104 comprising a suspended and/or emulsified immiscible phase, a scale-forming ion, suspended solids, and/or a volatile organic material is flowed to separation apparatus 202. Separation apparatus 202 removes at least a portion of the immiscible phase to produce immiscible-phase-diminished stream 214, which contains less of the immiscible phase than stream 104. In certain embodiments, separation apparatus 202 also produces immiscible-phase-enriched stream 216, which contains more of the immiscible phase than stream 104. Immiscible-phase-diminished stream 214 is then flowed to ion-removal apparatus 204. Ion-removal apparatus 204 removes at least a portion of at least one scale-forming ion to produce ion-diminished stream 218, which contains less of at least one scale-forming ion than immiscible-phase-diminished stream 214. In certain embodiments, ion-removal apparatus 204 also produces ion-enriched stream 220, which contains more of at least one scale-forming ion than immiscible-phase-diminished stream 214. Ion-diminished stream 218 is then flowed to suspended solids removal apparatus 206. Suspended solids removal apparatus 206 removes at least a portion of suspended solids from ion-diminished stream 218 to produce suspended-solids-diminished stream 222, which contains less suspended solids than ion-diminished stream 218. Suspended solids removal apparatus 206 also produces suspended-solids-enriched stream 228, which may be flowed to filtration apparatus 212 to form solid stream 230 and filtered liquid stream 232. Suspended-solids-diminished stream 222 may be flowed to pH adjustment apparatus 208. pH adjustment apparatus 208 may increase or decrease the pH of stream 222 to produce pH-adjusted stream 224. In some cases, chemicals 234 may be added in pH adjustment apparatus 208 to increase or decrease the pH of stream 222. Stream 224 may be flowed to VOM removal apparatus 210. VOM removal apparatus 210 may remove at least a portion of VOM from stream 224 to produce VOM-diminished stream 108. VOM removal apparatus 210 may also produce VOM-enriched stream 226. VOM-diminished stream 108 may be discharged from clean brine system 102 as clean brine stream 108. In some cases, clean brine stream 108 may be collected as a product stream for direct use (e.g., in oil or gas extraction). In some cases, clean brine stream 108 may be flowed to a desalination system configured to remove at least a portion of at least one dissolved salt from clean brine stream 108.

It should be noted that each of the components of clean brine system 102 shown in FIG. 2A is optional, and a clean brine system may comprise any combination of the components shown in FIG. 2A. For example, FIG. 2B is a schematic diagram of exemplary clean brine system 102 comprising separation apparatus 202 configured to remove at least a portion of a suspended and/or emulsified immiscible phase from an aqueous stream, ion-removal apparatus 204 configured to remove at least a portion of at least one scale-forming ion from an aqueous stream, filtration apparatus 212 configured to remove at least a portion of suspended solids from an aqueous stream and form a substantially solid material, pH adjustment apparatus 208 configured to increase or decrease the pH of an aqueous stream, and volatile organic material (VOM) removal apparatus 210 configured to remove at least a portion of VOM from an aqueous stream.

In operation, saline water input stream 104 comprising a suspended and/or emulsified immiscible phase, a scale-forming ion, suspended solids, and/or a volatile organic material is flowed to separation apparatus 202. Separation apparatus 202 removes at least a portion of the immiscible phase to produce immiscible-phase-diminished stream 214, which contains less of the immiscible phase than stream 104. In certain embodiments, separation apparatus 202 also produces immiscible-phase-enriched stream 216, which contains more of the immiscible phase than stream 104. Immiscible-phase-diminished stream 214 is then flowed to ion-removal apparatus 204. Ion-removal apparatus 204 removes at least a portion of at least one scale-forming ion from stream 214 to produce ion-diminished stream 218, which contains less of at least one scale-forming ion than immiscible-phase-diminished stream 214. In certain embodiments, ion-removal apparatus 204 also produces ion-enriched stream 220, which contains more of at least one scale-forming ion than immiscible-phase-diminished stream 214. Ion-diminished stream 218 is then flowed to filtration apparatus 212 (e.g., a filter press, a vacuum filter). Filtration apparatus 212 removes at least a portion of suspended solids from ion-diminished stream 218 to form suspended-solids-diminished stream 232 (e.g., a filtered liquid stream), which contains less suspended solids than ion-diminished stream 218, and solid stream 230. Suspended-solids-diminished stream 232 may be flowed to pH adjustment apparatus 208, which may increase or decrease the pH of stream 232 to produce pH-adjusted stream 224. In some cases, chemicals 234 may be added in pH adjustment apparatus 208 to increase or decrease the pH of stream 232. Stream 224 may be flowed to VOM removal apparatus 210. VOM removal apparatus 210 may remove at least a portion of VOM to produce VOM-diminished stream 108. VOM removal apparatus 210 may also produce VOM-enriched stream 226. VOM-diminished stream 108 may be discharged from clean brine system 102 as clean brine stream 108.

Figure 2B:
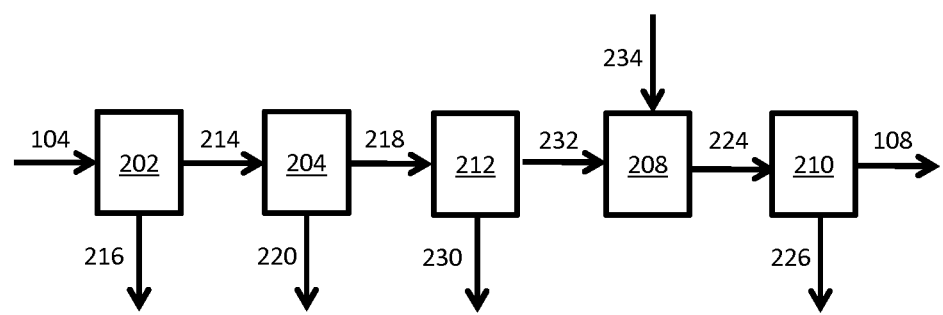
FIG. 2B shows, according to some embodiments, a schematic flow diagram of an exemplary clean brine system comprising a separation apparatus, an ion-removal apparatus, a filtration apparatus, a pH adjustment apparatus, and a VOM removal apparatus.
Figure 7:
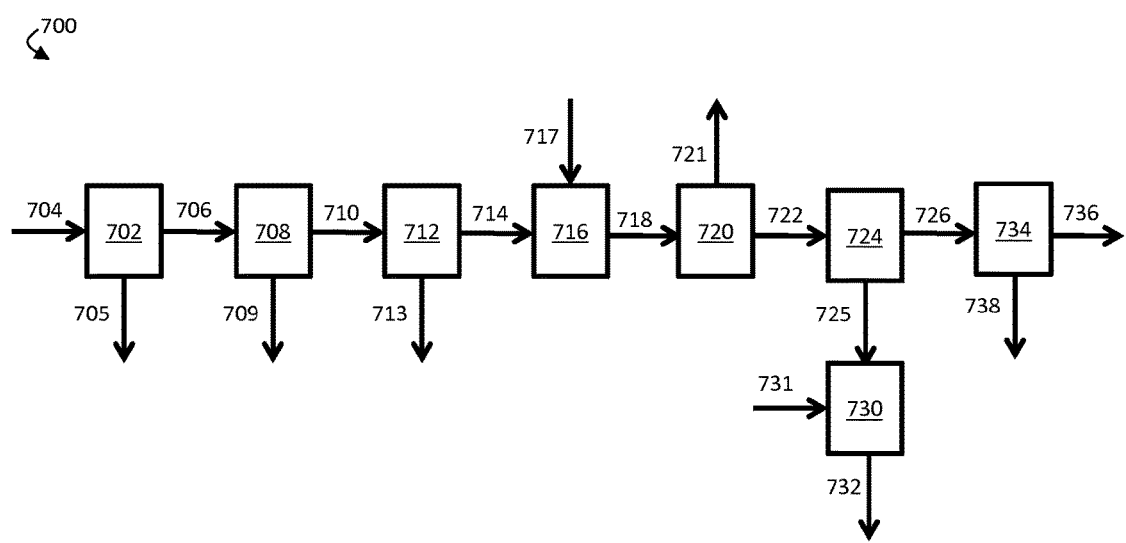
FIG. 7 shows a schematic flow diagram of an exemplary water treatment system, according to some embodiments.
Figure 8:
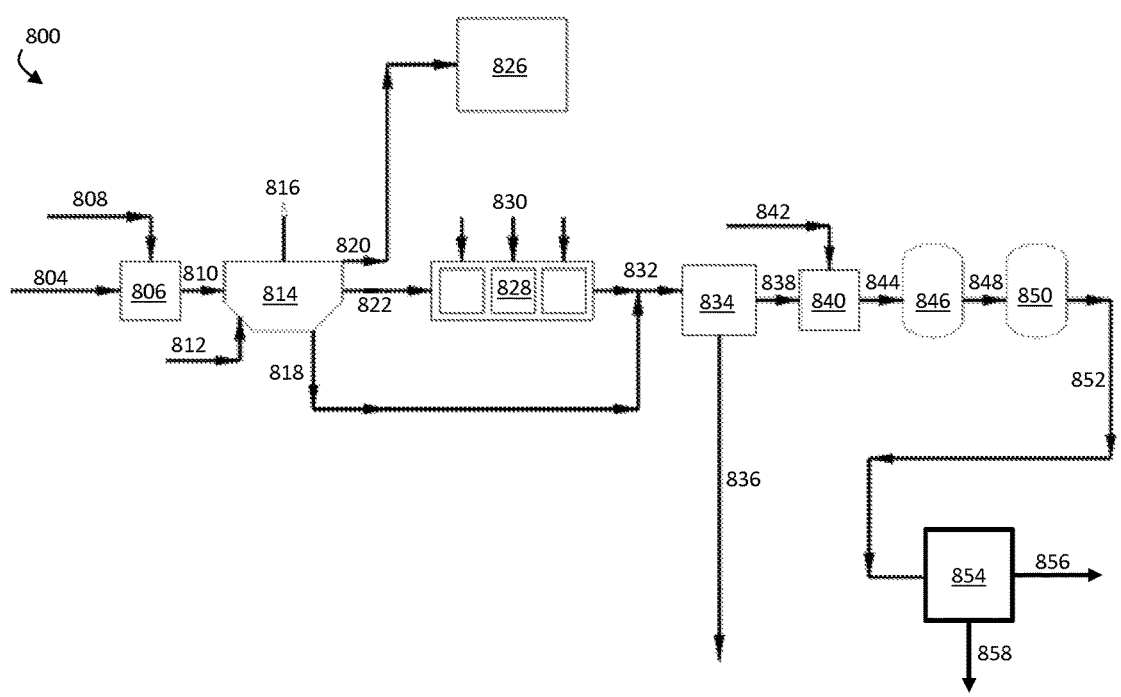
FIG. 8 shows, according to some embodiments, a schematic flow diagram of an exemplary water treatment system.
Figure 9:
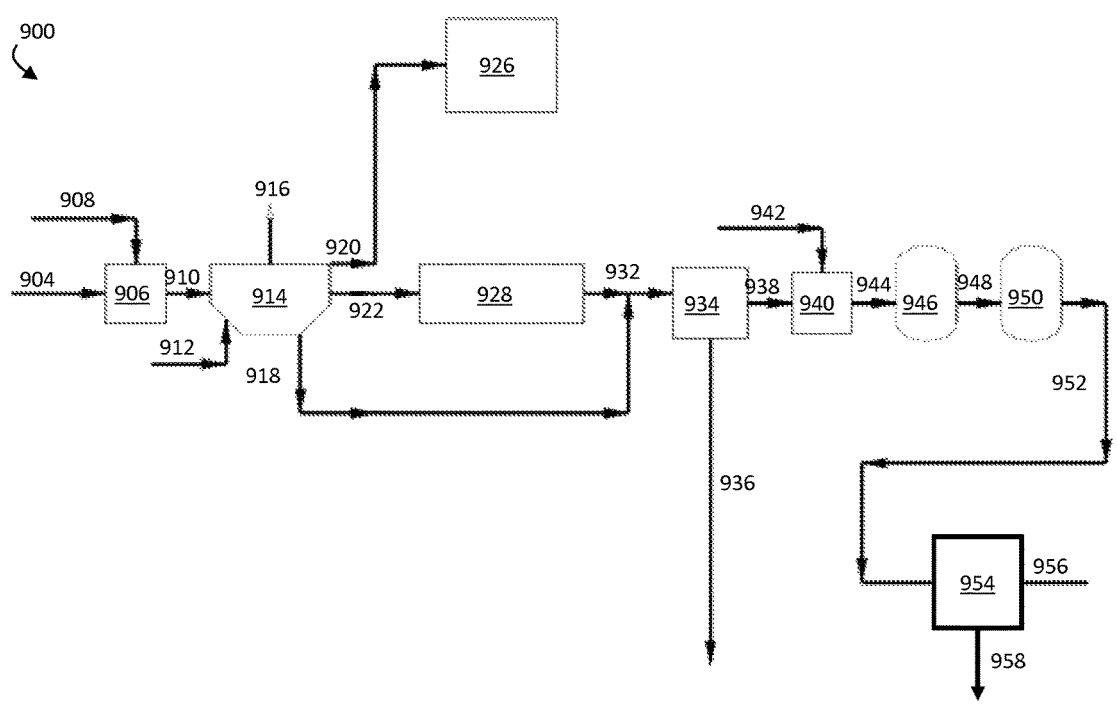
FIG. 9 shows a schematic flow diagram of an exemplary water treatment system, according to some embodiments.
Figure 10:
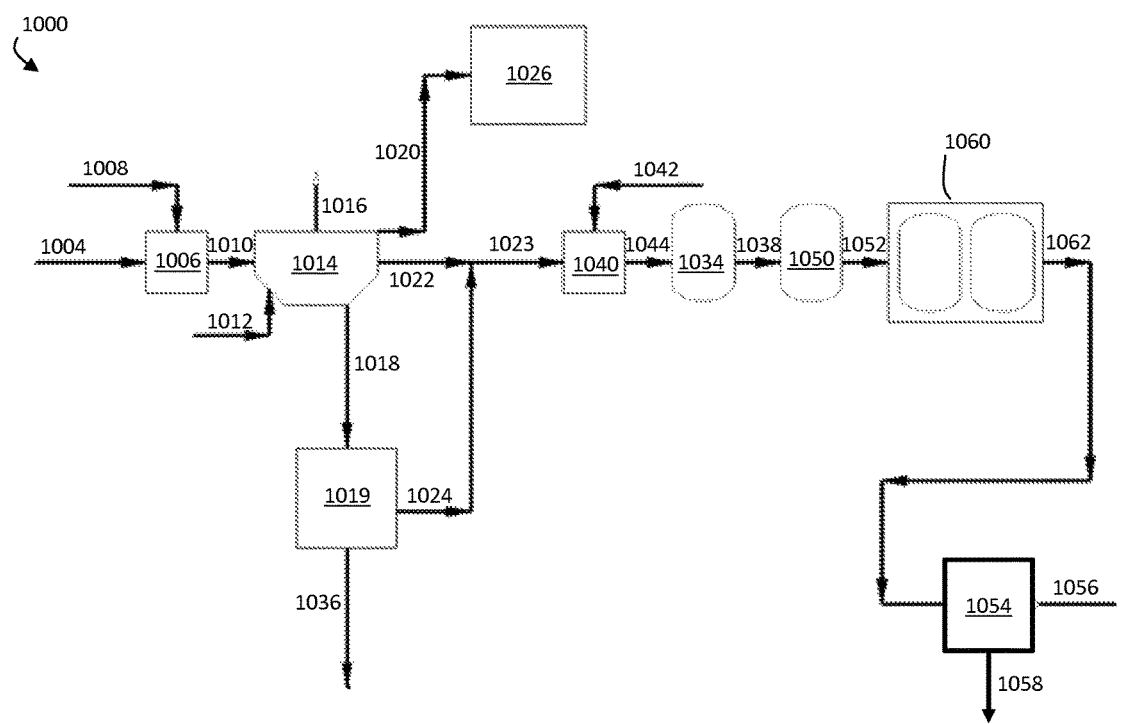
FIG. 10 shows, according to some embodiments, a schematic flow diagram of an exemplary water treatment system.

A schematic diagram of an exemplary water treatment system comprising exemplary clean brine system 102 (as shown in FIGS. 2A-B) and an exemplary desalination system is shown in FIG. 7, as described in further detail below. Schematic diagrams of additional exemplary water treatment systems are shown in FIGS. 8-10.

In some embodiments, the clean brine system comprises an optional separation apparatus configured to receive a saline water input stream and remove at least a portion of a suspended and/or emulsified immiscible phase (e.g., a water-immiscible liquid phase) to produce an immiscible-phase-diminished saline water stream, which contains less of the immiscible phase than the saline water input stream. As used herein, a suspended and/or emulsified immiscible phase (e.g., a water-immiscible material) refers to a material that is not soluble in water to a level of more than 10% by weight at the temperature and under the conditions at which the separation apparatus operates. In some embodiments, the suspended and/or emulsified immiscible phase comprises oil and/or grease. As used herein, the term "oil" refers to a fluid that is generally more hydrophobic than water and is not miscible or soluble in water, as is known in the art. Thus, the oil may be a hydrocarbon in some embodiments, but in other embodiments, the oil may comprise other hydrophobic fluids.

In certain embodiments, the separation apparatus is configured to remove a relatively large percentage of water-immiscible materials from the stream fed to the separation apparatus. For example, in some embodiments, the amount (in weight percentage, wt %) of at least one water-immiscible material within the stream exiting the separation apparatus (e.g., stream 214 in FIG. 2) is at least about 50%, at least about 75%, at least about 90%, at least about 95%, or at least about 99% less than the amount of the at least one water-immiscible material within the stream entering the separation apparatus (e.g., stream 104 in FIG. 2). To illustrate, if the stream exiting the separation apparatus contains 5 wt % water-immiscible material, and the stream entering the separation apparatus contains 50 wt % water-immiscible material, then the stream exiting the separation apparatus contains 90% less water-immiscible material than the stream entering the separation apparatus. In certain embodiments, the sum of the amounts of all water-immiscible materials within the stream exiting the separation apparatus is at least about 50%, at least about 75%, at least about 90%, at least about 95%, or at least about 99% less than the sum of the amounts of all water-immiscible materials within the stream entering the separation apparatus.

Figure 3:
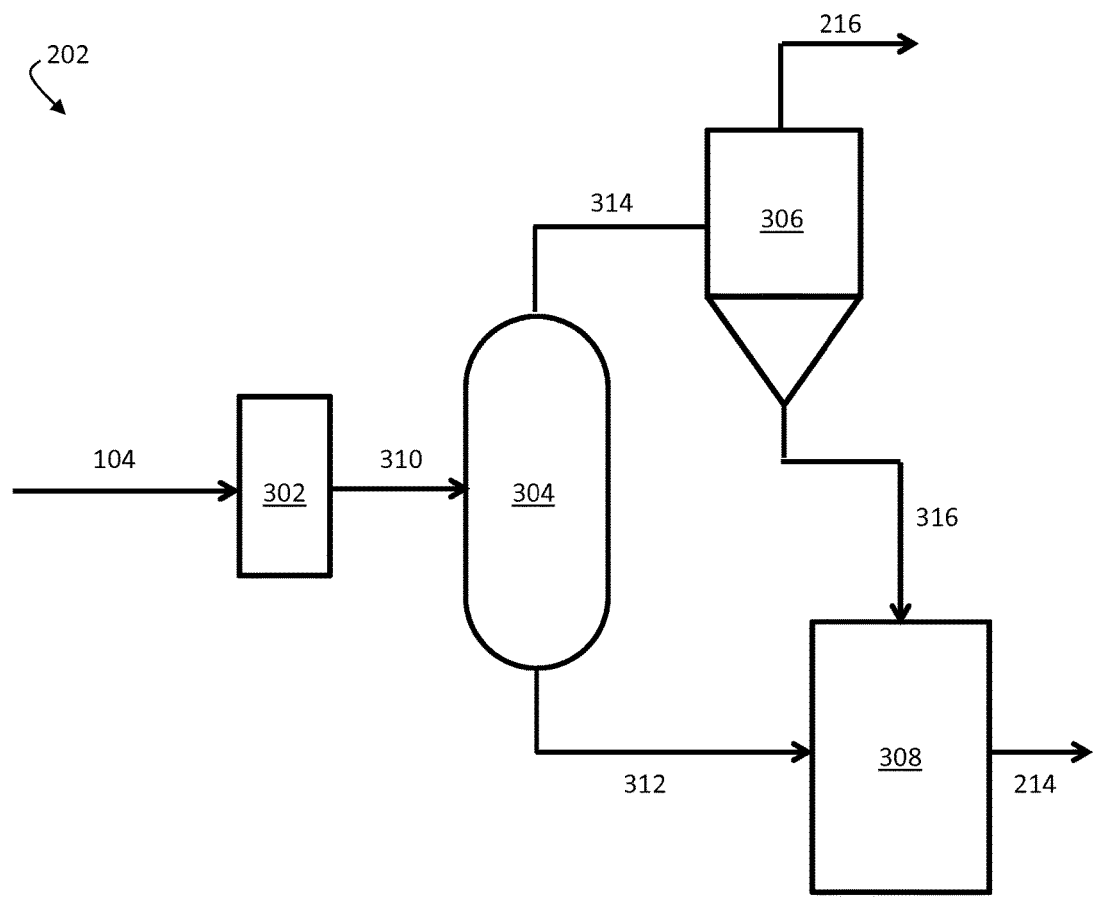
FIG. 3 shows a schematic flow diagram of an exemplary separation apparatus, according to some embodiments.

In some embodiments, the separation apparatus comprises one or more separators. FIG. 3 shows a schematic diagram of an exemplary separation apparatus. As shown in FIG. 3, separation apparatus 202 comprises optional strainer 302, primary separator 304, optional secondary separator 306, and optional water tank 308. In operation, saline water input stream 104 (e.g., corresponding to saline water input stream 104 in FIG. 2) flows through optional strainer 302. Strainer 302 may be configured to prevent particles having a certain size from passing through strainer 302 to primary separator 304. Saline water stream 310, which is the portion of saline water input stream 104 that passes through strainer 302, may then flow to primary separator 304. In primary separator 304, water may be substantially separated from a suspended and/or emulsified immiscible phase to produce first immiscible-phase-diminished stream 312, which contains less water-immiscible material than stream 310, and first immiscible-phase-enriched stream 314, which contains more water-immiscible material than stream 310. Immiscible-phase-diminished stream 312 may flow to water tank 308.

In some cases, immiscible-phase-enriched stream 314 may flow to optional secondary separator 306. In secondary separator 306, water-immiscible materials may be separated from any water remaining in stream 314 to produce second immiscible-phase-diminished stream 316 and second immiscible-phase-enriched stream 216. Second immiscible-phase-enriched stream 216 may be discharged from separation apparatus 202, and second immiscible-phase-diminished stream 316 may be flowed to water tank 308. Immiscible-phase-diminished stream 214 formed by combining streams 312 and 316 may then be discharged from separation apparatus 202.

In some embodiments, immiscible-phase-diminished stream 214 flows to another unit of a clean brine system (e.g., an ion-removal apparatus, a suspended solids removal apparatus, a pH adjustment apparatus, a volatile organic material removal apparatus, a filtration apparatus). In some embodiments, immiscible-material-diminished stream 214 is discharged from a clean brine system as clean brine. In some cases, the clean brine may be made to flow to a desalination system. In some cases, the clean brine may be used directly in certain applications (e.g., oil and gas extraction operations). In certain embodiments, the clean brine may be made to flow to one or more storage tanks.

The primary separator may be any type of separator known in the art. In some cases, the primary separator may at least partially separate a portion of a suspended and/or emulsified immiscible phase from an aqueous stream via gravity, centrifugal force, adsorption, and/or using a barrier.

According to certain embodiments, the primary separator is an induced gas flotation (IGF) separator. An IGF separator generally refers to a device configured to introduce bubbles of a gas into a volume of a liquid, where the gas bubbles adhere to particles (e.g., droplets of water-immiscible material, small solid particles) within the liquid volume and cause the particles to float to the surface of the liquid volume. In a particular embodiment, the gas is air, and the IGF separator may be referred to as an induced air flotation (IAF) separator. Other examples of suitable gases include, but are not limited to, carbon dioxide ($CO_2$), nitrogen ($N_2$), and/or natural gas.

In some embodiments, an IGF separator comprises a vessel capable of holding a volume of liquid and a diffuser (e.g., a mechanical device configured to distribute a gas flow through a liquid volume). In certain embodiments, a low pressure zone (e.g., a zone having a pressure of about 100 kPa or less) that draws in ambient air may be formed in the IGF separator. For example, in certain cases, a low pressure zone may be formed by a rapidly rotating paddle inside a stationary diffuser or by rapid rotation of the diffuser itself. According to some embodiments, the diffuser is capable of introducing relatively small gas bubbles (e.g., gas bubbles having an average diameter of about 100 microns or less) into the liquid volume. In some cases, the relatively small gas bubbles adhere to particles (e.g., droplets of a water-immiscible material, suspended solid particles) within the liquid volume and cause the particles to float to the surface of the liquid volume. In some embodiments, a portion of the liquid volume below the surface (e.g., a portion of the liquid volume that is substantially free of gas bubbles and associated particles) may exit the IGF separator (e.g., through an underflow weir) as an immiscible-phase-diminished stream. In some embodiments, a portion of the material floating on the surface of the liquid volume may exit the IGF separator (e.g., over an underflow weir) as an immiscible-phase-enriched stream.

In some embodiments, use of an IGF separator may be associated with certain advantages. For example, in addition to removing at least a portion of a suspended and/or emulsified immiscible phase, an IGF separator may be capable of removing at least a portion of one or more volatile organic materials (VOMs) from a saline water input stream. As used herein, the term "volatile organic material" or "VOM" is used to describe organic materials that at least partially evaporate at 25° C. and 1 atmosphere. In some embodiments, the IGF separator is capable of removing at least a portion of one or more dissolved gases from a saline water input stream. A non-limiting example of a dissolved gas that may be removed from a saline water input stream by an IGF separator is hydrogen sulfide ($H_2S$). Without wishing to be bound by a particular theory, at least a portion of one or more dissolved gases may be drawn out of solution by a low pressure zone formed by a diffuser of the IGF separator and/or may diffuse into the gas bubbles. In certain embodiments, gas exiting the IGF separator may be vented to reduce the possibility of buildup of one or more flammable gases.

Although the primary separator has been described as being an IGF separator, it should be noted that the primary separator may be any other type of separator known in the art. For example, the primary separator may comprise a hydrocyclone (e.g., a de-oiling hydrocyclone), a corrugated plate interceptor, an adsorption media filter, a coalescing media filter, a membrane filter, a gravity separator (e.g., an American Petroleum Institute (API) separator), a dissolved gas flotation (DGF) separator, and/or a skimmer.

In some embodiments, an aqueous stream flowing through the primary separator has a relatively short residence time in the primary separator. In some embodiments, the residence time of an aqueous stream flowing through the primary separator is about 30 minutes or less, about 20 minutes or less, about 10 minutes or less, about 8 minutes or less, about 6 minutes or less, about 4 minutes or less, about 2 minutes or less, or about 1 minute or less. In some embodiments, the residence time of the aqueous input stream in the primary separator is in the range of about 1 minute to about 30 minutes, about 1 minute to about 20 minutes, about 1 minute to about 10 minutes, about 1 minute to about 8 minutes, about 1 minute to about 6 minutes, about 1 minute to about 4 minutes, or about 1 minute to about 2 minutes.

Those of ordinary skill in the art are capable of determining the residence time of a volume of fluid in a vessel. For a batch (i.e., non-flow) apparatus, the residence time corresponds to the amount of time the fluid spends in the vessel. For a flow-based apparatus, the residence time is determined by dividing the volume of the vessel by the volumetric flow rate of the fluid through the vessel.

In some embodiments, the separation apparatus further comprises a secondary separator positioned downstream of a primary separator. In some cases, the secondary separator is configured to remove at least a portion of a suspended and/or emulsified immiscible phase from an immiscible-phase-enriched stream received from the primary separator. The secondary separator may be any type of separator known in the art. In some cases, the secondary separator may at least partially separate a portion of a suspended and/or emulsified immiscible phase from an aqueous stream via gravity, centrifugal force, adsorption, and/or using a barrier.

According to certain embodiments, the secondary separator comprises a dissolved gas flotation (DGF) separator. A dissolved gas flotation apparatus generally refers to a device configured to dissolve a gas into a liquid volume. In some cases, the gas may be dissolved in the liquid volume through the generation of very high pressure zones. In certain embodiments, the dissolved gas may precipitate as small gas bubbles (e.g., having an average diameter of about 10 microns or less). In some embodiments, the small gas bubbles may nucleate on particles (e.g., droplets of water-immiscible material, suspended solid particles), and the bubbles and associated particles may float to the surface of the liquid volume. In certain embodiments, the gas is air, and the DGF separator may be referred to as a dissolved air flotation (DAF) separator. In certain cases, the density of air bubbles in a liquid volume may be relatively low. In some cases, the relatively low density of air bubbles may advantageously increase the rate of buoyancy-driven separation between water and water-immiscible materials.

In certain embodiments, the secondary separator comprises a gravity separator. In some cases, the gravity separator comprises a settling tank, and water and water-immiscible material in an immiscible-phase-enriched stream received by the gravity separator may be at least partially physically separated within the settling tank. In certain cases, water present in the immiscible-phase-enriched stream received by the gravity separator may settle at the bottom of a settling tank, while water-immiscible material may float to the top of the settling tank. In certain embodiments, this separation may be at least partially attributed to differences in the specific gravity of water and water-immiscible material. In certain cases, at least a portion of the water-immiscible material (e.g., oil) may be recovered from the settling tank. The water-immiscible material may subsequently be stored and/or transported off-site.

In some embodiments, water recovered from the immiscible-phase-enriched stream may be combined with the immiscible-phase-diminished stream produced by the primary separator. In certain cases, the immiscible-phase-diminished streams may be made to flow into one or more buffer tanks and/or storage tanks. In certain cases, the immiscible-phase-diminished streams may be made to flow to other components of a clean brine system (e.g., ion-removal apparatus, suspended solids removal apparatus, pH adjustment apparatus, volatile organic material removal apparatus, filtration apparatus). In some cases, the immiscible-material-diminished streams may be discharged from the clean brine system as clean brine.

In some embodiments, an aqueous stream flowing through the secondary separator has a relatively long residence time in the secondary separating apparatus. In some embodiments, the residence time of an aqueous stream in the secondary separator is at least about 5 minutes, at least about 10 minutes, at least about 15 minutes, at least about 20 minutes, at least about 25 minutes, at least about 30 minutes, at least about 40 minutes, at least about 50 minutes, or at least about 60 minutes. In some embodiments, the residence time of an aqueous stream in the secondary separator is in the range of about 5 minutes to about 30 minutes, about 10 minutes to about 30 minutes, about 15 minutes to about 30 minutes, about 20 minutes to about 30 minutes, or about 25 minutes to about 30 minutes.

In some embodiments, the residence time of an aqueous stream flowing through the secondary separator may be longer than the residence time of an aqueous stream flowing through the primary separator. In some cases, the residence time of an aqueous stream flowing through the secondary separator may be larger than the residence time of an aqueous stream flowing through the primary separator by at least about 5 minutes, at least about 10 minutes, at least about 15 minutes, at least about 20 minutes, at least about 25 minutes, or at least about 30 minutes. In certain embodiments, it may be advantageous for the secondary separator to have a longer residence time than the primary separating apparatus. For example, a longer residence time in the secondary separator may facilitate more complete separation between water and a water-immiscible material without significantly reducing the flow rate of an aqueous stream through a clean brine system.

Although the secondary separator has been described as comprising a DGF separator and/or a gravity separator, it should be noted that the secondary separator may be any other type of separator known in the art. For example, the secondary separator may comprise a hydrocyclone (e.g., a de-oiling hydrocyclone), a corrugated plate interceptor, an adsorption media filter, a coalescing media filter, a membrane filter, an induced gas flotation (IGF) separator, and/or a skimmer.

In some embodiments, the primary separator and/or secondary separator may be configured to remove droplets of the immiscible phase having relatively small diameters. In certain embodiments, the primary separator and/or secondary separator are configured to remove droplets of the immiscible phase having a diameter of about 200 microns or less, about 150 microns or less, about 100 microns or less, about 50 microns or less, about 20 microns or less, about 10 microns or less, about 5 microns or less, or about 1 micron or less. In certain cases, the primary separator and/or secondary separator are configured to remove droplets of the immiscible phase having an average diameter of at least about 1 micron, at least about 5 microns, at least about 10 microns, at least about 20 microns, at least about 50 microns, at least about 100 microns, at least about 150 microns, or at least about 200 microns. Combinations of the above-noted ranges (e.g., about 1 micron to about 200 microns, about 1 micron to about 100 microns, about 1 micron to about 50 microns, about 1 micron to about 10 microns) are also possible.

In some embodiments, the separation apparatus comprises one or more additional components. According to some embodiments, the separation apparatus further comprises an optional strainer positioned upstream of the primary separator and/or the secondary separator. A strainer generally refers to a device configured to prevent the passage of particles having a certain size through the strainer. In some embodiments, the strainer is configured to prevent the passage of particles having an average diameter of at least about 0.1 mm, at least about 0.5 mm, at least about 1 mm, at least about 2 mm, at least about 5 mm, at least about 10 mm, at least about 15 mm, or at least about 20 mm. Non-limiting examples of suitable strainers include basket strainers, duplex basket strainers (e.g., twin basket strainers), Y-strainers, T-strainers, inline strainers, automatic self-cleaning strainers, plate strainers (e.g., expanded cross-section strainers), scraper strainers, and/or magnetic strainers.

In some embodiments, the separation apparatus further comprises one or more optional buffer tanks. In some embodiments, one or more buffer tanks are positioned between the primary separator and/or secondary separator and other components of a clean brine system.

In certain cases, the separation apparatus further comprises one or more additional separators. In some embodiments, the one or more separators are positioned upstream of the primary separator. The one or more upstream separators may be any type of separator known in the art. In some embodiments, the one or more upstream separators at least partially separate the suspended and/or emulsified immiscible phase from water via gas flotation, gravity, centrifugal force, adsorption, and/or using a barrier. In some embodiments, the one or more upstream separators comprise a hydrocyclone (e.g., a de-oiling hydrocyclone), a corrugated plate interceptor, an adsorption media filter, a coalescing media filter, a membrane filter, an induced gas flotation (IGF) separator, or a dissolved gas flotation (DGF) separator.

In certain embodiments, the one or more upstream separators comprise a gravity separator. In some cases, the gravity separator is an American Petroleum Institute (API) separator. An API separator generally refers to a separator configured to separate water and water-immiscible material based on the specific gravity difference between the water and water-immiscible material (e.g., through settling). In some cases, an API separator may be used to separate relatively large amounts of water and water-immiscible material. In certain embodiments, an API separator comprises coalescing media. In some cases, an API separator comprises parallel plates. In certain embodiments, the presence of parallel plates in the API separator may advantageously reduce the residence time required for separation by settling in the API separator.

It should be noted that the primary separator, optional secondary separator, and/or one or more optional upstream separators may be the same type of separator or different types of separators.

In certain embodiments, the separation apparatus can be configured to remove suspended solids. In some such embodiments, the separation apparatus can be configured to perform any of the functions described herein with respect to the suspended solids removal apparatus. For example, in some such embodiments, the separation apparatus can be configured to remove dirt, precipitated salts, organic solids, and/or any other suspended solid material. In some embodiments, the separation apparatus can be configured to remove at least about 50%, at least about 75%, at least about 90%, at least about 95%, or at least about 99% of the suspended solids within the stream that is transported to the separation apparatus.

The separation apparatus may be fluidically connected to one or more other unit operations of the clean brine system, either directly or indirectly. In some embodiments, the separation apparatus may be fluidically connected to an optional ion-removal apparatus. For example, in FIG. 2A, separation apparatus 202 is fluidically connected to optional ion-removal apparatus 204, described in more detail below, via stream 214. In some embodiments, the separation apparatus may be fluidically connected to an optional suspended solids removal apparatus. For example, in FIG. 2A, separation apparatus 202 is fluidically connected to optional suspended solids removal apparatus 206, described in more detail below, via streams 214 and 218. The separation apparatus may be, in some embodiments, fluidically connected to an optional pH adjustment apparatus. For example, in FIG. 2A, separation apparatus 202 is fluidically connected to optional pH adjustment apparatus 208, described in more detail below, via streams 214, 218, and 222. In some embodiments, the separation apparatus may be fluidically connected to an optional VOM removal apparatus. For example, in FIG. 2A, separation apparatus 202 is fluidically connected to optional VOM removal apparatus 210 via streams 214, 218, 222, and 224. In some embodiments, the separation apparatus is fluidically connected to a filtration apparatus, such as a filter press. For example, in FIG. 2A, separation apparatus 202 is fluidically connected to optional filtration apparatus 212 via streams 214, 218, and 228.

In some embodiments, the separation apparatus is directly fluidically connected to an ion-removal apparatus. For example, in FIG. 2A, separation apparatus 202 is directly fluidically connected to ion-removal apparatus 204, described in more detail below, via stream 214. It should be understood that the invention is not limited to embodiments in which the separation apparatus is directly fluidically connected to an ion-removal apparatus, and in some embodiments, the separation apparatus can be directly fluidically connected to one or more other unit operations. In some embodiments, the separation apparatus is directly fluidically connected to a suspended solids removal apparatus, described in more detail below. In certain embodiments, the separation apparatus is directly fluidically connected to a pH adjustment apparatus, described in more detail below. According to some embodiments, the separation apparatus is directly fluidically connected to a VOM removal apparatus, described in more detail below. In some embodiments, the separation apparatus is directly fluidically connected to a filtration apparatus, described in more detail below.

According to certain embodiments, the clean brine system comprises an optional ion-removal apparatus. The ion-removal apparatus can be configured to remove at least a portion of at least one scale-forming ion from an aqueous feed stream received by the ion-removal apparatus to produce an ion-diminished stream. Generally, the ion-diminished stream contains less of the scale-forming ion (e.g., a scale-forming cation and/or a scale-forming anion) relative to the aqueous feed stream received by the ion-removal apparatus. The use of the ion-removal apparatus to remove scale-forming ions can reduce the level of scaling within unit operations downstream of the ion-removal apparatus.

The ion-removal apparatus can be configured to remove any scale-forming ion that is desired to be removed. Those of ordinary skill in the art are familiar with scale-forming ions, which are ions that tend to form solid scale when present in concentrations exceeding their solubility levels. In some cases, the scale-forming ion is a scale-forming cation (e.g., a multivalent cation). Non-limiting examples of scale-forming cations include $Mg^{2+}$, $Ca^{2+}$, $Sr^{2+}$, and $Ba^{2+}$. In some cases, at least one scale-forming ion is a scale-forming anion (e.g., a multivalent anion). Non-limiting examples of scale-forming anions include carbonate anions ($CO_3^{2-}$), bicarbonate anions ($HCO_3^-$), sulfate anions ($SO_4^{2-}$), bisulfate anions ($HSO_4^-$), and dissolved silica (e.g., $SiO_2(OH)_2^{2-}$, $SiO(OH)_3^-$, $(SiO_3^{2-})_n$). In certain embodiments, the ion-removal apparatus is configured to remove at least a portion of at least one scale-forming ion in an aqueous feed stream while allowing a dissolved monovalent salt (e.g., NaCl) to remain dissolved in the aqueous stream transported out of the ion-removal apparatus.

In some instances, the scale-forming ions that are removed from the aqueous feed stream using the ion-removal apparatus are sparingly soluble (e.g., having a solubility of less than about 1 gram per 100 grams of water, less than about 0.1 grams per 100 grams of water, or less than about 0.01 grams per 100 grams of water (or lower) at 20° C.). Therefore, according to some embodiments, such scale-forming ions may be prone to scaling within various parts of a water treatment system. Examples of sparingly soluble salts containing scale-forming ions include, but are not limited to, calcium carbonate ($CaCO_3$), which has a solubility of about 0.000775 grams per 100 grams of water at 20° C.; calcium sulfate ($CaSO_4$), which has a solubility of about 0.264 grams per 100 grams of water at 20° C.; magnesium hydroxide ($Mg(OH)_2$), which has a solubility of about 0.0009628 grams per 100 grams of water at 20° C.; and barium sulfate ($BaSO_4$), which has a solubility of about 0.000285 grams per 100 grams of water at 20° C. The ion-removal apparatus can be configured, according to certain embodiments, such that removal of the scale-forming ions inhibits or prevents scaling of solid salts comprising the scale-forming ions during operation of the water treatment system.

In certain embodiments, the ion-removal apparatus is configured to produce at least two ion-diminished streams comprising different concentrations of one or more scale-forming ions. In some embodiments, the ion-removal apparatus is configured to produce a first ion-diminished stream comprising a first concentration of one or more scale-forming ions and a second ion-diminished stream comprising a second concentration of the one or more scale-forming ions. In some cases, the first concentration may be larger than the second concentration.

According to certain embodiments, the ion-removal apparatus is configured to produce a first ion-diminished stream in which the concentration, in milligrams per liter, of at least one scale-forming ion (e.g., $Ca^{2+}$) within the first ion-diminished stream (e.g., stream 106 in FIG. 1) is about 5000 mg/L or less, about 4000 mg/L or less, about 3000 mg/L or less, about 2500 mg/L or less, about 2000 mg/L or less, about 1800 mg/L or less, about 1500 mg/L or less, about 1000 mg/L or less, about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, or about 0.1 mg/L or less. In some embodiments, the concentration of at least one scale-forming ion within the first ion-diminished stream is in the range of about 0.1 mg/L to about 5000 mg/L, about 0.1 mg/L to about 4000 mg/L, about 0.1 mg/L to about 3000 mg/L, about 0.1 mg/L to about 2500 mg/L, about 0.1 mg/L to about 2000 mg/L, about 0.1 mg/L to about 1800 mg/L, about 0.1 mg/L to about 1500 mg/L, about 0.1 mg/L to about 1000 mg/L, about 0.1 mg/L to about 500 mg/L, about 0.1 mg/L to about 200 mg/L, about 0.1 mg/L to about 100 mg/L, about 0.1 mg/L to about 50 mg/L, about 0.1 mg/L to about 20 mg/L, about 0.1 mg/L to about 10 mg/L, about 0.1 mg/L to about 5 mg/L, about 0.1 mg/L to about 2 mg/L, or about 0.1 mg/L to about 1 mg/L. In some embodiments, the first ion-diminished stream is substantially free of at least one scale-forming ion.

In some embodiments, the ion-removal apparatus is configured to produce a first ion-diminished stream in which the total concentration, in milligrams per liter, of scale-forming ions within the first ion-diminished stream is about 5000 mg/L or less, about 4000 mg/L or less, about 3000 mg/L or less, about 2000 mg/L or less, about 1000 mg/L or less, about 500 mg/L or less, about 200 mg/L or less, 100 mg/L or less, about 50 mg/L or less, about 20 mg/L or less, about 10 mg/L or less, about 5 mg/L or less, about 2 mg/L or less, about 1 mg/L or less, or about 0.1 mg/L or less. In some embodiments, the total concentration of scale-forming ions within the first ion-diminished stream is in the range of about 0.1 mg/L to about 5000 mg/L, about 0.1 mg/L to about 4000 mg/L, about 0.1 mg/L to about 3000 mg/L, about 0.1 mg/L to about 2000 mg/L, about 0.1 mg/L to about 1000 mg/L, about 0.1 mg/L to about 500 mg/L, about 0.1 mg/L to about 200 mg/L, about 0.1 mg/L to about 100 mg/L, about 0.1 mg/L to about 50 mg/L, about 0.1 mg/L to about 20 mg/L, about 0.1 mg/L to about 20 mg/L, about 0.1 mg/L to about 10 mg/L, about 0.1 mg/L to about 5 mg/L, about 0.1 mg/L to about 2 mg/L, or about 0.1 mg/L to about 1 mg/L. In some embodiments, the first ion-diminished stream exiting the ion-removal apparatus is substantially free of scale-forming ions.

In certain embodiments, the ion-removal apparatus is configured to produce a first ion-diminished stream in which the concentration, in moles per liter (i.e., molarity), of at least one scale-forming ion within the first ion-diminished stream is at least about 5%, at least about 10%, at least about 15%, at least about 20%, at least about 25%, at least about 30%, at least about 40%, at least about 50%, at least about 60%, at least about 70%, or at least about 75% less than the concentration of the at least one scale-forming ion within the stream entering the ion-removal apparatus. In certain embodiments, the sum of the concentrations, in moles per liter, of all scale-forming ions within the first ion-diminished stream is at least about 5%, at least about 10%, at least about 15%, at least about 20%, at least about 25%, at least about 30%, at least about 40%, at least about 50%, at least about 60%, at least about 70%, or at least about 75% less than the sum of the concentrations of all scale-forming ions within the stream entering the ion-removal apparatus.

According to certain embodiments, the ion-removal apparatus is configured to produce a second ion-diminished stream in which the concentration, in milligrams per liter, of at least one scale-forming ion within the second ion-diminished stream (e.g., stream 108 in FIG. 1) is about 750 mg/L or less, about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.1 mg/L or less, or about 0 mg/L. In some embodiments, the concentration of at least one scale-forming ion within the second ion-diminished stream is in the range of about 0 mg/L to about 750 mg/L, about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, or about 0 mg/L to about 1 mg/L. In some embodiments, the second ion-diminished stream is substantially free of at least one scale-forming ion.

In some embodiments, the ion-removal apparatus is configured to produce a second ion-diminished stream in which the total concentration, in milligrams per liter, of scale-forming ions within the second ion-diminished stream is about 2600 mg/L or less, about 2500 mg/L or less, about 2000 mg/L or less, about 1800 mg/L or less, about 1500 mg/L or less, about 1000 mg/L or less, about 900 mg/L or less, about 800 mg/L or less, about 700 mg/L or less, about 600 mg/L or less, about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.1 mg/L or less, or about 0 mg/L. In some embodiments, the total concentration of scale-forming ions within the second ion-diminished stream is in the range of about 0 mg/L to about 2600 mg/L, about 0 mg/L to about 2500 mg/L, about 0 mg/L to about 2000 mg/L, about 0 mg/L to about 1800 mg/L, about 0 mg/L to about 1500 mg/L, about 0 mg/L to about 1000 mg/L, about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, or about 0 mg/L to about 1 mg/L. In some embodiments, the second ion-diminished stream exiting the ion-removal apparatus is substantially free of scale-forming ions.

In certain embodiments, the ion-removal apparatus is configured to produce a second ion-diminished stream in which the concentration, in moles per liter (i.e., molarity), of at least one scale-forming ion within the second ion-diminished stream is at least about 50%, at least about 75%, at least about 90%, at least about 95%, or at least about 99% less than the concentration of the at least one scale-forming ion within the stream entering the ion-removal apparatus. In certain embodiments, the sum of the concentrations, in moles per liter, of all scale-forming ions within the second ion-diminished stream is at least about 50%, at least about 75%, at least about 90%, at least about 95%, or at least about 99% less than the sum of the concentrations of all scale-forming ions within the stream entering the ion-removal apparatus.

In some embodiments, the concentration, in moles per liter (i.e., molarity), of at least one scale-forming ion within the second ion-diminished stream is at least about 5%, at least about 10%, at least about 20%, at least about 50%, at least about 75%, at least about 90%, or at least about 99% less than the concentration of the at least one scale forming ion within the first ion-diminished stream. In certain embodiments, the sum of the concentrations, in moles per liter, of all scale-forming ions within the second ion-diminished stream is at least about 5%, at least about 10%, at least about 20%, at least about 50%, at least about 75%, at least about 90%, or at least about 99% less than the sum of the concentrations of all scale-forming ions within the first ion-diminished stream.

In some cases, the two ion-diminished streams may be suitable for different purposes. In some embodiments, the first ion-diminished stream may be collected as a product stream. In certain embodiments, the first ion-diminished stream may be suitable for direct use in certain applications. For example, in certain cases, the first ion-diminished stream may be used as a drilling fluid and/or fracking fluid in oil and gas extraction operations. In such applications, the first ion-diminished stream may not encounter heat exchangers or other system components vulnerable to scale formation, and a relatively high concentration of one or more scale-forming ions may be acceptable. In certain embodiments, the second ion-diminished stream may be suitable for further processing in a desalination system. Accordingly, in some cases, the second ion-diminished stream may be fed to a desalination system to produce a substantially pure water stream having a lower concentration of a dissolved salt than the second ion-diminished stream and a concentrated brine stream having a higher concentration of the dissolved salt than the second ion-diminished stream. In such processing, the second ion-diminished stream may come into contact with heat exchangers and other system components vulnerable to scale formation. Accordingly, to reduce or prevent formation of scale within a desalination system, lower concentrations of one or more scale-forming ions in the second ion-diminished stream may be desirable.

A variety of types of ion-removal apparatuses may be used in the embodiments described herein. In some embodiments, the ion-removal apparatus comprises a chemical ion-removal apparatus. According to certain embodiments, the chemical ion-removal apparatus comprises one or more ion removal compositions configured to induce precipitation of at least one scale-forming ion. For example, the chemical ion-removal apparatus can be configured to remove at least one ion using caustic soda (e.g., NaOH), soda ash (e.g., $Na_2CO_3$), and/or a flocculent (e.g., an anionic polymer). In some embodiments, the one or more ion removal compositions can be configured to induce precipitation of at least one scale-forming cation. For example, when caustic soda and/or soda ash are added to a stream containing $Ca^{2+}$ and/or $Mg^{2+}$, at least a portion of $Ca^{2+}$ and/or $Mg^{2+}$ contained within the stream may be precipitated as an insoluble solid such as, for example, calcium carbonate ($CaCO_3$) and/or magnesium hydroxide ($Mg(OH)_2$). Without wishing to be bound by a particular theory, the addition of caustic soda may induce precipitation of certain scale-forming cations in a stream by increasing the pH of the stream. In some cases, carbonate salts and/or hydroxide salts of the scale-forming cations have relatively low solubility at relatively high pH levels, and increasing the pH of a stream containing scale-forming cations may induce precipitation of such carbonate salts and/or hydroxide salts of the scale-forming cations. In certain embodiments, the addition of soda ash may facilitate precipitation of carbonate salts of certain scale-forming anions by providing a supply of carbonate ions. In some embodiments, the one or more ion removal compositions can be configured to induce precipitation of at least one scale-forming anion.

In some embodiments, the one or more ion removal compositions comprise a flocculent. A flocculent generally refers to a composition that causes relatively large particles to form through aggregation of smaller particles. In some embodiments, the relatively large particles may precipitate from a solution. Non-limiting examples of suitable flocculents include ferric chloride, polyaluminum chloride, activated silica, colloidal clays (e.g., bentonite), metallic hydroxides with a polymeric structure (e.g., alum, ferric hydroxide), starches and/or starch derivatives (e.g., corn starch, potato starch, anionic oxidized starches, amine-treated cationic starches), polysaccharides (e.g., guar gum), alginates, polyacrylamides (e.g., nonionic, anionic, or cationic polyacrylamides), polyethylene-imines, polyamide-amines, polyamines, polyethylene oxide, and/or sulfonated compounds. Without wishing to be bound by a particular theory, certain flocculents may form large particles (e.g., large precipitates) by enmeshing smaller particles on formation and/or entrapping smaller particles through adhesion.

In some embodiments, the flocculent comprises a polymer. In some cases, the flocculent may be a large-chain polymer. Without wishing to be bound by a particular theory, a large-chain polymer flocculent may facilitate the formation of large particles by adhering to a plurality of smaller particles. In some cases, a large-chain polymer flocculent may facilitate the formation of large particles of increased size and/or increased mechanical strength. In some cases, the flocculent may be an anionic polymer flocculent. In some embodiments, an anionic polymer flocculent may be used to remove scale-forming cations. In some cases, the flocculent may be a cationic polymer flocculent. In some embodiments, a cationic polymer flocculent may be used to remove scale-forming anions.

It should be noted that mixtures of the above-mentioned ion removal compositions and/or other ion removal compositions may also be used. In addition, if two or more ion removal compositions are added to an aqueous feed stream, the ion removal compositions may be added in any order. According to certain embodiments, caustic soda and a polymer flocculent (e.g., an anionic polymer flocculent) may be added to an aqueous feed stream. In certain cases, caustic soda, soda ash, and a polymer flocculent (e.g., an anionic polymer flocculent) may be added to an aqueous feed stream.

Figure 4:
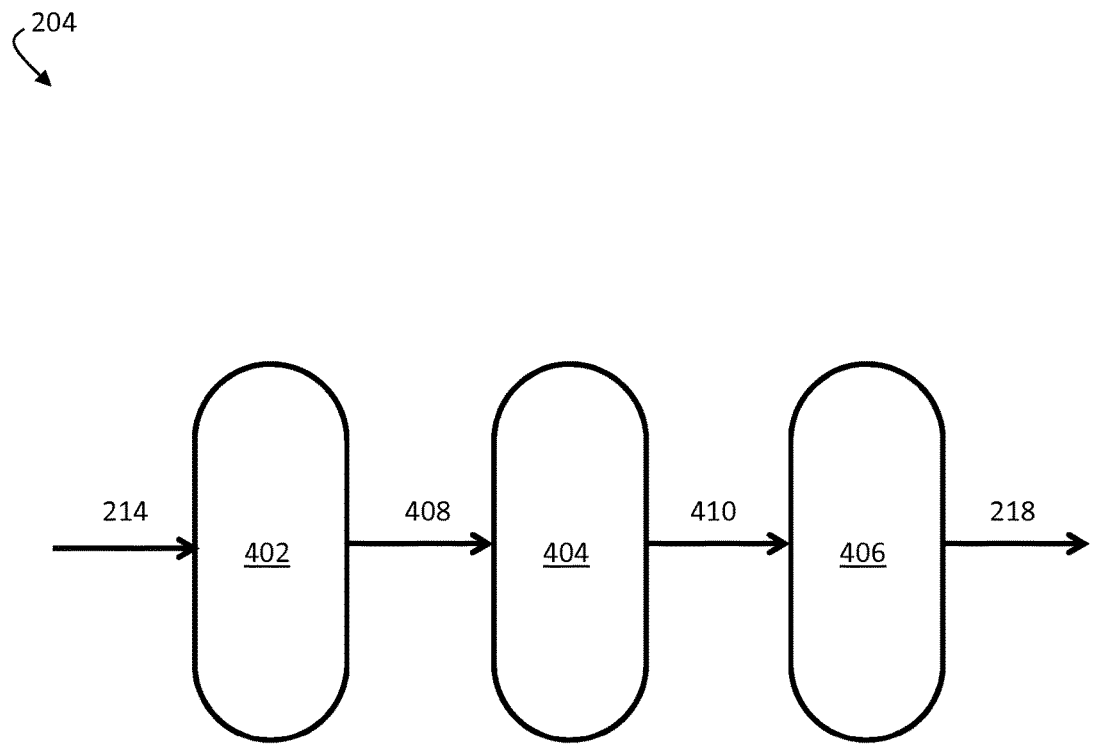
FIG. 4 shows, according to some embodiments, a schematic flow diagram of an exemplary ion-removal apparatus.

FIG. 4 shows a schematic diagram of exemplary ion-removal apparatus 204. As shown in FIG. 4, optional ion-removal apparatus 204 comprises first reaction tank 402, second reaction tank 404, and third reaction tank 406. In operation, an aqueous feed stream 214 (e.g., corresponding to immiscible-phase-diminished stream 214 in FIGS. 2 and 3) enters optional ion-removal apparatus 204. Aqueous feed stream 214 initially enters first reaction tank 402. In first reaction tank 402, a first ion removal composition (e.g., caustic soda) may be added to stream 214 to produce stream 408. Stream 408 may then be made to flow to second reaction tank 404. In second reaction tank 404, a second ion removal composition (e.g., soda ash) may be added to stream 408 to produce stream 410. Stream 410 may then be made to flow to third reaction tank 406. In third reaction tank 406, a third ion removal composition (e.g., an anionic polymer flocculent) may be added to stream 410 to produce ion-diminished stream 218. In some cases, ion-diminished stream 218 may be made to flow to another unit of the clean brine system (e.g., suspended solids removal apparatus, pH adjustment apparatus, VOM removal apparatus, filtration apparatus) for further treatment. In certain cases, ion-diminished stream 218 may be discharged from the clean brine system as clean brine. In some embodiments, ion-diminished stream 218 may be made to flow to one or more storage tanks. In some cases, ion-diminished stream 218 may be made to flow to a desalination system.

It should be noted that a chemical ion-removal apparatus may comprise any number of reaction tanks. In some embodiments, a chemical ion-removal apparatus may comprise one reaction tank, two reaction tanks, three reaction tanks, four reaction tanks, five reaction tanks, or more. In some embodiments, the residence time of an aqueous stream flowing through the reaction tanks may be relatively short. According to some embodiments, the residence time of an aqueous stream in at least one reaction tank is about 30 minutes or less, about 20 minutes or less, about 10 minutes or less, about 5 minutes or less, about 2 minutes or less, or about 1 minute or less. In certain embodiments, the residence time of an aqueous stream in each reaction tank is about 30 minutes or less, about 20 minutes or less, about 10 minutes or less, about 5 minutes or less, about 2 minutes or less, or about 1 minute or less. In some embodiments, one or more of the reaction tanks comprise an agitator.

In certain embodiments, a chemical ion-removal apparatus further comprises an optional flocculation tank positioned downstream of one or more reaction tanks. According to some embodiments, the flocculation tank may comprise an agitator (e.g., a slowly-rotating, low shear agitator). In some embodiments, conditions in the flocculation tank may be selected to increase the size of precipitates formed by chemical reactions in one or more upstream reaction tanks. For example, in some cases, a low shear agitator may be configured to promote motion of precipitates within the flocculation tank. In some cases, motion of the precipitates may cause at least some of the precipitates to collide with each other and adhere to each other, resulting in the formation of larger precipitates. In some embodiments, it may be advantageous to have larger precipitates, as they may have a reduced settling time. In some embodiments, the flocculation tank may have a relatively large volume. In some embodiments, the residence time of an aqueous stream in the flocculation tank may be about 60 minutes or less, about 50 minutes or less, about 40 minutes or less, about 35 minutes or less, about 30 minutes or less, about 25 minutes or less, about 20 minutes or less, about 15 minutes or less, or about 10 minutes or less. In some embodiments, the residence time of an aqueous stream in the flocculation tank is in the range of about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 50 minutes, about 10 minutes to about 60 minutes, about 20 minutes to about 30 minutes, about 20 minutes to about 40 minutes, about 20 minutes to about 50 minutes, about 20 minutes to about 60 minutes, about 30 minutes to about 40 minutes, about 30 minutes to about 50 minutes, or about 30 minutes to about 60 minutes.

According to some embodiments, a chemical ion-removal apparatus may be configured to produce two or more ion-diminished streams by varying the amount of one or more ion removal compositions added to an aqueous feed stream. Without wishing to be bound by a particular theory, the amount of an ion removal composition added to an aqueous stream may be proportional to the amount of one or more scale-forming ions precipitated. In certain embodiments, relatively large amounts of one or more scale-forming ions may be precipitated from an aqueous feed stream received by a chemical ion-removal apparatus by adding amounts of one or more ion removal compositions (e.g., caustic soda) in excess of what is required stoichiometrically. In some cases, adding excess amounts of one or more ion removal compositions (e.g., caustic soda) may advantageously speed up reaction kinetics and result in precipitation of a relatively large amount of one or more scale-forming ions. Accordingly, in some embodiments, a first amount of one or more ion removal compositions may be added to an aqueous feed stream to produce a first ion-diminished stream having a first concentration of scale-forming ions. In some embodiments, a second, larger amount of one or more ion removal compositions may be added to an aqueous feed stream to produce a second ion-diminished stream having a second, smaller concentration of scale-forming ions. In some embodiments, a chemical ion-removal apparatus may be configured to produce the first ion-diminished stream and the second ion-diminished stream in an alternating manner.

In certain embodiments, the ion-removal apparatus comprises an electrocoagulation apparatus. The electrocoagulation apparatus can be configured, in some embodiments, to remove at least a portion of suspended solids from an aqueous stream rather than, or in addition to, removing at least a portion of at least one scale-forming ion from the aqueous stream. Those of ordinary skill in the art are familiar with electrocoagulation, in which short wave electrolysis can be used to remove at least a portion of multivalent ions and/or suspended contaminants.

In certain embodiments, the ion-removal apparatus comprises a resin bed. The resin bed contains, according to certain embodiments, an ion-exchange resin. The resin bed can comprise, for example, an anion-selective resin bed and/or a cationic-selective resin bed. In certain embodiments, the ion-removal apparatus comprises an ion-exchange apparatus. The ion-exchange apparatus may contain, for example, an ion-exchange medium. Those of ordinary skill in the art are familiar with the function of ion-exchange media, which generally remove at least one scale-forming ion from a solution and, in some but not all cases, replace the scale-forming ion(s) with one or more monovalent ion(s). For example, in certain embodiments, the ion-exchange medium functions by contacting the aqueous solution containing the scale-forming ion(s), after which at least a portion of the scale-forming ions are captured by the ion-exchange medium and at least a portion of the monovalent ions originally contained within the ion-exchange medium are released into the aqueous solution. In some such embodiments, the ion-exchange medium comprises an ion exchange resin.

Those of ordinary skill in the art would be capable of selecting an appropriate ion removal medium (e.g., an ion-exchange medium or other ion removal medium) for use in the ion-removal apparatus based upon the types of scale-forming ions dissolved in the stream fed to the ion-removal apparatus, the concentration of said ions, and the flow rate at which one desires to operate the ion-removal apparatus, among other factors. The ion-removal apparatus can include one or more tanks and/or columns in which the ion removal operation is performed. For example, in certain embodiments, the ion-removal apparatus comprises one or more tanks into which an aqueous feed stream and the ion removal medium are transported. In one set of embodiments, the aqueous feed stream and a precipitation-inducing ion removal medium are fed to a series of tanks in which precipitation of scale-forming ions is allowed to occur. In other embodiments, a column (e.g., a packed column) can be used to perform the ion removal operation. For example, in some embodiments, the aqueous feed stream can be fed to one or more packed columns containing an ion-exchange resin or other ion removal medium, which may be used to remove at least a portion of the scale-forming ion(s) from the aqueous solution. One of ordinary skill in the art, given the present disclosure, would be capable of designing a variety of other suitable configurations for performing the ion removal steps described herein.

The ion-removal apparatus may be fluidically connected to one or more other unit operations of the clean brine system, either directly or indirectly. In some embodiments, the ion-removal apparatus may be fluidically connected to an optional suspended solids removal apparatus. For example, in FIG. 2A, ion-removal apparatus 204 is fluidically connected to optional suspended solids removal apparatus 206, described in more detail below, via stream 218. The ion-removal apparatus may be, in some embodiments, fluidically connected to an optional pH adjustment apparatus. For example, in FIG. 2A, ion-removal apparatus 204 is fluidically connected to optional pH adjustment apparatus 208, described in more detail below, via streams 218 and 222. In some embodiments, the ion-removal apparatus may be fluidically connected to an optional VOM removal apparatus. For example, in FIG. 2A, ion-removal apparatus 204 is fluidically connected to optional VOM removal apparatus 210 via streams 218, 222, and 224. In some embodiments, the ion-removal apparatus is fluidically connected to a filtration apparatus (e.g., a filter press, a vacuum filter). For example, in FIG. 2A, ion-removal apparatus 204 is fluidically connected to optional filtration apparatus 212 via streams 218 and 228.

In some embodiments, the ion-removal apparatus is directly fluidically connected to a suspended solids removal apparatus. For example, in FIG. 2A, ion-removal apparatus 204 is directly fluidically connected to suspended solids removal apparatus 206, described in more detail below, via stream 218. It should be understood that the invention is not limited to embodiments in which the ion-removal apparatus is directly fluidically connected to a suspended solids removal apparatus, and in some embodiments, the ion-removal apparatus can be directly fluidically connected to one or more other unit operations. In some embodiments, the ion-removal apparatus is directly fluidically connected to a separation apparatus. In some embodiments, the ion-removal apparatus is directly fluidically connected to a suspended solids removal apparatus, described in more detail below. In some embodiments, the ion-removal apparatus is directly fluidically connected to a pH adjustment apparatus, described in more detail below. According to some embodiments, the ion-removal apparatus is directly fluidically connected to a VOM removal apparatus, described in more detail below. In some embodiments, the ion-removal apparatus is directly fluidically connected to a filtration apparatus, described in more detail below.

In some embodiments, the clean brine systems described herein comprise an optional suspended solids removal apparatus. The suspended solids removal apparatus can be configured, according to certain embodiments, to remove at least a portion of suspended solids from an aqueous feed stream received by the suspended solids removal apparatus to produce a suspended-solids-diminished stream. Generally, the suspended-solids-diminished stream contains a smaller quantity of suspended solids than the input stream received by the suspended solids removal apparatus.

The suspended solids removal apparatus can be configured to remove any suspended solids that may be present in the stream fed to the suspended solids removal apparatus. According to certain embodiments, the suspended solids removal apparatus can be configured to remove particles that remain in suspension in water as a colloid or due to the motion of the water. In some embodiments, the suspended solids removal apparatus can be configured to remove dirt, precipitated salts, organic solids (e.g., pathogens such as bacteria, Giardia, and the like), and/or any other solid material. In some embodiments, the suspended solids that are removed by the suspended solids removal apparatus comprise particulate solids.

In certain embodiments, the suspended solids removal apparatus is configured to remove a relatively large percentage of the suspended solids from the stream fed to the suspended solids removal apparatus. For example, in some embodiments, the amount (in weight percentage, wt %) of at least one suspended solid material within the stream exiting the suspended solids removal apparatus (e.g., stream 222 in FIG. 2) is at least about 50%, at least about 75%, at least about 90%, at least about 95%, or at least about 99% less than the amount of the at least one suspended solid material within the stream entering the suspended solids removal apparatus (e.g., stream 218 in FIG. 2). In certain embodiments, the sum of the amounts of all suspended solid materials within the stream exiting the suspended solids removal apparatus is at least about 50%, at least about 75%, at least about 90%, at least about 95%, or at least about 99% less than the sum of the amounts of all suspended solid materials within the stream entering the suspended solids removal apparatus.

A variety of types of devices may be used in the suspended solids removal apparatuses described herein. In some embodiments, the suspended solids removal apparatus comprises a filter, a gravity settler, and/or a coagulant-induced flocculator. A filter generally refers a device configured to inhibit passage of certain materials (e.g., particles of a certain size) from one side of the device to the other side of the device. A gravity settler generally refers to a device that promotes separation of suspended solids from a liquid through gravity (e.g., a settling tank). A coagulant-induced flocculator generally refers to a device in which a coagulant is added to a volume of liquid to induce flocculation. Non-limiting examples of coagulants include ferric chloride, alum, ferrous sulfate, ferric sulfate, ferric chloride, cationic polymer, calcium hydroxide (e.g., lime), calcium oxide (e.g., quicklime), sodium aluminate, ferric aluminum chloride, ferric chloride sulfate, magnesium carbonate, aluminum chlorohydrate, polyaluminum chloride, polyaluminum sulfate chloride, polyaluminum silicate chloride, forms of polyaluminum chloride with organic polymers, polyferric sulfate and ferric salts with polymers, and/or polymerized aluminum-iron blends.

According to some embodiments, the gravity settler comprises a clarifier. A clarifier generally refers to a tank (e.g., a settling tank) that is configured for substantially continuous removal of solids. In some embodiments, the clarifier is an inclined-plate clarifier (e.g., a lamella clarifier). An inclined-plate clarifier generally refers to a device comprising a plurality of inclined plates. In operation, an aqueous stream may enter the inclined-plate clarifier, and solid particles may begin to settle on one or more of the inclined plates. In some cases, when a solid particle settles on an inclined plate, it adheres to other particles that have settled on the plate, and the particles slide down the inclined plate to the bottom of the clarifier, where they are collected as a solid-containing stream. In some embodiments, the solid-containing stream may be transported to a filtration apparatus, as described in further detail herein. In certain embodiments, the remaining water may exit the clarifier as a suspended-solids-diminished stream.

According to some embodiments, the suspended solids removal apparatus comprises a filter. In some embodiments, the filter is a polishing filter. A polishing filter generally refers to a filter configured to prevent passage of relatively small particles and/or remove low concentrations of dissolved material. Examples of a suitable polishing filter include, but are not limited to, a granular bed filter (e.g., a media filter) and a bag filter. A granular bed filter refers to a filter that comprises one or more types of granular filtration media (e.g., sand, crushed anthracite coal, garnet sand, granular activated carbon, diatomaceous earth medium). In some embodiments, the polishing filter is configured to remove particles having an average diameter of at least about 0.1 micron, at least about 0.5 micron, at least about 1 micron, at least about 2 microns, at least about 5 microns, at least about 10 microns, at least about 15 microns, at least about 20 microns, or at least about 25 microns. In some embodiments, the polishing filter is configured to remove particles having an average diameter in the range of about 0.1 micron to about 25 microns, about 0.1 micron to about 20 microns, about 0.1 micron to about 15 microns, about 0.1 micron to about 10 microns, about 0.1 micron to about 5 microns, about 0.1 micron to about 2 microns, about 0.1 micron to about 1 micron, about 0.1 micron to about 0.5 micron, about 1 micron to about 25 microns, about 1 micron to about 20 microns, about 1 micron to about 15 microns, about 1 micron to about 10 microns, about 1 micron to about 5 microns, about 1 micron to about 2 microns, about 10 microns to about 25 microns, about 10 microns to about 20 microns, or about 10 microns to about 15 microns.

The suspended solids removal apparatus may be fluidically connected to one or more other unit operations of the clean brine system, either directly or indirectly. In some embodiments, the suspended solids removal apparatus may be fluidically connected to an optional pH adjustment apparatus. For example, in FIG. 2A, suspended solids removal apparatus 206 is fluidically connected to optional pH adjustment apparatus 208, described in more detail below, via stream 222. In some embodiments, the suspended solids removal apparatus may be fluidically connected to an optional VOM removal apparatus. For example, in FIG. 2A, suspended solids removal apparatus 206 is fluidically connected to optional VOM removal apparatus 210 via streams 222 and 224. In some embodiments, the suspended solids removal apparatus is fluidically connected to a filtration apparatus (e.g., a filter press, a vacuum filter). For example, in FIG. 2A, suspended solids removal apparatus 206 is fluidically connected to optional filtration apparatus 212 via stream 228.

In some embodiments, the suspended solids removal apparatus is directly fluidically connected to an ion-removal apparatus. For example, in FIG. 2A, suspended solids removal apparatus 206 is directly fluidically connected to ion-removal apparatus 204 via stream 218. It should be understood that the invention is not limited to embodiments in which the suspended solids removal apparatus is directly fluidically connected to an ion-removal apparatus, and in some embodiments, the suspended solids removal apparatus can be directly fluidically connected to one or more other unit operations. In some embodiments, the suspended solids removal apparatus is directly fluidically connected to a separation apparatus. In some embodiments, the suspended solids removal apparatus is directly fluidically connected to an ion-removal apparatus. In some embodiments, the suspended solids removal apparatus is directly fluidically connected to a pH adjustment apparatus, described in more detail below. According to some embodiments, the suspended solids removal apparatus is directly fluidically connected to a VOM removal apparatus, described in more detail below. In some embodiments, the suspended solids removal apparatus is directly fluidically connected to a filtration apparatus, described in more detail below.

In certain embodiments, the clean brine apparatus comprises an optional pH adjustment apparatus configured to receive an aqueous input stream and increase or decrease the pH of the aqueous input stream to produce a pH-adjusted stream. In certain embodiments, increasing or decreasing the pH of the aqueous input stream can be performed without dissolving any particles that precipitated (e.g., due to addition of an ion removal composition in the ion-removal apparatus). In some embodiments, the pH of the aqueous input stream may be adjusted to a pH in the range of about 6 to about 8, about 6.5 to about 7.5, about 6.8 to about 7.2, or about 6.9 to about 7.1. In some embodiments, the pH-adjusted stream has a pH of about 7.0.

In some embodiments, the pH adjustment apparatus is configured to reduce the pH of the aqueous input stream. In certain embodiments, reducing the pH of the aqueous input stream can be performed in order to inhibit scale-forming ions from precipitating. In some embodiments, the pH of an aqueous feed stream may be reduced by adding a pH-adjusting composition to the feed stream. For example, in certain embodiments, an acid may be added to the feed stream to reduce the pH of the stream. Non-limiting examples of suitable acids include hydrochloric acid, sulfuric acid, phosphoric acid, nitric acid, and/or maleic acid. In some embodiments, a base may be added to the feed stream to increase the pH of the stream. Non-limiting examples of suitable bases include caustic soda, potassium hydroxide, carbon dioxide, calcium hydroxide (e.g., lime), and/or calcium oxide (e.g., quicklime).

In some embodiments, the pH adjustment apparatus comprises one or more reaction tanks. The reaction tanks may be configured to facilitate the reaction of an aqueous stream and one or more reagents (e.g., a pH adjustment composition). In some cases, for example, one or more reaction tanks comprise a pH adjustment composition inlet and/or an agitator. In some cases, one or more reaction tanks comprise one or more pH sensors. In certain embodiments, one or more reaction tanks may comprise two or more pH sensors. In certain cases, the pH adjustment apparatus may further comprise a pH adjustment composition tank fluidically connected (e.g., directly fluidically connected) to one or more reaction tanks. The pH adjustment composition tank may, for example, be configured to contain an amount of the pH adjustment composition. In some cases, the pH adjustment composition may comprise an acid (e.g., a strong acid) or a base (e.g., a strong base) having a relatively high concentration. In some cases, the pH adjustment composition tank may be a double-walled tank. It may be advantageous, in some cases, for the pH adjustment composition tank to be double-walled to reduce the risk of injury in the case of a leak. For example, a leak in a first wall of a double-walled tank may be contained by the second wall of the double-walled tank. In some cases, the pH adjustment system further comprises a vapor containment system fluidically connected to the pH adjustment composition tank. In some cases, the vapor containment system may comprise a water-containing tank. In certain cases, the water-containing tank may comprise an amount of water, and vapor from the pH adjustment composition tank may be bubbled through the water of the water-containing tank. The pH adjustment apparatus may further comprise one or more conduits connecting various components of the pH adjustment apparatus. In some cases, one or more conduits (e.g., conduits connecting the pH adjustment composition tank and one or more reaction tanks) may be double-walled.

Figure 5:
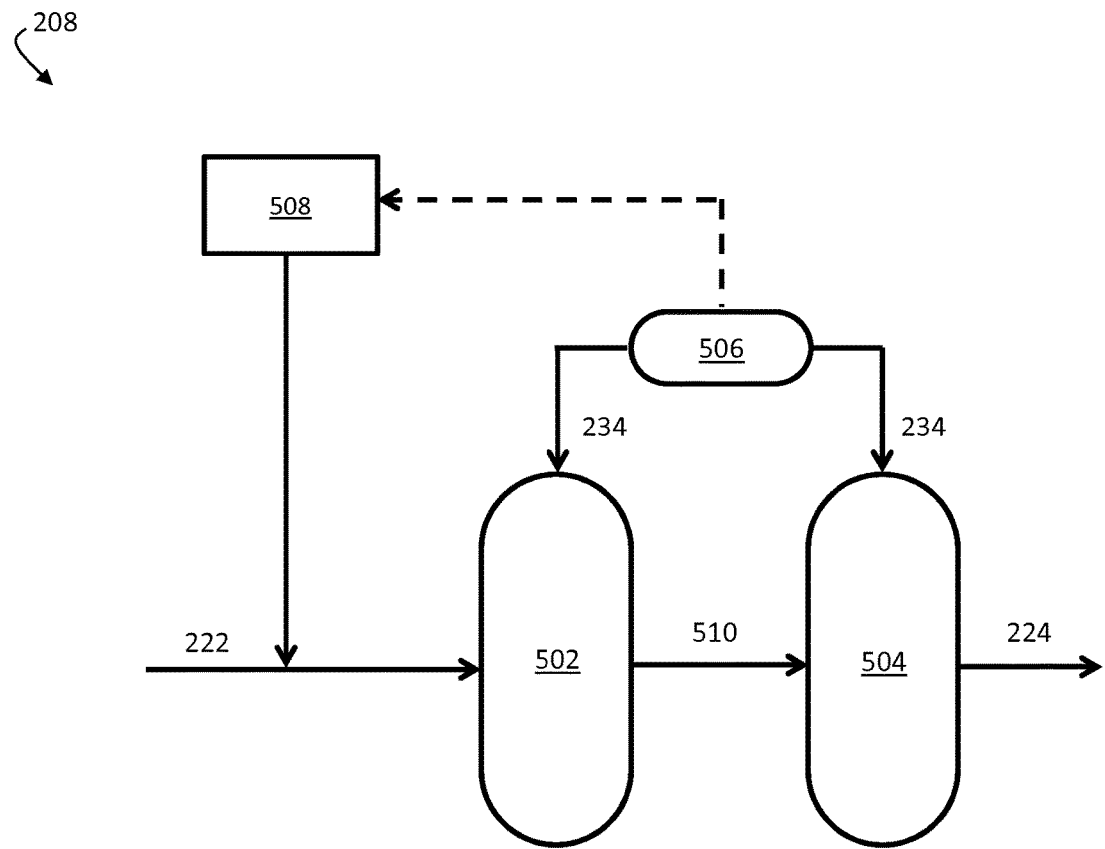
FIG. 5 shows, according to some embodiments, a schematic flow diagram of an exemplary pH adjustment apparatus.

A schematic diagram of an exemplary pH adjustment apparatus is shown in FIG. 5. In FIG. 5, pH adjustment apparatus 500 comprises first reaction tank 502, second reaction tank 504, pH adjustment composition tank 506, and water-containing tank 508. In some cases, pH adjustment composition tank 506 may be a double-walled tank, a first conduit fluidically connecting pH adjustment composition tank 506 and first reaction tank 502 may be a double-walled pipe, and a second conduit fluidically connecting pH adjustment composition tank 506 and second reaction tank 504 may be a double-walled pipe. In some cases, first reaction tank 502 and/or second reaction tank 504 may comprise an agitator and/or at least one pH sensor.

In some embodiments, a first amount of pH-adjusting composition stream 234 is added to aqueous input stream 222 in first reaction tank 502 to form stream 510. Stream 510 may be directed to flow to second reaction tank 504, where a second amount of pH-adjusting composition stream 234 may be added to stream 510. It should be noted that in some cases, a first pH-adjusting composition may be added to first reaction tank 502, and a second, different pH-adjusting composition may be added to second reaction tank 504. After an amount of a pH-adjusting composition has been added to stream 510 in second reaction tank 504, the stream may be directed to exit the pH adjustment apparatus as pH-adjusted stream 224.

In some cases, vapor from pH adjustment composition tank 506 is bubbled through water-containing tank 508 due to the volatility of the pH-adjusting composition. In certain embodiments, as the pH of the water in tank 508 is decreased (e.g., the water becomes more acidic) or increased (e.g., the water becomes more basic), the water is directed to flow to first reaction tank 502 for pH adjustment.

The pH adjustment apparatus may be fluidically connected to one or more other unit operations of the clean brine system, either directly or indirectly. In some embodiments, the pH adjustment apparatus may be fluidically connected to a VOM removal apparatus. For example, in FIG. 2A, pH adjustment apparatus 208 is directly fluidically connected to optional VOM removal apparatus 210 via stream 224. In some embodiments, the pH adjustment apparatus is fluidically connected to a filtration apparatus (e.g., a filter press, a vacuum filter). For example, in FIG. 2A, pH adjustment apparatus 208 is fluidically connected to optional filtration apparatus 212 via streams 222 and 228.

In some embodiments, the pH adjustment apparatus is directly fluidically connected to a VOM removal apparatus. For example, in FIG. 2A, pH adjustment apparatus 208 is directly fluidically connected to VOM removal apparatus 210, described in more detail below, via stream 224. It should be understood that the invention is not limited to embodiments in which the pH adjustment apparatus is directly fluidically connected to a VOM removal apparatus, and in some embodiments, the pH adjustment apparatus can be directly fluidically connected to one or more other unit operations. In some embodiments, the pH adjustment apparatus is directly fluidically connected to a separation apparatus. In some embodiments, the pH adjustment apparatus is directly fluidically connected to an ion-removal apparatus. In some embodiments, the pH adjustment apparatus is directly fluidically connected to a suspended solids removal apparatus. In some embodiments, the pH adjustment apparatus is directly fluidically connected to a filtration apparatus, described in more detail below.

In certain embodiments, the water treatment system comprises an optional volatile organic material (VOM) removal apparatus. The VOM removal apparatus can be configured to remove at least a portion of VOM from an input stream received by the VOM removal apparatus to produce a VOM-diminished stream. Generally, the VOM-diminished stream contains VOM in an amount that is less that the amount of VOM in the input stream received by the VOM removal apparatus.

In certain embodiments, the volatile organic material has a boiling point of less than or equal to 450° C. at 1 atmosphere. VOM includes volatile organic compounds (VOCs) and semi-volatile organic compounds (SVOCs). Examples of VOCs that can be at least partially removed by the VOM removal apparatus include, but are not limited to, acetone; 1,1,1,2-tetrachloroethane; 1,1,1-trichloroethane; 1,1,2,2-tetrachloroethane; 1,1,2-trichloroethane; 1,1-dichloroethane; 1,1-dichloroethene; 1,1-dichloropropene; 1,2,3-trichlorobenzene; 1,2,3-trichloropropane; 1,2,4-trichlorobenzene; 1,2,4-trimethylbenzene; 1,2-dibromo-3-chloropropane; 1,2-dibromoethane; 1,2-dichlorobenzene; 1,2-dichloroethane; 1,2-dichloropropane; 1,3,5-trimethylbenzene; 1,3-dichlorobenzene; 1,3-dichloropropane; 1,4-dichlorobenzene; 2,2-dichloropropane; 2-butanone; 2-chloroethyl vinyl ether; 2-chlorotoluene; 2-hexanone; 4-chlorotoluene; 4-methyl-2-pentanone; benzene; bromobenzene; bromochloromethane; bromodichloromethane; bromoform; carbon disulfide; carbon tetrachloride; chlorobenzene; chloroethane; chloroform; cis-1,2-dichloroethene; cis-1,3-dichloropropene; dibromochloromethane; dibromomethane; dichlorodifluoromethane; ethylbenzene; hexachlorobutadiene; isopropylbenzene; m-xylenes; p-xylenes; bromomethane; chloromethane; methylene chloride; n-butylbenzene; n-propylbenzene; naphthalene; o-xylene; p-Isopropyltoluene; sec-butylbenzene; styrene; tert-butylbenzene; tetrachloroethene; toluene; trans-1,2-dichloroethene; trans-1,3-dichloropropene; trichloroethene; trichlorofluoromethane; vinyl acetate; and vinyl chloride. Examples of SVOCs that can be at least partially removed by the VOM removal apparatus include, but are not limited to, 2,4,5-trichlorophenol; 2,4,6-trichlorophenol; 2,4-dichlorophenol; 2,4-dimethylphenol; 2,4-dinitrophenol; 2,4-dinitrotoluene; 2,6-dinitrotoluene; 2-chloronaphthalene; 2-chlorophenol; 2-methylnaphthalene; 2-methylphenol; 2-nitroaniline; 2-nitrophenol; 3,3'-dichlorobenzidine; 3-nitroaniline; 4,6-dinitro-2-methylphenol; 4-bromophenyl phenyl ether; 4-chloro-3-methylphenol; 4-chloroaniline; 4-chlorophenyl phenyl ether; 3 & 4-methylphenol; 4-nitroaniline; 4-nitrophenol; acenaphthene; acenaphthylene; anthracene; benzo(a)anthracene; benzo(a)pyrene; benzo(b)fluoranthene; benzo(g,h,i)perylene; benzo(k)fluoranthene; benzoic acid; benzyl alcohol; bis(2-chloroethoxy)methane; bis(2-chloroethyl)ether; bis(2-chloroisopropyl)ether; bis(2-ethylhexyl)phthalate; butyl benzyl phthalate; chrysene; di-n-butyl phthalate; di-n-octyl phthalate; dibenz(a,h)anthracene; dibenzofuran; diethyl phthalate; dimethyl phthalate; fluoranthene; fluorene; hex achlorobenzene; hexachlorocyclopentadiene; hexachloroethane; indeno(1,2,3-cd)pyrene; isophorone; n-nitroso-di-n-propylamine; n-nitrosodiphenylamine; nitrobenzene; pentachlorophenol; phenanthrene; phenol; and pyrene.

Referring back to FIG. 2A, clean brine system 102 comprises optional VOM removal apparatus 210. VOM removal apparatus 210 can be configured to remove at least a portion of VOM from input stream 224 received by VOM removal apparatus 210 to produce a VOM-diminished stream 108, which contains less of the VOM relative to input stream 224 received by VOM removal apparatus 210. The VOM removal apparatus can also produce a stream that is enriched in VOM relative to the stream fed to the VOM removal apparatus. For example, in FIG. 2A, VOM removal apparatus 210 can be configured to produce stream 226, which is enriched in VOM relative to stream 224.

In certain embodiments, the VOM removal apparatus is configured to remove a relatively large percentage of the VOM from the stream fed to the VOM removal apparatus. For example, in some embodiments, the amount (in weight percentage, wt %) of at least one VOM within the stream exiting the VOM removal apparatus (e.g., stream 108 in FIG. 2) is at least about 50%, at least about 75%, at least about 90%, at least about 95%, or at least about 99% less than the amount of the at least one VOM within the stream entering the VOM removal apparatus (e.g., stream 224 in FIG. 2). In certain embodiments, the sum of the amounts of all VOM within the stream exiting the VOM removal apparatus is at least about 50%, at least about 75%, at least about 90%, at least about 95%, or at least about 99% less than the sum of the amounts of all VOM within the stream entering the VOM removal apparatus.

In some embodiments, the VOM removal apparatus does not include any sources of thermal energy. For example, according to certain embodiments, the VOM removal apparatus does not include any steam input streams.

The VOM removal apparatus may be fluidically connected to one or more other unit operations of the water treatment apparatus, either directly or indirectly. In certain embodiments, the VOM removal apparatus may also be, in certain embodiments, fluidically connected to an optional separation apparatus. For example, in FIG. 2A, VOM removal apparatus 210 is fluidically connected to optional separation apparatus 202 via streams 214, 218, 222, and 224. The VOM removal apparatus may be, in some embodiments, fluidically connected to an optional ion-removal apparatus. For example, in FIG. 2A, VOM removal apparatus 210 is fluidically connected to optional ion-removal apparatus 204 via streams 218, 222, and 224. In some embodiments, the VOM removal apparatus may be fluidically connected to an optional suspended solids removal apparatus. For example, in FIG. 2A, VOM removal apparatus 210 is fluidically connected to suspended solids removal apparatus 206 via streams 222 and 224. In certain embodiments, the VOM removal apparatus may be fluidically connected to an optional pH adjustment apparatus. For example, in FIG. 2A, VOM removal apparatus 210 is fluidically connected to optional pH reduction apparatus 208 via stream 224. In some embodiments, the VOM removal apparatus may be fluidically connected to an optional filtration apparatus (e.g., a filter press, a vacuum filter). For example, in FIG. 2A, VOM removal apparatus 210 is fluidically connected to optional filtration apparatus 212 via streams 222, 224, and 228.

In some embodiments, the VOM removal apparatus can be directly fluidically connected to a pH adjustment apparatus. For example, in FIG. 2A, VOM removal apparatus 210 is directly fluidically connected to pH reduction apparatus 208 via stream 224. In some embodiments, the VOM removal apparatus can be directly fluidically connected to one or more other unit operations. In some embodiments, the VOM removal apparatus is directly fluidically connected to a separation apparatus. In some embodiments, the VOM removal apparatus is directly fluidically connected to an ion-removal apparatus. In some embodiments, the VOM removal apparatus is directly fluidically connected to a suspended solids removal apparatus. In some embodiments, the VOM removal apparatus is directly fluidically connected to a filtration apparatus.

A variety of types of VOM removal apparatuses may be used in the embodiments described herein. In some embodiments, the VOM removal apparatus comprises a carbon bed filter and/or an air stripper. In some embodiments, the air stripper comprises a packed bed stripper, a low-profile air stripper, and/or an aeration stripper. In certain embodiments, the carbon bed comprises activated carbon.

According to some embodiments, the VOM removal apparatus is configured to remove at least a portion of VOM from at least partially desalinated water. For example, in some embodiments, the input stream received by the VOM removal apparatus comprises at least a portion of a water-containing stream produced by the desalination system that contains a lower concentration of the dissolved salt than the stream received by the desalination system, as described in more detail below.

According to some embodiments, the clean brine system comprises an optional filtration apparatus. In some embodiments, the filtration apparatus may be configured to remove at least a portion of water from a solid-containing stream to form a substantially solid material and a filtered liquid stream. The substantially solid material may, in some cases, comprise at least a portion of a precipitated salt (e.g., a monovalent salt, a divalent salt). In certain embodiments, the substantially solid material may be a filter cake. In some embodiments, the filter cake may comprise a plurality of solid particles, wherein at least a portion of the solid particles are in direct contact with another solid particle. In certain cases, at least about 60%, at least about 70%, at least about 80%, at least about 90%, at least about 95%, or at least about 99% of the solid particles in the filter cake are in direct contact with another solid particle. In some cases, the filter cake has a relatively low liquid content. In some embodiments, the filter cake has a liquid content of about 90 wt % or less, about 85 wt % or less, about 80 wt % or less, about 75 wt % or less, about 70 wt % or less, about 65 wt % or less, about 60 wt % or less, about 55 wt % or less, about 50 wt % or less, about 40 wt % or less, about 30 wt % or less, about 25 wt % or less, about 20 wt % or less, about 15 wt % or less, or about 10 wt % or less. In certain embodiments, the filter cake has a liquid content in the range of about 10 wt % to about 90 wt %, about 10 wt % to about 85 wt %, about 10 wt % to about 80 wt %, about 10 wt % to about 75 wt %, about 10 wt % to about 70 wt %, about 10 wt % to about 60 wt %, about 10 wt % to about 55 wt %, about 10 wt % to about 50 wt %, about 10 wt % to about 40 wt %, about 10 wt % to about 30 wt %, or about 10 wt % to about 20 wt %.

In some cases, the filtration apparatus comprises a filter (e.g., a vacuum drum filter or a filter press) configured to at least partially separate a precipitated salt from the remainder of a suspension containing the precipitated salt. In some such embodiments, at least a portion of the liquid within the solid-containing stream can be transported through the filter, leaving behind solid precipitated salt (e.g., a filter cake). As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt. In some cases, for example, the filtration apparatus may be fluidically connected (e.g., directly fluidically connected) to the suspended solids removal apparatus. For example, in certain embodiments, a solid-containing stream may be flowed (e.g., pumped) from the suspended solids removal apparatus (e.g., a clarifier) to the filtration apparatus.

In some embodiments, a solid-containing stream from the suspended solids removal apparatus may be pumped to the filtration apparatus by one or more pumps (e.g., air diaphragm pumps). In certain embodiments, the one or more pumps may initially pump at a relatively low pressure and may automatically increase the pressure as flow rate drops due to collection of solids in the filtration apparatus. In some cases, such a process may be advantageous. For example, in embodiments where the filtration apparatus comprises one or more filter presses, such a process may advantageously reduce filter cloth blinding (e.g., embedding of particles in a filter cloth) and result in formation of more consistent filter cakes. In certain cases, a liquid component of the solid-containing stream may be rejoined with other liquid streams in the clean brine system after passing through the filtration apparatus.

In some cases, one or more buffer tanks may be positioned between the suspended solids removal apparatus and the filtration apparatus. The presence of one or more buffer tanks between the suspended solids removal apparatus and the filtration apparatus may, in some cases, advantageously provide buffer volume in the event that components of the filtration apparatus (e.g., one or more filter presses) are undergoing a cleaning cycle.

In some cases, a component of the filtration apparatus (e.g., a filter press) may undergo a cleaning cycle when it is full. In certain cases, a filtration apparatus component may be considered to be full when the flow rate drops below a threshold level at a certain pumping pressure. In certain cases, when a filtration apparatus undergoes a cleaning cycle, flow may be rerouted to one or more buffer tanks to continue fluid circulation and prevent solid buildup. In some cases, the cleaning cycle begins by pumping clean brine into the filtration apparatus component to flush out soft filter cake. The filtration apparatus component may then be blown down. In some cases, the filter cake may be dried. For example, in certain cases, the filter cake may be air dried by blowing compressed air through the cake. It may be advantageous in some cases for the filter cake to be air dried in order to reduce its liquid content. In some cases, compacted filter cake may be stored and/or disposed (e.g., in a dumpster).

According to certain embodiments, substantially solid material (e.g., filter cake) produced in a clean brine system may be used to form a brine solution having a density of at least about 9 pounds/gallon. In some cases, substantially solid material produced in a clean brine system may be used to form an ultra-high-density brine solution (e.g., a brine solution having a density of at least about 11.7 pounds/gallon). In certain embodiments, the brine solution has a density (e.g., measured at about 60° F.) of at least about 9 pounds/gallon, at least about 9.5 pounds/gallon, at least about 10 pounds/gallon, at least about 10.5 pounds/gallon, at least about 11 pounds/gallon, at least about 11.5 pounds/gallon, at least about 11.7 pounds/gallon, at least about 11.8 pounds/gallon, at least about 12 pounds/gallon, at least about 12.5 pounds/gallon, at least about 13 pounds/gallon, at least about 13.2 pounds/gallon, at least about 13.5 pounds/gallon, at least about 14 pounds/gallon, at least about 14.5 pounds/gallon, or at least about 15 pounds/gallon. In some embodiments, the brine solution has a density (e.g., measured at about 60° F.) in the range of about 9 pounds/gallon to about 9.5 pounds/gallon, about 9 pounds/gallon to about 10 pounds/gallon, about 9 pounds/gallon to about 10.5 pounds/gallon, about 9 pounds/gallon to about 11 pounds/gallon, about 9 pounds/gallon to about 11.7 pounds/gallon, about 9 pounds/gallon to about 11.8 pounds/gallon, about 9 pounds/gallon to about 12 pounds/gallon, about 9 pounds/gallon to about 12.5 pounds/gallon, about 9 pounds/gallon to about 13 pounds/gallon, about 9 pounds/gallon to about 13.2 pounds/gallon, about 9 pounds/gallon to about 13.5 pounds/gallon, about 9 pounds/gallon to about 14 pounds/gallon, about 9 pounds/gallon to about 14.5 pounds/gallon, about 9 pounds/gallon to about 15 pounds/gallon, about 9.5 pounds/gallon to about 11.8 pounds/gallon, about 10 pounds/gallon to about 11 pounds/gallon, about 10 pounds/gallon to about 11.7 pounds/gallon, about 10 pounds/gallon to about 11.8 pounds/gallon, about 10 pounds/gallon to about 12 pounds/gallon, about 10 pounds/gallon to about 12.5 pounds/gallon, about 10 pounds/gallon to about 13 pounds/gallon, about 10 pounds/gallon to about 13.2 pounds/gallon, about 10 pounds/gallon to about 13.5 pounds/gallon, about 10 pounds/gallon to about 14 pounds/gallon, about 10 pounds/gallon to about 14.5 pounds/gallon, about 10 pounds/gallon to about 15 pounds/gallon, about 10.5 pounds/gallon to about 11.8 pounds/gallon, about 11 pounds/gallon to about 11.7 pounds/gallon, about 11 pounds/gallon to about 11.8 pounds/gallon, about 11 pounds/gallon to about 12 pounds/gallon, about 11 pounds/gallon to about 12.5 pounds/gallon, about 11 pounds/gallon to about 13 pounds/gallon, about 11 pounds/gallon to about 13.2 pounds/gallon, about 11 pounds/gallon to about 13.5 pounds/gallon, about 11 pounds/gallon to about 14 pounds/gallon, about 11 pounds/gallon to about 14.5 pounds/gallon, about 11 pounds/gallon to about 15 pounds/gallon, about 11.7 pounds/gallon to about 12 pounds/gallon, about 11.7 pounds/gallon to about 12.5 pounds/gallon, about 11.7 pounds/gallon to about 13 pounds/gallon, about 11.7 pounds/gallon to about 13.2 pounds/gallon, about 11.7 pounds/gallon to about 13.5 pounds/gallon, about 11.7 pounds/gallon to about 14 pounds/gallon, about 11.7 pounds/gallon to about 14.5 pounds/gallon, about 11.7 pounds/gallon to about 15 pounds/gallon, about 12 pounds/gallon to about 12.5 pounds/gallon, about 12 pounds/gallon to about 13 pounds/gallon, about 12 pounds/gallon to about 13.2 pounds/gallon, about 12 pounds/gallon to about 13.5 pounds/gallon, about 12 pounds/gallon to about 14 pounds/gallon, about 12 pounds/gallon to about 14.5 pounds/gallon, about 12 pounds/gallon to about 15 pounds/gallon, about 13 pounds/gallon to about 14 pounds/gallon, about 13 pounds/gallon to about 14.5 pounds/gallon, about 13 pounds/gallon to about 15 pounds/gallon, about 14 pounds/gallon to about 15 pounds/gallon, or about 14 pounds/gallon to about 15 pounds/gallon.

In some cases, the density of the brine solution is measured at a temperature of about 120° F. or less, about 100° F. or less, about 80° F. or less, about 72° F. or less, about 68° F. or less, about 60° F. or less, about 50° F. or less, or about 40° F. or less. In some embodiments, the density of the brine solution is measured at a temperature of at least about 40° F., at least about 50° F., at least about 60° F., at least about 68° F., at least about 72° F., at least about 80° F., at least about 100° F., or at least about 120° F. In some embodiments, the density of the brine solution is measured at a temperature in the range of about 40° F. to about 120° F., about 40° F. to about 100° F., about 40° F. to about 80° F., about 40° F. to about 72° F., about 40° F. to about 68° F., about 40° F. to about 60° F., about 40° F. to about 50° F., about 60° F. to about 120° F., about 60° F. to about 100° F., about 60° F. to about 80° F., about 60° F. to about 72° F., or about 60° F. to about 68° F.

In some cases, the brine solution comprises one or more dissolved salts. Non-limiting examples of suitable dissolved salts include sodium chloride (NaCl), calcium chloride ($CaCl_2$), and/or calcium nitrate ($Ca(NO_3)_2$). In some cases, the brine solution has a concentration of at least one dissolved salt of at least about 10,000 mg/L, at least about 50,000 mg/L, at least about 80,000 mg/L, at least about 85,000 mg/L, at least about 90,000 mg/L, at least about 100,000 mg/L, at least about 150,000 mg/L, at least about 180,000 mg/L, at least about 200,000 mg/L, at least about 250,000 mg/L, at least about 270,000 mg/L, at least about 300,000 mg/L, at least about 350,000 mg/L, at least about 380,000 mg/L, at least about 400,000 mg/L, at least about 450,000 mg/L, at least about 480,000 mg/L, or at least about 500,000 mg/L. In some embodiments, the brine solution has a concentration of at least one dissolved salt in the range of about 10,000 mg/L to about 500,000 mg/L, about 50,000 mg/L to about 500,000 mg/L, about 80,000 mg/L to about 500,000 mg/L, about 85,000 mg/L to about 500,000 mg/L, about 90,000 mg/L to about 500,000 mg/L, about 100,000 mg/L to about 500,000 mg/L, about 150,000 mg/L to about 500,000 mg/L, about 180,000 mg/L to about 500,000 mg/L, about 200,000 mg/L to about 500,000 mg/L, about 250,000 mg/L to about 500,000 mg/L, about 280,000 mg/L to about 500,000 mg/L, about 300,000 mg/L to about 500,000 mg/L, about 350,000 mg/L to about 500,000 mg/L, about 380,000 mg/L to about 500,000 mg/L, about 400,000 mg/L to about 500,000 mg/L, or about 450,000 mg/L to about 500,000 mg/L. The concentration of a dissolved salt generally refers to the combined concentrations of the cation and anion of the salt. For example, the concentration of dissolved NaCl would refer to the concentration of sodium ions ($Na^+$) in addition to the concentration of chloride ions ($Cl^-$). The concentration of a dissolved salt may be measured according to any method known in the art. For example, suitable methods for measuring the concentration of a dissolved salt include inductively coupled plasma (ICP) spectroscopy (e.g., inductively coupled plasma optical emission spectroscopy). As one non-limiting example, an Optima 8300 ICP-OES spectrometer may be used.

In some cases, the brine solution has a total dissolved salt concentration of at least about 50,000 mg/L, at least about 80,000 mg/L, at least about 85,000 mg/L, at least about 90,000 mg/L, at least about 100,000 mg/L, at least about 150,000 mg/L, at least about 180,000 mg/L, at least about 200,000 mg/L, at least about 250,000 mg/L, at least about 270,000 mg/L, at least about 300,000 mg/L, at least about 350,000 mg/L, at least about 380,000 mg/L, at least about 400,000 mg/L, at least about 450,000 mg/L, at least about 480,000 mg/L, or at least about 500,000 mg/L. In some embodiments, the brine solution has a total dissolved salt concentration in the range of about 50,000 mg/L to about 500,000 mg/L, about 80,000 mg/L to about 500,000 mg/L, about 85,000 mg/L to about 500,000 mg/L, about 90,000 mg/L to about 500,000 mg/L, about 100,000 mg/L to about 500,000 mg/L, about 150,000 mg/L to about 500,000 mg/L, about 180,000 mg/L to about 500,000 mg/L, about 200,000 mg/L to about 500,000 mg/L, about 250,000 mg/L to about 500,000 mg/L, about 280,000 mg/L to about 500,000 mg/L, about 300,000 mg/L to about 500,000 mg/L, about 350,000 mg/L to about 500,000 mg/L, about 380,000 mg/L to about 500,000 mg/L, about 400,000 mg/L to about 500,000 mg/L, or about 450,000 mg/L to about 500,000 mg/L. The total dissolved salt concentration generally refers to the combined concentrations of all the cations and anions of dissolved salts that are present. As a simple, non-limiting example, in a water stream comprising dissolved NaCl and dissolved $MgSO_4$, the total dissolved salt concentration would refer to the total concentrations of the $Na^+$, $Cl^-$, $Me^{2+}$, and $SO_4^{2-}$ ions. Total dissolved salt concentration may be measured according to any method known in the art. For example, a non-limiting example of a suitable method for measuring total dissolved salt concentration is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The total dissolved salt concentration of the sample may be obtained by dividing the mass of the total dissolved solids by the volume of the original sample.

In certain embodiments, the brine solution may be formed by adding an amount of one or more acids to at least a portion of the substantially solid material. Non-limiting examples of suitable acids include hydrochloric acid (HCl) and nitric acid ($HNO_3$).

In a particular embodiment, at least a portion of the substantially solid material formed in a clean brine system may comprise calcium carbonate ($CaCO_3$). According to some embodiments, a concentrated brine comprising dissolved calcium chloride ($CaCl_2$) may be produced by adding an amount of hydrochloric acid to the substantially solid material from the clean brine system. The addition of hydrochloric acid may, in some cases, result in the production of aqueous calcium chloride, water, and $CO_2$ (which separates from the aqueous $CaCl_2$ and $H_2O$). In some cases, a brine solution comprising dissolved $CaCl_2$ may be formed. In some embodiments, addition of nitric acid to a substantially solid material comprising calcium carbonate can produce a brine solution (e.g., an ultra-high-density brine solution) comprising dissolved calcium nitrate ($Ca(NO_3)_2$).

According to some embodiments, the water content of the substantially solid material may be decreased prior to addition of an acid. For example, in some cases, the substantially solid material may be dried prior to addition of an acid. In certain cases, the substantially solid material may be air dried (e.g, via compressed air in a filter press) prior to addition of the acid. In some cases, reducing the water content of the substantially solid material prior to addition of the acid may advantageously increase the density of the resultant brine solution.

In some embodiments, an amount of a salt may be added to a brine solution and dissolved in the brine solution. In some cases, addition of the additional salt may further increase the density of the brine solution. Non-limiting examples of suitable salts include sodium chloride (NaCl), calcium chloride ($CaCl_2$), magnesium chloride ($MgCl_2$), copper (II) chloride ($CuCl_2$), iron (III) chloride hexahydrate ($FeCl_3.6H_2O$), iron (III) chloride ($FeCl_3$), lithium chloride (LiCl), manganese (II) chloride ($MnCl_2$), nickel (II) chloride ($NiCl_2$), zinc chloride ($ZnCl_2$), calcium bromide ($CaBr_2$), magnesium bromide ($MgBr_2$), potassium bromide (KBr), sodium bromide (NaBr), copper (II) bromide ($CuBr_2$), iron (III) bromide ($FeBr_3$), lithium bromide (LiBr), manganese (II) bromide ($MnBr_2$), nickel (II) bromide ($NiBr_2$), zinc bromide ($ZnBr_2$), ammonium nitrate ($NH_4NO_3$), sodium nitrate ($NaNO_3$), lithium nitrate ($LiNO_3$), calcium nitrate ($Ca(NO_3)_2$), magnesium nitrate ($Mg(NO_3)_2$), strontium nitrate ($Sr(NO_3)_2$), calcium nitrate tetrahydrate ($Ca(NO_3)_2.4H_2O$), copper (II) nitrate ($Cu(NO_3)_2$), iron (II) nitrate ($Fe(NO_3)_2$), iron (III) nitrate ($Fe(NO_3)_3$), nickel (II) nitrate ($Ni(NO_3)_2$), and/or zinc nitrate ($Zn(NO_3)_2$). In some embodiments, at least one of the one or more additional salts added to a brine solution comprising water and at least one dissolved salt is different from the at least one dissolved salt. In some embodiments, each of the one or more additional salts added to the brine solution is different from the at least one dissolved salt. In certain cases, at least one of the one or more additional salts added to the brine solution is the same as the at least one dissolved salt.

In certain embodiments, the brine solution with additional salt has a density (e.g., measured at about 60° F.) of at least about 11 pounds/gallon, at least about 11.5 pounds/gallon, at least about 11.7 pounds/gallon, at least about 12 pounds/gallon, at least about 12.5 pounds/gallon, at least about 13 pounds/gallon, at least about 13.2 pounds/gallon, at least about 13.5 pounds/gallon, at least about 14 pounds/gallon, at least about 14.5 pounds/gallon, at least about 15 pounds/gallon, at least about 20 pounds/gallon, or at least about 25 pounds/gallon. In certain cases, the brine solution with additional salt has a density (e.g., measured at about 60° F.) in the range of about 11 pounds/gallon to about 12 pounds/gallon, about 11 pounds/per gallon to about 12.5 pounds/gallon, about 11 pounds/gallon to about 13 pounds/gallon, about 11 pounds/gallon to about 13.2 pounds/gallon, about 11 pounds/gallon to about 13.5 pounds/gallon, about 11 pounds/gallon to about 14 pounds/gallon, about 11 pounds/gallon to about 14.5 pounds/gallon, about 11 pounds/gallon to about 15 pounds/gallon, about 11 pounds/gallon to about 20 pounds/gallon, about 11 pounds/gallon to about 25 pounds/gallon, about 11.5 pounds/gallon to about 12 pounds/gallon, about 11.5 pounds/gallon to about 12.5 pounds/gallon, about 11.5 pounds/gallon to about 13 pounds/gallon, about 11.5 pounds/gallon to about 13.2 pounds/gallon, about 11.5 pounds/gallon to about 13.5 pounds/gallon, about 11.5 pounds/gallon to about 14 pounds/gallon, about 11.5 pounds/gallon to about 14.5 pounds/gallon, about 11.5 pounds/gallon to about 15 pounds/gallon, about 11.5 pounds/gallon to about 20 pounds/gallon, about 11.5 pounds/gallon to about 25 pounds/gallon, about 11.7 pounds/gallon to about 12.5 pounds/gallon, about 11.7 pounds/gallon to about 13 pounds/gallon, about 11.7 pounds/gallon to about 13.2 pounds/gallon, about 11.7 pounds/gallon to about 13.5 pounds/gallon, about 11.7 pounds/gallon to about 14 pounds/gallon, about 11.7 pounds/gallon to about 14.5 pounds/gallon, about 11.7 pounds/gallon to about 15 pounds/gallon, about 11.7 pounds/gallon to about 20 pounds/gallon, about 11.7 pounds/gallon to about 25 pounds/gallon, or about 12 pounds/gallon to about 12.5 pounds/gallon, about 12 pounds/gallon to about 13 pounds/gallon, about 12 pounds/gallon to about 13.2 pounds/gallon, about 12 pounds/gallon to about 13.5 pounds/gallon, about 12 pounds/gallon to about 14 pounds/gallon, about 12 pounds/gallon to about 14.5 pounds/gallon, about 12 pounds/gallon to about 15 pounds/gallon, about 12 pounds/gallon to about 20 pounds/gallon, about 12 pounds/gallon to about 25 pounds/gallon, about 13 pounds/gallon to about 13.5 pounds/gallon, about 13 pounds/gallon to about 14 pounds/gallon, about 13 pounds/gallon to about 14.5 pounds/gallon, about 13 pounds/gallon to about 15 pounds/gallon, about 13 pounds/gallon to about 20 pounds/gallon, about 13 pounds/gallon to about 25 pounds/gallon, about 14 pounds/gallon to about 15 pounds/gallon, about 14 pounds/gallon to about 20 pounds/gallon, about 14 pounds/gallon to about 25 pounds/gallon, about 15 pounds/gallon to about 20 pounds/gallon, about 15 pounds/gallon to about 25 pounds/gallon, or about 20 pounds/gallon to about 25 pounds/gallon.

In some cases, the density of the brine solution with additional salt is measured at a temperature of about 120° F. or less, about 100° F. or less, about 80° F. or less, about 72° F. or less, about 68° F. or less, about 60° F. or less, about 50° F. or less, or about 40° F. or less. In some embodiments, the density of the brine solution with additional salt is measured at a temperature of at least about 40° F., at least about 50° F., at least about 60° F., at least about 68° F., at least about 72° F., at least about 80° F., at least about 100° F., or at least about 120° F. In some embodiments, the density of the brine solution with additional salt is measured at a temperature in the range of about 40° F. to about 120° F., about 40° F. to about 100° F., about 40° F. to about 80° F., about 40° F. to about 72° F., about 40° F. to about 68° F., about 40° F. to about 60° F., about 40° F. to about 50° F., about 60° F. to about 120° F., about 60° F. to about 100° F., about 60° F. to about 80° F., about 60° F. to about 72° F., or about 60° F. to about 68° F.

It may be advantageous, in certain cases, to form a brine solution from the substantially solid material formed in the clean brine system. In some cases, the brine solution may be used in various applications (e.g., as a kill fluid in oil and gas operations). In some embodiments, the formation of a brine solution may avoid the expensive disposal of a solid material. According to some embodiments, substantially no solid material is discharged from the clean brine system. In certain cases, approximately about 70%, about 80%, about 90%, about 95%, about 99% or about 100% by weight of the material discharged from the clean brine system is substantially a liquid or a gas. In some embodiments, at least about 70%, at least about 80%, at least about 90%, at least about 95%, at least about 99%, or about 100% by weight of the substantially solid material is dissolved to form a brine solution. In certain embodiments, substantially all of the substantially solid material formed by the clean brine system is dissolved to form a brine solution.

In some cases, $CO_2$ resulting from the reaction of the solid material and HCl may be collected. In some cases, the $CO_2$ may advantageously be used to increase the alkalinity of an aqueous feed stream prior to the ion removal step, reducing the amount of soda ash required. In some cases, the $CO_2$ may be used to decrease the pH of the feed stream prior to the pH adjustment step, reducing the amount of additional acid (e.g., HCl) required.

According to some embodiments, at least one component of the clean brine system is fluidically connected to at least one storage tank. A storage tank generally refers to any vessel (e.g., stainless steel tank or other vessel) that may be used to store a liquid. The storage tank may have any shape (e.g., substantially cylindrical, substantially rectangular prismatic, and the like) and any size. In some embodiments, the storage tank may store an amount of liquid (e.g., clean brine) until the liquid can be used in an application (e.g., an oil or gas extraction process). In certain cases, the storage tank may be fluidically connected (e.g., directly fluidically connected) to one or more water treatment systems (e.g., a desalination system downstream of the clean brine system).

In some embodiments, at least one storage tank is fluidically connected to at least one component of the clean brine system. In certain cases, at least one storage tank is directly fluidically connected to at least one component of the clean brine system. In certain embodiments, at least one storage tank is fluidically connected to at least one component of the clean brine system such that no intervening desalination system is fluidically connected between the storage tank and the component. In certain embodiments, at least one storage tank is fluidically connected to at least one component of the clean brine system such that no intervening precipitation apparatus (e.g., crystallization tank) is fluidically connected between the storage tank and the component. In some embodiments, at least one storage tank is fluidically connected to at least one component of the clean brine system such that no humidifier and/or dehumidifier is fluidically connected between the storage tank and the component.

In some embodiments, at least one storage tank is fluidically connected to a separation apparatus of the clean brine system. In some cases, at least one storage tank is directly fluidically connected to the separation apparatus. In some embodiments, at least one storage tank is fluidically connected to the separation apparatus such that no intervening desalination system is fluidically connected between the storage tank and the separation apparatus. In some embodiments, at least one storage tank is fluidically connected to the separation apparatus such that no intervening precipitation apparatus (e.g., crystallization tank) is fluidically connected between the storage tank and the separation apparatus. In some embodiments, at least one storage tank is fluidically connected to the separation apparatus such that no humidifier and/or dehumidifier is fluidically connected between the storage tank and the separation apparatus.

In some embodiments, at least one storage tank is fluidically connected to an ion-removal apparatus of the clean brine system. In some cases, at least one storage tank is directly fluidically connected to the ion-removal apparatus. In some embodiments, at least one storage tank is fluidically connected to the ion-removal apparatus such that no intervening desalination system is fluidically connected between the storage tank and the ion-removal apparatus. In some embodiments, at least one storage tank is fluidically connected to the ion-removal apparatus such that no intervening precipitation apparatus (e.g., crystallization tank) is fluidically connected between the storage tank and the ion-removal apparatus. In some embodiments, at least one storage tank is fluidically connected to the ion-removal apparatus such that no humidifier and/or dehumidifier is fluidically connected between the storage tank and the ion-removal apparatus.

In some embodiments, at least one storage tank is fluidically connected to a suspended solids removal apparatus of the clean brine system. In some cases, at least one storage tank is directly fluidically connected to the suspended solids removal apparatus. In some embodiments, at least one storage tank is fluidically connected to the suspended solids removal apparatus such that no intervening desalination system is fluidically connected between the storage tank and the suspended solids removal apparatus. In some embodiments, at least one storage tank is fluidically connected to the suspended solids removal apparatus such that no intervening precipitation apparatus (e.g., crystallization tank) is fluidically connected between the storage tank and the suspended solids removal apparatus. In some embodiments, at least one storage tank is fluidically connected to the suspended solids removal apparatus such that no humidifier and/or dehumidifier is fluidically connected between the storage tank and the suspended solids removal apparatus.

In some embodiments, at least one storage tank is fluidically connected to a pH adjustment apparatus of the clean brine system. In some cases, at least one storage tank is directly fluidically connected to the pH adjustment apparatus. In some embodiments, at least one storage tank is fluidically connected to the pH adjustment apparatus such that no intervening desalination system is fluidically connected between the storage tank and the pH adjustment apparatus. In some embodiments, at least one storage tank is fluidically connected to the pH adjustment apparatus such that no intervening precipitation apparatus (e.g., crystallization tank) is fluidically connected between the storage tank and the pH adjustment apparatus. In some embodiments, at least one storage tank is fluidically connected to the pH adjustment apparatus such that no humidifier and/or dehumidifier is fluidically connected between the storage tank and the pH adjustment apparatus.

In some embodiments, at least one storage tank is fluidically connected to a VOM removal apparatus of the clean brine system. In some cases, at least one storage tank is directly fluidically connected to the VOM removal apparatus. In some embodiments, at least one storage tank is fluidically connected to the VOM removal apparatus such that no intervening desalination system is fluidically connected between the storage tank and the VOM removal apparatus. In some embodiments, at least one storage tank is fluidically connected to the VOM removal apparatus such that no intervening precipitation apparatus (e.g., crystallization tank) is fluidically connected between the storage tank and the VOM removal apparatus. In some embodiments, at least one storage tank is fluidically connected to the VOM removal apparatus such that no humidifier and/or dehumidifier is fluidically connected between the storage tank and the VOM removal apparatus.

In some embodiments, at least one storage tank is fluidically connected to a filtration apparatus of the clean brine system. In some cases, at least one storage tank is directly fluidically connected to the filtration apparatus. In some embodiments, at least one storage tank is fluidically connected to the filtration apparatus such that no intervening desalination system is fluidically connected between the storage tank and the filtration apparatus. In some embodiments, at least one storage tank is fluidically connected to the filtration apparatus such that no intervening precipitation apparatus (e.g., crystallization tank) is fluidically connected between the storage tank and the filtration apparatus. In some embodiments, at least one storage tank is fluidically connected to the filtration apparatus such that no humidifier and/or dehumidifier is fluidically connected between the storage tank and the filtration apparatus.

While separation apparatus 202, ion-removal apparatus 204, suspended solids removal apparatus 206, pH adjustment apparatus 208, and VOM removal apparatus 210 are shown in FIG. 2A as being arranged in a particular order, it should be understood that in other embodiments, these components may be alternatively arranged.

In certain embodiments, the input stream received by the ion-removal apparatus comprises at least a portion of the immiscible-phase-diminished stream produced by the separation apparatus. That is to say, in certain embodiments, the ion-removal apparatus can be located downstream of the separation apparatus. Referring to FIG. 2A, ion-removal apparatus 204 receives at least a portion of immiscible-phase-diminished stream 214 produced by separation apparatus 202. In other embodiments, the input stream received by the separation apparatus comprises at least a portion of the ion-diminished stream produced by the ion-removal apparatus. That is to say, in certain embodiments, the separation apparatus can be located downstream of the ion-removal apparatus.

In some embodiments, for example, the input stream received by the suspended solids removal apparatus comprises at least a portion of the immiscible-phase-diminished stream produced by the separation apparatus. That is to say, in certain embodiments, the suspended solids removal apparatus can be located downstream of the separation apparatus. Referring to FIG. 2A, for example, input stream 218 received by suspended solids removal apparatus 206 comprises at least a portion of the immiscible-phase-diminished stream (e.g., stream 214) produced by separation apparatus 202. In other embodiments, the input stream received by the separation apparatus comprises at least a portion of the suspended-solids-diminished stream produced by the suspended solids removal apparatus. That is to say, in certain embodiments, the separation apparatus can be located downstream of the suspended solids removal apparatus.

In certain embodiments, the input stream received by the pH adjustment apparatus comprises at least a portion of the immiscible-phase-diminished stream produced by the separation apparatus. That is to say, in certain embodiments, the pH adjustment apparatus can be located downstream of the separation apparatus. Referring to FIG. 2A, for example, input stream 222 received by pH adjustment apparatus 208 comprises at least a portion of immiscible-phase-diminished stream 214 produced by separation apparatus 202. In other embodiments, the input stream received by the separation apparatus comprises at least a portion of the pH-adjusted stream produced by the pH adjustment apparatus. That is to say, in certain embodiments, the separation apparatus can be located downstream of the pH adjustment apparatus.

In some embodiments, the input stream received by the volatile organic material (VOM) removal apparatus comprises at least a portion of the immiscible-phase-diminished stream produced by the separation apparatus. That is to say, in certain embodiments, the VOM removal apparatus can be located downstream of the separation apparatus. Referring to FIG. 2A, for example, input stream 224 received by VOM removal apparatus 210 comprises at least a portion of immiscible-phase-diminished stream 214 produced by separation apparatus 202. In other embodiments, the input stream received by the separation apparatus comprises at least a portion of the VOM-diminished stream produced by the VOM removal apparatus. That is to say, in certain embodiments, the separation apparatus can be located downstream of the VOM removal apparatus.

In certain embodiments, the input stream received by the suspended solids removal apparatus comprises at least a portion of the ion-diminished stream produced by the ion-removal apparatus. That is to say, in certain embodiments, the suspended solids removal apparatus can be located downstream of the ion-removal apparatus. Referring to FIG. 2A, for example, input stream 218 received by suspended solids removal apparatus 206 comprises at least a portion of ion-diminished stream (also stream 218) produced by ion-removal apparatus 204. In other embodiments, the input stream received by the ion-removal apparatus comprises at least a portion of the suspended-solids-diminished stream produced by the suspended solids removal apparatus. That is to say, in certain embodiments, the ion-removal apparatus can be located downstream of the suspended solids removal apparatus.

In certain embodiments, the input stream received by the pH adjustment apparatus comprises at least a portion of the ion-diminished stream produced by the ion-removal apparatus. That is to say, in certain embodiments, the pH adjustment apparatus can be located downstream of the ion-removal apparatus. Referring to FIG. 2A, for example, input stream 222 received by pH adjustment apparatus 208 comprises at least a portion of ion-diminished stream 218 produced by ion-removal apparatus 204. In other embodiments, the input stream received by the ion-removal apparatus comprises at least a portion of the pH-adjusted stream produced by the pH adjustment apparatus. That is to say, in certain embodiments, the ion-removal apparatus can be located downstream of the pH adjustment apparatus.

In some embodiments, the input stream received by the VOM removal apparatus comprises at least a portion of the ion-diminished stream produced by the ion-removal apparatus. That is to say, in certain embodiments, the VOM removal apparatus can be located downstream of the ion-removal apparatus. Referring to FIG. 2A, for example, input stream 224 received by VOM removal apparatus 210 comprises at least a portion of ion-diminished stream 218 produced by ion-removal apparatus 204. In other embodiments, the input stream received by the ion-removal apparatus comprises at least a portion of the VOM-diminished stream produced by the VOM removal apparatus. That is to say, in certain embodiments, the ion-removal apparatus can be located downstream of the VOM removal apparatus.

In certain embodiments, the input stream received by the pH adjustment apparatus comprises at least a portion of the suspended-solids-diminished stream produced by the suspended solids removal apparatus. That is to say, in certain embodiments, the pH adjustment apparatus can be located downstream of the suspended solids removal apparatus. Referring to FIG. 2A, for example, input stream 222 received by pH adjustment apparatus 208 comprises at least a portion of suspended-solids-diminished stream 222 produced by suspended solids removal apparatus 206. In other embodiments, the input stream received by the suspended solids removal apparatus comprises at least a portion of the pH-adjusted stream produced by the pH adjustment apparatus. That is to say, in certain embodiments, the suspended solids removal apparatus can be located downstream of the pH adjustment apparatus.

In some embodiments, the input stream received by the VOM removal apparatus comprises at least a portion of the suspended-solids-diminished stream produced by the suspended solids removal apparatus. That is to say, in certain embodiments, the VOM removal apparatus can be located downstream of the suspended solids removal apparatus. Referring to FIG. 2A, for example, input stream 224 received by VOM removal apparatus 210 comprises at least a portion of suspended solids-diminished stream 222 produced by suspended solids removal apparatus 206. In other embodiments, the input stream received by the suspended solids removal apparatus comprises at least a portion of the VOM-diminished stream produced by the VOM removal apparatus. That is to say, in certain embodiments, the suspended solids removal apparatus can be located downstream of the VOM removal apparatus.

In some embodiments, the input stream received by the VOM removal apparatus comprises at least a portion of the pH-adjusted stream produced by the pH adjustment apparatus. That is to say, in certain embodiments, the VOM removal apparatus can be located downstream of the pH adjustment apparatus. Referring to FIG. 2A, for example, input stream 224 received by VOM removal apparatus 210 comprises at least a portion of pH-adjusted stream (also stream 224) produced by pH adjustment apparatus 208. In other embodiments, the input stream received by the pH adjustment apparatus comprises at least a portion of the VOM-diminished stream produced by the VOM removal apparatus. That is to say, in certain embodiments, the pH adjustment apparatus can be located downstream of the VOM removal apparatus.

Each of separation apparatus 202, ion-removal apparatus 204, suspended solids removal apparatus 206, pH adjustment apparatus 208, VOM removal apparatus 210, and filtration apparatus 212 is an optional feature of the clean brine system. In some embodiments, the clean brine system comprises only one of separation apparatus 202, ion-removal apparatus 204, suspended solids removal apparatus 206, pH adjustment apparatus 208, VOM removal apparatus 210, and/or filtration apparatus 212. In some embodiments, the clean brine system comprises any combination of two or more of separation apparatuses 202, suspended solids removal apparatuses 206, ion-removal apparatuses 204, pH adjustment apparatuses 208, VOM removal apparatuses 210, and/or filtration apparatuses 212.

Various of the unit operations described herein can be "directly fluidically connected" to other unit operations and/or components. As used herein, a direct fluid connection exists between a first unit operation and a second unit operation (and the two unit operations are said to be "directly fluidically connected" to each other) when they are fluidically connected to each other and the composition of the fluid does not substantially change (i.e., no fluid component changes in relative abundance by more than 5% and no phase change occurs) as it is transported from the first unit operation to the second unit operation. As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations.

It should be understood that, in embodiments in which a single unit is shown in the figures and/or is described as performing a certain function, the single unit could be replaced with multiple units (e.g., operated in parallel) performing a similar function. For example, in certain embodiments, any one or more of the separation apparatus, suspended solids removal apparatus, ion-removal apparatus, pH adjustment apparatus, VOM removal apparatus, filtration apparatus, and/or desalination system could correspond to a plurality of separation apparatuses, suspended solids removal apparatuses, ion-removal apparatuses, pH adjustment apparatuses, VOM removal apparatuses, filtration apparatuses, and/or desalination systems (e.g., configured to be operated in parallel).

It should also be understood that, where separate units are shown in the figures and/or described as performing a sequence of certain functions, the units may also be present as a single unit (e.g., within a common housing), and the single unit may perform a combination of functions. For example, in some embodiments, any two or more of the separation apparatus, the ion-removal apparatus, the suspended solids removal apparatus, the pH adjustment apparatus, the VOM removal apparatus, and the filtration apparatus can be a single unit which can perform each of the functions associated with the combination.

As particular examples, in some embodiments, the system comprises a single unit that acts as both an ion-removal apparatus and a separation apparatus. In certain embodiments, the system comprises a single unit that acts as both an ion-removal apparatus and a suspended solids removal apparatus. In certain embodiments, the system comprises a single unit that acts as both an ion-removal apparatus and a pH adjustment apparatus. In certain embodiments, the system comprises a single unit that acts as both an ion-removal apparatus and a VOM removal apparatus. As additional examples, in some embodiments, the system comprises a single unit that acts as both a separation apparatus and a suspended solids removal apparatus. In some embodiments, the system comprises a single unit that acts as both a separation apparatus and an ion-removal apparatus. In certain embodiments, the system comprises a single unit that acts as both a separation apparatus and a pH adjustment apparatus. In certain embodiments, the system comprises a single unit that acts as both a separation apparatus and a VOM removal apparatus. As still further examples, in some embodiments, the system comprises a single unit that acts as both a suspended solids removal apparatus and a pH adjustment apparatus. In some embodiments, the system comprises a single unit that acts as both a suspended solids removal apparatus and a VOM removal apparatus. In some embodiments, the system comprises a single unit that acts as both a pH adjustment apparatus and a VOM removal apparatus. Units that perform three, four, or five of the functions outlined above are also possible. Of course, the invention is not necessarily limited to combination units, and in some embodiments, any of the separation apparatus, the suspended solids removal apparatus, the ion-removal apparatus, the pH adjustment apparatus, the VOM removal apparatus, and/or the filtration apparatus may be standalone units.

In some embodiments, one or more aqueous streams (e.g., clean brine streams) produced by a clean brine system described herein may be collected as product streams. In some cases, one or more aqueous streams produced by the clean brine system may be further treated, for example by a desalination system. However, it should be noted that any further processing of a clean brine stream by a downstream system (e.g., a desalination system) is optional. That is to say, in some embodiments, the clean brine system may be used in association with a downstream apparatus, but in other embodiments, the clean brine system may be used on its own, in the absence of any downstream systems.

Desalination

In some embodiments, the water treatment system comprises an optional desalination system fluidically connected to the clean brine system. In some embodiments, the desalination system is configured to remove water from an aqueous stream received by the desalination system to produce a concentrated brine stream enriched in a salt (e.g., a dissolved salt) relative to the aqueous stream received by the desalination system. In certain embodiments, the desalination system is also configured to produce a substantially pure water stream lean in a dissolved salt relative to the aqueous stream received by the desalination system. In some embodiments, the desalination system is a system configured to remove at least a portion of at least one dissolved salt from an aqueous stream.

According to some embodiments, at least one salt in an aqueous stream received by the desalination system is a dissolved salt (e.g., a salt that has been solubilized to such an extent that the component ions of the salt are no long ionically bonded to each other). In certain embodiments, at least one salt in the liquid stream is a monovalent salt. As used herein, the term "monovalent salt" refers to a salt that includes a monovalent cation (e.g., a cation with a redox state of +1 when solubilized). Examples of monovalent salts include, but are not limited to, salts containing sodium, potassium, lithium, rubidium, cesium, and francium. In certain embodiments, the monovalent salts include monovalent anions comprising, for example, chlorine, bromine, fluorine, and iodine. Non-limiting examples of monovalent salts include sodium chloride (NaCl), sodium bromide (NaBr), potassium chloride (KCl), potassium bromide (KBr), sodium carbonate ($Na_2CO_3$), and sodium sulfate ($Na_2SO_4$). In some cases, at least one salt is a divalent salt. As used herein, the term "divalent salt" refers to a salt that includes a divalent cation (e.g., a cation with a redox state of +2 when solubilized). Non-limiting examples of divalent salts include calcium chloride ($CaCl_2$), calcium sulfate ($CaSO_4$), magnesium sulfate ($MgSO_4$), strontium sulfate ($SrSO_4$), barium sulfate ($BaSO_4$), and/or barium-strontium sulfate ($BaSr(SO_4)_2$). In some cases, at least one salt in the liquid stream is a trivalent salt (e.g., a salt that includes a trivalent cation having a redox state of +3 when solubilized) or a tetravalent salt (e.g., a salt that includes a tetravalent cation having a redox state of +4 when solubilized). Non-limiting examples of trivalent salts or tetravalent salts include iron (III) hydroxide ($Fe(OH)_3$), iron (III) carbonate ($Fe_2(CO_3)_3$), aluminum hydroxide ($Al(OH)_3$), aluminum carbonate ($Al_2(CO_3)_3$), boron salts, and/or silicates.

In some embodiments, the desalination system is a thermal desalination system. According to certain embodiments, the desalination system is a humidification-dehumidification (HDH) desalination system. An HDH desalination system generally refers to a system comprising a humidifier and a dehumidifier. In some embodiments, the humidifier is configured to receive a liquid feed stream comprising water and at least one dissolved salt and to transfer at least a portion of the water from the liquid feed stream to a carrier gas through an evaporation process, thereby producing a humidified gas stream and a concentrated brine stream. In certain embodiments, the carrier gas comprises a non-condensable gas. Non-limiting examples of suitable non-condensable gases include air, nitrogen, oxygen, helium, argon, carbon monoxide, carbon dioxide, sulfur oxides ($SO_x$) (e.g., $SO_2$, $SO_3$), and/or nitrogen oxides ($NO_x$) (e.g., NO, $NO_2$). In some embodiments, the dehumidifier is configured to receive the humidified gas stream from the humidifier and to transfer at least a portion of water from the humidified gas stream to a stream comprising substantially pure water through a condensation process.

Figure 6:
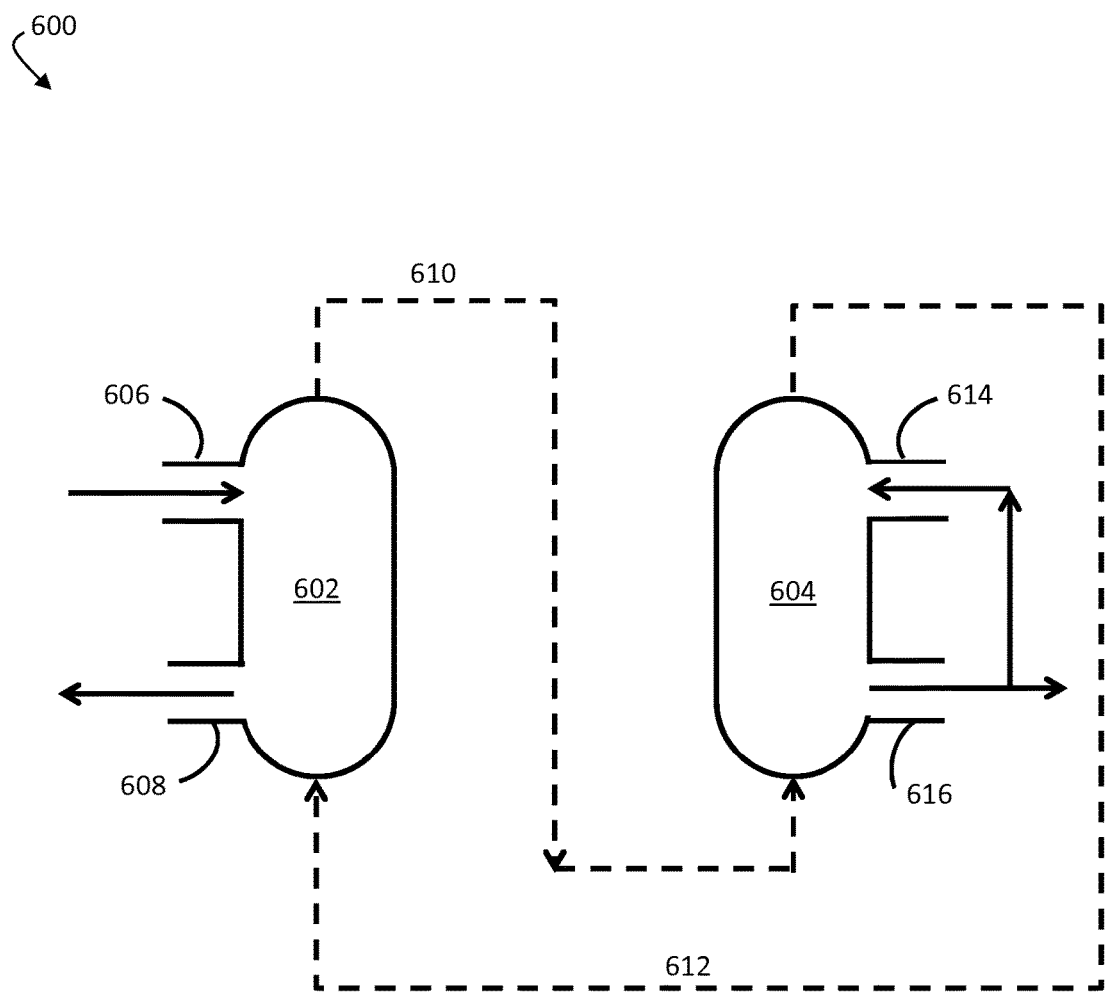
FIG. 6 shows a schematic flow diagram of an exemplary humidification-dehumidification system, according to some embodiments.

FIG. 6 shows an exemplary schematic illustration of HDH desalination system 600, which may be used in association with certain inventive systems and methods described herein. In FIG. 6, desalination system 600 comprises humidifier 602 and dehumidifier 604. As shown in FIG. 6, humidifier 602 comprises liquid inlet 606 and liquid outlet 608. In FIG. 6, humidifier 602 is fluidically connected to dehumidifier 604 via gas conduits 610 and 612. As shown in FIG. 6, dehumidifier 604 comprises liquid inlet 614 and liquid outlet 616.

In operation, a liquid stream comprising water and a dissolved salt at an initial concentration may enter humidifier 602 through liquid inlet 606. Humidifier 602 may also be configured to receive a carrier gas stream comprising a non-condensable gas. According to some embodiments, humidifier 602 is configured such that the liquid stream comes into contact (e.g., direct or indirect contact) with the carrier gas stream, and heat and water vapor are transferred from the liquid stream to the carrier gas stream through an evaporation process, thereby producing a humidified gas stream. In some embodiments, the remaining portion of the liquid stream that is not transported to the carrier gas stream forms a concentrated brine stream enriched in the dissolved salt relative to the liquid stream (e.g., the concentration of the dissolved salt in the concentrated brine stream is greater than the initial concentration of the dissolved salt in the liquid stream). In some embodiments, the concentrated brine stream exits humidifier 602 through liquid outlet 608.

According to some embodiments, the humidified gas stream exits humidifier 602 and flows through gas conduit 610 to dehumidifier 604. A stream comprising substantially pure water may enter dehumidifier 604 through liquid inlet 614. In dehumidifier 604, the humidified gas stream may come into contact (e.g., direct or indirect contact) with the substantially pure water stream, and heat and water may be transferred from the humidified gas stream to the substantially pure water stream through a condensation process, thereby producing a dehumidified gas stream. The stream comprising substantially pure water may exit dehumidifier 604 through liquid outlet 616; in some cases, at least a portion of the substantially pure water stream may be discharged from HDH desalination system 600, and at least a portion of the substantially pure water stream may be recirculated to liquid inlet 614. The dehumidified gas stream may exit dehumidifier 604, and at least a portion of the dehumidified gas stream may flow to humidifier 602 through gas conduit 612. In some embodiments, at least a portion of the dehumidified gas stream may be transported elsewhere within the system and/or vented.

The humidifier may have any configuration that allows for the transfer of water vapor from a liquid feed stream to a carrier gas stream (e.g., through an evaporation process). In certain embodiments, the humidifier comprises a vessel (e.g., a stainless steel tank, a fiber-reinforced plastic tank, or other vessel). The humidifier vessel can comprise a liquid inlet configured to receive a liquid feed stream comprising water and at least one dissolved salt and a gas inlet configured to receive a carrier gas stream. In some embodiments, the humidifier can further comprise a liquid outlet and a gas outlet.

The dehumidifier may have any configuration that allows for the transfer of water from a humidified gas stream to a stream comprising substantially pure water (e.g., through a condensation process). In certain embodiments, the dehumidifier comprises a vessel (e.g., a stainless steel tank or other vessel). The dehumidifier vessel can comprise a liquid inlet configured to receive a stream comprising substantially pure water and a gas inlet configured to receive the humidified gas stream. In some embodiments, the dehumidifier can further comprise a liquid outlet for the stream comprising substantially pure water and a gas outlet for the dehumidified gas stream.

According to some embodiments, the humidifier is a bubble column humidifier (e.g., a humidifier in which the evaporation process occurs through direct contact between a liquid feed stream and bubbles of a carrier gas) and/or the dehumidifier is a bubble column dehumidifier (e.g., a dehumidifier in which the condensation process occurs through direct contact between a substantially pure liquid stream and bubbles of a humidified gas). In some cases, bubble column humidifiers and bubble column dehumidifiers may be associated with certain advantages. For example, bubble column humidifiers and dehumidifiers may exhibit higher thermodynamic effectiveness than certain other types of humidifiers (e.g., packed bed humidifiers, spray towers, wetted wall towers) and dehumidifiers (e.g., surface condensers). Without wishing to be bound by a particular theory, the increased thermodynamic effectiveness may be at least partially attributed to the use of gas bubbles for heat and mass transfer in bubble column humidifiers and dehumidifiers, since gas bubbles may have more surface area available for heat and mass transfer than many other types of surfaces (e.g., metallic tubes, liquid films, packing material). In addition, bubble column humidifiers and dehumidifiers may have certain features that further increase thermodynamic effectiveness, including, but not limited to, relatively low liquid level height, relatively high aspect ratio liquid flow paths, and multi-staged designs.

In certain embodiments, a bubble column humidifier comprises at least one stage comprising a chamber and a liquid layer positioned within a portion of the chamber. The liquid layer may, in some cases, comprise a liquid comprising water and at least one dissolved salt. The chamber may further comprise a gas distribution region occupying at least a portion of the chamber not occupied by the liquid layer. In addition, the chamber may be in fluid communication with a bubble generator (e.g., a sparger plate). In some embodiments, a carrier gas stream flows through the bubble generator, forming bubbles of the carrier gas. The carrier gas bubbles may then travel through the liquid layer. The liquid layer may be maintained at a temperature higher than the temperature of the gas bubbles, and as the gas bubbles directly contact the liquid layer, heat and/or mass may be transferred from the liquid layer to the gas bubbles. In some cases, at least a portion of water may be transferred to the gas bubbles through an evaporation process. The bubbles of the humidified gas may exit the liquid layer and enter the gas distribution region. The humidified gas may be substantially homogeneously distributed throughout the gas distribution region. The humidified gas may then exit the bubble column humidifier as a humidified gas stream.

In some embodiments, a bubble column dehumidifier comprises at least one stage comprising a chamber and a liquid layer positioned within a portion of the chamber. The liquid layer may, in some cases, comprise substantially pure water. The chamber may further comprise a gas distribution region occupying at least a portion of the chamber not occupied by the liquid layer. In addition, the chamber may be in fluid communication with a bubble generator (e.g., a sparger plate). In some embodiments, the humidified gas stream flows from the humidifier through the bubble generator, forming bubbles of the humidified gas. The bubbles of the humidified gas may then travel through the liquid layer. The liquid layer may be maintained at a temperature lower than the temperature of the humidified gas bubbles, and as the humidified gas bubbles directly contact the liquid layer, heat and/or mass may be transferred from the humidified gas bubbles to the liquid layer via a condensation process.

Suitable bubble column condensers that may be used as the dehumidifier in certain systems and methods described herein include those described in U.S. Pat. No. 8,523,985, by Govindan et al., issued Sep. 3, 2013, and entitled "Bubble-Column Vapor Mixture Condenser"; U.S. Pat. No. 8,778,065, by Govindan et al., issued Jul. 15, 2014, and entitled "Humidification-Dehumidification System Including a Bubble-Column Vapor Mixture Condenser"; U.S. Patent Publication No. 2013/0074694, by Govindan et al., filed on Sep. 23, 2011, and entitled "Bubble-Column Vapor Mixture Condenser"; U.S. Patent Publication No. 2015/0129410, filed on Sep. 12, 2014, and entitled "Systems Including a Condensing Apparatus such as a Bubble Column Condenser"; U.S. patent application Ser. No. 14/538,619, filed on Nov. 11, 2014, and entitled "Systems Including a Condensing Apparatus such as a Bubble Column Condenser"; U.S. Provisional Patent Application No. 61/877,032, filed on Sep. 12, 2013, and entitled "Systems Including a Bubble Column Condenser"; and U.S. Provisional Patent Application No. 61/881,365, filed on Sep. 23, 2013, and entitled "Desalination Systems and Associated Methods," each of which is incorporated herein by reference in its entirety for all purposes. Suitable bubble column humidifiers that may be used as the humidifier in certain systems and methods described herein include those described in International Patent Publication No. WO 2014/00829, by Govindan et al., filed Jun. 6, 2014, as International Patent Application No. PCT/US2014/41226, and entitled "Multi-Stage Bubble Column Humidifier," which is incorporated herein by reference in its entirety for all purposes.

In some embodiments, the humidifier and/or dehumidifier comprise a plurality of stages. For example, the stages may be arranged such that a gas (e.g., a carrier gas, a humidified gas) flows sequentially from a first stage to a second stage. In some cases, the stages may be arranged in a vertical fashion (e.g., a second stage positioned above a first stage) or a horizontal fashion (e.g., a second stage positioned to the right or left of a first stage). In some cases, each stage may comprise a liquid layer. In embodiments relating to a humidifier comprising a plurality of stages (e.g., a multi-stage humidifier), the temperature of the liquid layer of the first stage (e.g., the bottommost stage in a vertically arranged bubble column) may be lower than the temperature of the liquid layer of the second stage, which may be lower than the temperature of the liquid layer of the third stage (e.g., the topmost stage in a vertically arranged bubble column). In embodiments relating to a dehumidifier comprising a plurality of stages (e.g., a multi-stage dehumidifier), the temperature of the liquid layer of the first stage may be higher than the temperature of the liquid layer of the second stage, which may be higher than the temperature of the liquid layer of the third stage.

The presence of multiple stages within a bubble column humidifier and/or bubble column dehumidifier may, in some cases, advantageously result in increased humidification and/or dehumidification of a gas. In some cases, the presence of multiple stages may advantageously lead to higher recovery of substantially pure water. For example, the presence of multiple stages may provide numerous locations where the gas may be humidified and/or dehumidified (e.g., treated to recover substantially pure water). That is, the gas may travel through more than one liquid layer in which at least a portion of the gas undergoes humidification (e.g., evaporation) or dehumidification (e.g., condensation). In addition, the presence of multiple stages may increase the difference in temperature between a liquid stream at an inlet and an outlet of a humidifier and/or dehumidifier. This may be advantageous in systems where heat from a liquid stream (e.g., dehumidifier liquid outlet stream) is transferred to a separate stream (e.g., humidifier input stream) within the system. In such cases, the ability to produce a heated dehumidifier liquid outlet stream can increase the energy effectiveness of the system. Additionally, the presence of multiple stages may enable greater flexibility for fluid flow within an apparatus. For example, extraction and/or injection of fluids (e.g., gas streams) from intermediate humidification and/or dehumidification stages may occur through intermediate exchange conduits.

In some cases, a bubble column humidifier and/or a bubble column dehumidifier is configured to extract partially humidified gas from at least one intermediate location in the humidifier (e.g., not the final humidification stage) and to inject the partially humidified gas into at least one intermediate location in the dehumidifier (e.g., not the first dehumidification stage). In some embodiments, extraction from at least one intermediate location in the humidifier and injection into at least one intermediate location in the dehumidifier may be thermodynamically advantageous. Because the portion of the gas flow exiting the humidifier at an intermediate outlet (e.g., the extracted portion) has not passed through the entire humidifier, the temperature of the gas flow at the intermediate outlet may be lower than the temperature of the gas flow at the main gas outlet of the humidifier. The location of the extraction points (e.g., outlets) and/or injection points (e.g., inlets) may be selected to increase the thermal efficiency of the system. For example, because a gas (e.g., air) may have increased vapor content at higher temperatures than at lower temperatures, and because the heat capacity of a gas with higher vapor content may be higher than the heat capacity of a gas with lower vapor content, less gas may be used in higher temperature areas of the humidifier and/or dehumidifier to better balance the heat capacity rate ratios of the gas (e.g., air) and liquid (e.g., water) streams. Extraction and/or injection at intermediate locations may therefore advantageously allow for manipulation of gas mass flows and for greater heat recovery.

The humidifier and/or dehumidifier may be of any size. In some cases, the size of the humidifier and/or dehumidifier will generally depend upon the number of humidifier units and/or dehumidifier units employed in the system and the total flow rate of the liquid that is to be desalinated. In certain embodiments, the total of the volumes of the humidifiers used in the desalination system can be at least about 1 gallon, at least about 10 gallons, at least about 100 gallons, at least about 500 gallons, at least about 1,000 gallons, at least about 2,000 gallons, at least about 5,000 gallons, at least about 7,000 gallons, at least about 10,000 gallons, at least about 20,000 gallons, at least about 50,000 gallons, or at least about 100,000 gallons (and/or, in some embodiments, up to about 1,000,000 gallons, or more).

In some embodiments, the desalination system may have a relatively high liquid feed rate (e.g., amount of liquid feed entering the system per unit time). In certain embodiments, the desalination system has a liquid feed rate of at least about 5 barrels/day, at least about 10 barrels/day, at least about 20 barrels/day, at least about 50 barrels/day, at least about 100 barrels/day, at least about 200 barrels/day, at least about 300 barrels/day, at least about 400 barrels/day, at least about 500 barrels/day, at least about 600 barrels/day, at least about 700 barrels/day, at least about 800 barrels/day, at least about 900 barrels/day, at least about 1,000 barrels a day, at least about 2,000 barrels/day, at least about 5,000 barrels/day, at least about 10,000 barrels/day, at least about 20,000 barrels/day, at least about 30,000 barrels/day, at least about 35,000 barrels/day, at least about 50,000 barrels/day (and/or, in some embodiments, up to about 100,000 barrels/day, or more).

In some embodiments, the desalination system may have a relatively high production rate (e.g., amount of substantially pure water produced per unit time). In certain cases, the desalination system has a production rate of at least about 10 barrels/day, at least about 50 barrels/day, at least about 100 barrels/day, at least about 200 barrels/day, at least about 300 barrels/day, at least about 400 barrels/day, at least about 500 barrels/day, at least about 600 barrels/day, at least about 700 barrels/day, at least about 800 barrels/day, at least about 900 barrels/day, at least about 1,000 barrels a day, at least about 2,000 barrels/day, at least about 5,000 barrels/day, or at least about 10,000 barrels/day (and/or, in some embodiments, up to about 100,000 barrels/day, or more).

It should be recognized that other types of humidifiers and/or dehumidifiers may be used in systems and methods described herein. For example, in some embodiments, the humidifier is a packed bed humidifier. In certain cases, the humidifier comprises a packing material (e.g., polyvinyl chloride (PVC) packing material). The packing material may, in some cases, facilitate turbulent gas flow and/or enhanced direct contact between the liquid stream comprising water and at least one dissolved salt and the carrier gas stream within the humidifier. In certain embodiments, the humidifier further comprises a device configured to produce droplets of the liquid feed stream. For example, a nozzle or other spraying device may be positioned at the top of the humidifier such that the liquid feed stream is sprayed downward to the bottom of the humidifier. The use of a spraying device can advantageously increase the degree of contact between the liquid feed stream fed to the humidifier and the carrier gas stream into which water from the liquid feed stream is transported.

In some embodiments, the desalination system further comprises one or more additional devices. According to some embodiments, for example, the desalination system further comprises a heat exchanger in fluid communication with the humidifier and/or dehumidifier. In certain cases, the heat exchanger advantageously facilitates transfer of heat from a liquid stream exiting the dehumidifier to a liquid stream entering the humidifier. For example, the heat exchanger may advantageously allow energy to be recovered from a dehumidifier liquid outlet stream and used to pre-heat a humidifier liquid inlet stream prior to entry of the humidifier liquid inlet stream into the humidifier.

In certain embodiments, the desalination system further comprises an optional heating device arranged in fluid communication with the humidifier. The optional heating device may be any device capable of transferring heat to a liquid stream. The heating device may be a heat exchanger, a heat collection device (e.g., a device configured to store and/or utilize thermal energy), or an electric heater. In certain cases, the heating device may be arranged such that a liquid feed stream is heated prior to entering the humidifier. Heating the liquid feed stream may, in some cases, increase the degree to which water is transferred from the liquid feed stream to the carrier gas stream within the humidifier.

In some embodiments, the desalination system further comprises an optional cooling device arranged in fluid communication with the dehumidifier. In certain cases, a stream comprising substantially pure water may be cooled by the cooling device prior to entering the dehumidifier. A cooling device generally refers to any device that is capable of removing heat from a fluid stream (e.g., a liquid stream, a gas stream). The cooling device may be a heat exchanger (e.g., an air-cooled heat exchanger), a dry cooler, a chiller, a radiator, or any other device capable of removing heat from a fluid stream.

It should be understood that the inventive systems and methods described herein are not limited to those including a humidification-dehumidification desalination system, and that in other embodiments, other desalination system types may be employed. Non-limiting examples of suitable desalination systems include a mechanical vapor compression system, a multi-effect distillation system, a multi-stage flash system, and/or a vacuum distillation system. In some embodiments, the desalination system is a hybrid desalination system comprising a first desalination unit and a second desalination unit, each of which may be any type of desalination system. The first desalination unit and second desalination unit may be the same or different types of desalination systems.

Certain of the systems described herein can be configured to desalinate saline solutions entering at relatively high flow rates, and, accordingly, can be configured to produce relative pure water streams at relatively high flow rates. For example, in some embodiments, the systems and methods described herein may be configured and sized to operate to receive an aqueous feed stream at a flow rate of at least about 1 gallon/minute, at least about 10 gallons/minute, at least about 100 gallons/minute, or at least about 1000 gallons/minute (and/or, in certain embodiments, up to about 10,000 gallons/minute, or more).

In some embodiments, the dehumidifier is configured to produce a stream comprising water of relatively high purity (e.g., a substantially pure water stream). For example, in some embodiments, the dehumidifier produces a stream comprising water in an amount of at least about 95 wt %, at least about 99 wt %, at least about 99.9 wt %, or at least about 99.99 wt % (and/or, in certain embodiments, up to about 99.999 wt %, or more). In some embodiments, the percentage volume of a liquid feed stream that is recovered as fresh water is at least about 40%, at least about 45%, at least about 50%, at least about 55%, at least about 58%, at least about 60%, or at least about 70%.

In some embodiments, the substantially pure water stream has a relatively low concentration of one or more dissolved salts. In some cases, the concentration of at least one dissolved salt in the substantially pure water stream is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, or about 0.01 mg/L or less. According to some embodiments, the concentration of at least one dissolved salt in the substantially pure water stream may be substantially zero (e.g., not detectable). In certain cases, the concentration of at least one dissolved salt in the substantially pure water stream is in the range of about 0.01 mg/L to about 500 mg/L, about 0.01 mg/L to about 200 mg/L, about 0.01 mg/L to about 100 mg/L, about 0.01 mg/L to about 50 mg/L, about 0.01 mg/L to about 20 mg/L, about 0.01 mg/L to about 10 mg/L, about 0.01 mg/L to about 5 mg/L, about 0.01 mg/L to about 2 mg/L, about 0.01 mg/L to about 1 mg/L, about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.1 mg/L, or about 0 mg/L to about 0.01 mg/L. The concentration of a dissolved salt may be measured according to any method known in the art. For example, suitable methods for measuring the concentration of a dissolved salt include inductively coupled plasma (ICP) spectroscopy (e.g., inductively coupled plasma optical emission spectroscopy). As one non-limiting example, an Optima 8300 ICP-OES spectrometer may be used.

In some embodiments, the substantially pure water stream contains at least one dissolved salt in an amount of about 2 wt % or less, about 1 wt % or less, about 0.5 wt % or less, about 0.2 wt % or less, about 0.1 wt % or less, about 0.05 wt % or less, or about 0.01 wt % or less. In some embodiments, the substantially pure water stream contains at least one dissolved salt in an amount in the range of about 0.01 wt % to about 2 wt %, about 0.01 wt % to about 1 wt %, about 0.01 wt % to about 0.5 wt %, about 0.01 wt % to about 0.2 wt %, or about 0.01 wt % to about 0.1 wt %.

In some embodiments, the substantially pure water stream has a relatively low total dissolved salt concentration. In some cases, the total dissolved salt concentration in the substantially pure water stream is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.1 mg/L or less, or about 0.01 mg/L or less. According to some embodiments, the total dissolved salt concentration in the substantially pure water stream may be substantially zero (e.g., not detectable). In certain embodiments, the total dissolved salt concentration in the substantially pure water stream is in the range of about 0.01 mg/L to about 500 mg/L, about 0.01 mg/L to about 200 mg/L, about 0.01 mg/L to about 100 mg/L, about 0.01 mg/L to about 50 mg/L, about 0.01 mg/L to about 20 mg/L, about 0.01 mg/L to about 10 mg/L, about 0.01 mg/L to about 5 mg/L, about 0.01 mg/L to about 2 mg/L, about 0.01 mg/L to about 1 mg/L, about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.1 mg/L, or about 0 mg/L to about 0.01 mg/L. Total dissolved salt concentration may be measured according to any method known in the art. For example, a non-limiting example of a suitable method for measuring total dissolved salt concentration is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The total dissolved salt concentration of the sample may be obtained by dividing the mass of the total dissolved solids by the volume of the original sample.

In some embodiments, the total dissolved salt concentration of the substantially pure water stream is substantially less than the total dissolved salt concentration of an aqueous feed stream received by the desalination system. In some cases, the total dissolved salt concentration of the substantially pure water stream is at least about 0.5%, about 1%, about 2%, about 5%, about 10%, about 15%, or about 20% less than the total dissolved salt concentration of the aqueous feed stream.

According to some embodiments, the substantially pure water stream has a relatively low salinity (e.g., weight percent of all dissolved salts). In some embodiments, the substantially pure water stream has a salinity of about 5% or less, about 2% or less, about 1% or less, about 0.5% or less, about 0.2% or less, about 0.1% or less, about 0.05% or less, or about 0.01% or less. In some embodiments, the substantially pure water stream has a salinity in the range of about 0.01% to about 5%, about 0.01% to about 2%, about 0.01% to about 1%, about 0.01% to about 0.5%, about 0.01% to about 0.2%, or about 0.01% to about 0.1%. Salinity may be measured according to any method known in the art. For example, a non-limiting example of a suitable method for measuring salinity is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The salinity of the sample may be obtained by dividing the mass of the total dissolved solids by the mass of the original sample and multiplying the resultant number by 100.

According to some embodiments, the humidifier is configured to produce a concentrated brine stream (e.g., a stream comprising a relatively high concentration of at least one dissolved salt). The concentrated brine stream may, in some cases, have a relatively high salinity. In some cases, the salinity of the concentrated brine stream is at least about 10%, at least about 15%, at least about 20%, at least about 25%, at least about 26%, at least about 27%, at least about 28%, at least about 29%, or at least about 30%. In some embodiments, the salinity of the concentrated brine stream is in the range of about 10% to about 20%, about 10% to about 25%, about 10% to about 26%, about 10% to about 27%, about 10% to about 28%, about 10% to about 29%, about 10% to about 30%, about 15% to about 20%, about 15% to about 25%, about 15% to about 26%, about 15% to about 27%, about 15% to about 28%, about 15% to about 29%, about 15% to about 30%, about 20% to about 25%, about 20% to about 26%, about 20% to about 27%, about 20% to about 28%, about 20% to about 29%, about 20% to about 30%, about 25 wt % to about 26 wt %, about 25 wt % to about 27 wt %, about 25 wt % to about 28 wt %, about 25 wt % to about 29 wt %, or about 25% to about 30%.

The concentrated brine stream may, in some cases, have a relatively high concentration of at least one dissolved salt (e.g., NaCl). In certain cases, the concentration of at least one dissolved salt in the concentrated brine stream is at least about 100 mg/L, at least about 200 mg/L, at least about 400 mg/L, at least about 500 mg/L, at least about 800 mg/L, at least about 1,000 mg/L, at least about 2,000 mg/L, at least about 4,000 mg/L, at least about 5,000 mg/L, at least about 8,000 mg/L, at least about 10,000 mg/L, at least about 20,000 mg/L, at least about 40,000 mg/L, at least about 45,000 mg/L, at least about 50,000 mg/L, at least about 80,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, or at least about 500,000 mg/L (and/or, in certain embodiments, up to the solubility limit of the salt in the concentrated brine stream). In some embodiments, the concentration of at least one dissolved salt in the concentrated brine stream is in the range of about 10,000 mg/L to about 20,000 mg/L, about 10,000 mg/L to about 40,000 mg/L, about 10,000 mg/L to about 45,000 mg/L, about 10,000 mg/L to about 50,000 mg/L, about 10,000 mg/L to about 80,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L about 20,000 mg/L to about 50,000 mg/L, about 20,000 mg/L to about 80,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the concentrated brine stream contains at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the salt in the concentrated brine stream). In some embodiments, the concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the total dissolved salt concentration of the concentrated brine stream may be relatively high. In certain cases, the total dissolved salt concentration of the concentrated brine stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, at least about 500,000 mg/L, at least about 550,000 mg/L, or at least about 600,000 mg/L (and/or, in certain embodiments, up to the solubility limit of the salt(s) in the concentrated brine stream). In some embodiments, the total dissolved salt concentration of the concentrated brine stream is in the range of about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, or about 10,000 mg/L to about 400,000 mg/L, about 10,000 mg/L to about 450,000 mg/L, about 10,000 mg/L to about 500,000 mg/L, about 10,000 mg/L to about 550,000 mg/L, about 10,000 mg/L to about 600,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 20,000 mg/L to about 550,000 mg/L, about 20,000 mg/L to about 600,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 50,000 mg/L to about 550,000 mg/L, about 50,000 mg/L to about 600,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, about 100,000 mg/L to about 500,000 mg/L, about 100,000 mg/L to about 550,000 mg/L, or about 100,000 mg/L to about 600,000 mg/L.

In some embodiments, the concentrated brine stream contains a total amount of dissolved salts of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt %. In some embodiments, the concentrated brine stream comprises a total amount of dissolved salts in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the total dissolved salt concentration of the concentrated brine stream is significantly higher than the total dissolved salt concentration of an aqueous feed stream received by the desalination system. In some cases, the total dissolved salt concentration of the concentrated brine stream is at least about 5%, at least about 6%, at least about 10%, at least about 14%, at least about 15%, at least about 20%, or at least about 25% greater than the total dissolved salt concentration of the aqueous feed stream.

According to some embodiments, one or more additional salts may be added to the concentrated brine stream to produce an ultra-high-density concentrated brine stream. Non-limiting examples of suitable salts to add to a concentrated brine stream to produce an ultra-high-density concentrated brine stream include sodium chloride (NaCl), calcium chloride (CaCl$_2$), magnesium chloride (MgCl$_2$), copper (II) chloride (CuCl$_2$), iron (III) chloride hexahydrate (FeCl$_3$.6H$_2$O), iron (III) chloride (FeCl$_3$), lithium chloride (LiCl), manganese (II) chloride (MnCl$_2$), nickel (II) chloride (NiCl$_2$), zinc chloride (ZnCl$_2$), sodium bromide (NaBr), calcium bromide (CaBr$_2$), magnesium bromide (MgBr$_2$), potassium bromide (KBr), copper (II) bromide (CuBr$_2$), iron (III) bromide (FeBr$_3$), lithium bromide (LiBr), manganese (II) bromide (MnBr$_2$), nickel (II) bromide (NiBr$_2$), zinc bromide (ZnBr$_2$), ammonium nitrate (NH$_4$NO$_3$), sodium nitrate (NaNO$_3$), lithium nitrate (LiNO$_3$), calcium nitrate (Ca(NO$_3$)$_2$), magnesium nitrate (Mg(NO$_3$)$_2$), strontium nitrate (Sr(NO$_3$)$_2$), calcium nitrate tetrahydrate (Ca(NO$_3$)$_2$.4H$_2$O), copper (II) nitrate (Cu(NO$_3$)$_2$), iron (II) nitrate (Fe(NO$_3$)$_2$), iron (III) nitrate (Fe(NO$_3$)$_3$), nickel (II) nitrate (Ni(NO$_3$)$_2$), and/or zinc nitrate (Zn(NO$_3$)$_2$). In some embodiments, at least one of the one or more additional salts added to a concentrated brine stream comprising water and at least one dissolved salt is different from the at least one dissolved salt. In some embodiments, each of the one or more additional salts added to the concentrated brine stream is different from the at least one dissolved salt. In certain cases, at least one of the one or more additional salts added to the concentrated brine stream is the same as the at least one dissolved salt.

In some embodiments, the ultra-high-density concentrated brine stream has a density (e.g., measured at about 60° F.) of at least about 11.7 pounds/gallon, at least about 12 pounds/gallon, at least about 12.5 pounds/gallon, at least about 13 pounds/gallon, at least about 13.2 pounds/gallon, at least about 13.5 pounds/gallon, at least about 14 pounds/gallon, at least about 14.5 pounds/gallon, at least about 15 pounds/gallon, at least about 20 pounds/gallon, or at least about 25 pounds/gallon. In certain cases, the ultra-high-density concentrated brine stream has a density (e.g., measured at about 60° F.) in the range of about 11.7 pounds/gallon to about 12.5 pounds/gallon, about 11.7 pounds/gallon to about 13 pounds/gallon, about 11.7 pounds/gallon to about 13.2 pounds/gallon, about 11.7 pounds/gallon to about 13.5 pounds/gallon, about 11.7 pounds/gallon to about 14 pounds/gallon, about 11.7 pounds/gallon to about 14.5 pounds/gallon, about 11.7 pounds/gallon to about 15 pounds/gallon, about 11.7 pounds/gallon to about 20 pounds/gallon, about 11.7 pounds/gallon to about 25 pounds/gallon, about 12 pounds/gallon to about 12.5 pounds/gallon, about 12 pounds/gallon to about 13 pounds/gallon, about 12 pounds/gallon to about 13.2 pounds/gallon, about 12 pounds/gallon to about 13.5 pounds/gallon, about 12 pounds/gallon to about 14 pounds/gallon, about 12 pounds/gallon to about 14.5 pounds/gallon, about 12 pounds/gallon to about 15 pounds/gallon, about 12 pounds/gallon to about 20 pounds/gallon, about 12 pounds/gallon to about 25 pounds/gallon, about 12.5 pounds/gallon to about 13 pounds/gallon, about 12.5 pounds/gallon to about 13.2 pounds/gallon, about 12.5 pounds/gallon to about 13.5 pounds/gallon, about 12.5 pounds/gallon to about 14 pounds/gallon, about 12.5 pounds/gallon to about 14.5 pounds/gallon, about 12.5 pounds/gallon to about 15 pounds/gallon, about 12.5 pounds/gallon to about 20 pounds/gallon, about 12.5 pounds/gallon to about 25 pounds/gallon, about 13 pounds/gallon to about 13.2 pounds/gallon, about 13 pounds/gallon to about 13.5 pounds/gallon, about 13 pounds/gallon to about 14 pounds/gallon, about 13 pounds/gallon to about 14.5 pounds/gallon, about 13 pounds/gallon to about 15 pounds/gallon, about 13 pounds/gallon to about 20 pounds/gallon, about 13 pounds/gallon to about 25 pounds/gallon, about 13.5 pounds/gallon to about 14 pounds/gallon, about 13.5 pounds/gallon to about 14.5 pounds/gallon, about 13.5 pounds/gallon to about 15 pounds/gallon, about 13.5 pounds/gallon to about 20 pounds/gallon, about 13.5 pounds/gallon to about 25 pounds/gallon, about 14 pounds/gallon to about 15 pounds/gallon, about 14 pounds/gallon to about 20 pounds/gallon, about 14 pounds/gallon to about 25 pounds/gallon, about 15 pounds/gallon to about 20 pounds/gallon, about 15 pounds/gallon to about 25 pounds/gallon, or about 20 pounds/gallon to about 25 pounds/gallon.

In some cases, the density of the ultra-high-density concentrated brine stream is measured at a temperature of about 120° F. or less, about 100° F. or less, about 80° F. or less, about 72° F. or less, about 68° F. or less, about 60° F. or less, about 50° F. or less, or about 40° F. or less. In some embodiments, the density of the ultra-high-density concentrated brine stream is measured at a temperature of at least about 40° F., at least about 50° F., at least about 60° F., at least about 68° F., at least about 72° F., at least about 80° F., at least about 100° F., or at least about 120° F. In some embodiments, the density of the ultra-high-density concentrated brine stream is measured at a temperature in the range of about 40° F. to about 120° F., about 40° F. to about 100° F., about 40° F. to about 80° F., about 40° F. to about 72° F., about 40° F. to about 68° F., about 40° F. to about 60° F., about 40° F. to about 50° F., about 60° F. to about 120° F., about 60° F. to about 100° F., about 60° F. to about 80° F., about 60° F. to about 72° F., or about 60° F. to about 68° F.

In some embodiments, the water treatment system includes an optional disinfection unit. The disinfection unit may be, for example, a chlorination system configured to add chlorine to the water. According to some embodiments, the disinfection unit can be configured to receive at least a portion of a substantially pure water stream produced by the desalination system.

In some embodiments, the water treatment system comprises an optional precipitation apparatus. The precipitation apparatus may be, in certain embodiments, fluidically connected to the desalination system. In some such embodiments, the precipitation apparatus is configured to receive at least a portion of a concentrated brine stream output by the desalination system.

The precipitation apparatus is, in certain embodiments, configured to precipitate at least a portion of the dissolved salt (e.g., dissolved monovalent salt) from the concentrated brine stream to produce a product stream containing less of the dissolved salt relative to the concentrated brine stream.

The precipitation apparatus can be manufactured in any suitable manner. In certain embodiments, the precipitation apparatus comprises a vessel, such as a crystallization tank. The vessel may include an inlet through which at least a portion of the concentrated brine stream produced by the desalination system is transported into the precipitation vessel. The precipitation vessel may also include at least one outlet. For example, the precipitation vessel may include an outlet through which the substantially pure water stream (containing the dissolved salt in an amount that is less than that contained in the inlet stream) is transported. In some embodiments, the precipitation vessel includes an outlet through which solid, precipitated salt is transported.

In some embodiments, the crystallization tank comprises a low shear mixer. The low shear mixer can be configured to keep the crystals that are formed mixed (e.g., homogeneously mixed) in the brine stream. According to certain embodiments, the vessel is sized such that there is sufficient residence time for crystals to form and grow. In certain embodiments, the precipitation apparatus comprises a vessel which provides at least 20 minutes of residence time for the concentrated brine stream. As one non-limiting example, the vessel comprises, according to certain embodiments, a 6000 gallon vessel, which can be used to provide 24 minutes of residence in a 500 US barrel per day fresh water production system.

In some embodiments the crystallization tank is followed by a storage tank. The storage tank may have, in some embodiments, a capacity that is substantially the same as the capacity of the crystallization tank. In certain embodiments, the crystallization tank and/or the storage tank can be configured to accommodate batch operation of the downstream solid handling apparatus, which can be fluidically coupled to the precipitation apparatus.

In some embodiments, the precipitation apparatus comprises at least one vessel comprising a volume within which the concentrated brine stream is substantially quiescent. In some embodiments, the flow rate of the fluid within the substantially quiescent volume is less than the flow rate at which precipitation (e.g., crystallization) is inhibited. For example, the flow rate of the fluid within the substantially quiescent volume may have, in certain embodiments, a flow rate of zero. In some embodiments, the flow rate of the fluid within the substantially quiescent volume may have a flow rate that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, at least about 25%, at least about 50%, at least about 75%, at least about 90%, or at least about 100% of the volume of the vessel. As one particular example, the precipitation apparatus can comprise a vessel including a stagnation zone. The stagnation zone may be positioned, for example, at the bottom of the precipitation vessel. In certain embodiments, the precipitation apparatus can include a second vessel in which the solids precipitated in the first vessel are allowed to settle. For example, an aqueous stream containing the precipitated solids can be transported to a crystallization tank, where the solids can be allowed to settle. The remaining contents of the aqueous stream can be transported out of the crystallization tank. While the use of two vessels within the precipitation apparatus has been described, it should be understood that, in other embodiments, a single vessel, or more than two vessels may be employed. In certain embodiments, the desalination system can be operated such that precipitation of the salt occurs substantially only within the stagnation zone of the precipitation vessel.

In certain embodiments, the precipitation apparatus is directly fluidically connected to the desalination system. It should be understood, however, that the invention is not limited to embodiments in which the precipitation apparatus and the desalination system are directly fluidically connected, and in other embodiments, the precipitation apparatus and the desalination system are fluidically connected but are not directly fluidically connected.

In some embodiments, the precipitated salt from the precipitation apparatus is fed to a solids-handling apparatus. The solids-handling apparatus may be configured, in certain embodiments, to remove at least a portion of the water retained by the precipitated salt. In some such embodiments, the solids-handling apparatus is configured to produce a cake comprising at least a portion of the precipitated salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt. As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt.

In some embodiments, the desalination system comprises a transport device configured to transport precipitated salt away from the precipitation apparatus. For example, in certain embodiments, a pump is used to transport a suspension of the precipitated salt away from the precipitation apparatus. In other embodiments, a conveyor could be used to transport precipitated salt away from the precipitation apparatus. In certain embodiments, the transport device is configured to transport the precipitated salt from the precipitation apparatus to a solids-handling apparatus.

In certain embodiments, the water treatment system is operated such that little or no brine is left to be disposed from the system (also sometimes referred to as a "zero liquid discharge" system). In some such embodiments, the system produces a salt product and a fresh water product. The salt product can be produced, for example, as a product of a crystallization or other precipitation step.

Certain of the water treatments described herein comprise a desalination system configured to remove water from an aqueous stream to produce a concentrated brine stream enriched in a dissolved salt relative to the aqueous stream received by the desalination system. According to some embodiments, the desalination system can be configured to produce a water-containing stream that contains a lower concentration of the dissolved salt than the stream fed to the desalination system (e.g., a substantially pure water stream).

In some embodiments, water treatment systems and methods described herein may be used to produce two or more product streams. In some embodiments, a water treatment system may produce a first stream comprising a first concentration of one or more contaminants. In some embodiments, the water treatment system may produce a second stream comprising a second concentration of the one or more contaminants, wherein the second concentration is lower than the first concentration.

In some embodiments, the desalination system is separate from each of the separation apparatus, the suspended solids removal apparatus, the ion-removal apparatus, the pH adjustment apparatus, the VOM removal apparatus, and the filtration apparatus.

In some embodiments, the desalination system is fluidically connected to one or more components of the clean brine system. In certain embodiments, the desalination system is directly fluidically connected to one or more components of the clean brine system. The desalination system may be, in some cases, upstream or downstream of one or more components of the clean brine system.

In some embodiments, for example, a desalination system can be fluidically connected to a separation apparatus. In certain cases, the desalination system is directly fluidically connected to the separation apparatus. In some embodiments, the input stream received by the desalination system comprises at least a portion of the immiscible phase-diminished stream produced by the separation apparatus. That is to say, in certain embodiments, the desalination system is downstream of the separation apparatus. In other embodiments, the input stream received by the separation apparatus comprises at least a portion of the concentrated brine stream and/or substantially pure water stream produced by the desalination system. That is to say, in certain embodiments, the separation apparatus can be located downstream of the desalination system.

In some embodiments, for example, a desalination system can be fluidically connected to an ion-removal apparatus. In certain cases, the desalination system is directly fluidically connected to the ion-removal apparatus. In some embodiments, the input stream received by the desalination system comprises at least a portion of the ion-diminished stream produced by the ion-removal apparatus. That is to say, in certain embodiments, the desalination system is downstream of the ion-removal apparatus. In other embodiments, the input stream received by the ion-removal apparatus comprises at least a portion of the concentrated brine stream and/or substantially pure water stream produced by the desalination system. That is to say, in certain embodiments, the ion-removal apparatus can be located downstream of the desalination system.

In some embodiments, for example, a desalination system can be fluidically connected to a suspended solids removal apparatus. In certain cases, the desalination system is directly fluidically connected to the suspended solids removal apparatus. In some embodiments, the input stream received by the desalination system comprises at least a portion of the suspended-solids-diminished stream produced by the suspended solids removal apparatus. That is to say, in certain embodiments, the desalination system is downstream of the suspended solids removal apparatus. In other embodiments, the input stream received by the suspended solids removal apparatus comprises at least a portion of the concentrated brine stream and/or substantially pure water stream produced by the desalination system. That is to say, in certain embodiments, the suspended solids removal apparatus can be located downstream of the desalination system.

In some embodiments, for example, a desalination system can be fluidically connected to a pH adjustment apparatus. In certain cases, the desalination system is directly fluidically connected to the pH adjustment apparatus. In some embodiments, the input stream received by the desalination system comprises at least a portion of the pH-adjusted stream produced by the pH adjustment apparatus. That is to say, in certain embodiments, the desalination system is downstream of the pH adjustment apparatus. In other embodiments, the input stream received by the pH adjustment apparatus comprises at least a portion of the concentrated brine stream and/or substantially pure water stream produced by the desalination system. That is to say, in certain embodiments, the pH adjustment apparatus can be located downstream of the desalination system.

In some embodiments, for example, a desalination system can be fluidically connected to a VOM removal apparatus. In certain cases, the desalination system is directly fluidically connected to the VOM removal apparatus. In some embodiments, the input stream received by the desalination system comprises at least a portion of the VOM-diminished stream produced by the VOM removal apparatus. That is to say, in certain embodiments, the desalination system is downstream of the VOM removal apparatus. In other embodiments, the input stream received by the VOM removal apparatus comprises at least a portion of the concentrated brine stream and/or substantially pure water stream produced by the desalination system. That is to say, in certain embodiments, the VOM removal apparatus can be located downstream of the desalination system.

Mixing Apparatus

In some embodiments, the water treatment system comprises an optional mixing apparatus fluidically connected to the clean brine system and the desalination system. A mixing apparatus generally refers to a device configured to mix a first fluid with a second fluid to form a fluid mixture (e.g., a substantially homogeneous fluid mixture). In some embodiments, the mixing apparatus is configured to receive at least a portion of a clean brine stream from a clean brine system described herein. In some embodiments, the mixing apparatus is also configured to receive at least a portion of a substantially pure water stream from a desalination system described herein. According to some embodiments, the mixing apparatus is configured to mix at least a portion of the clean brine stream and at least a portion of the substantially pure water stream to form a mixed water stream.

In some embodiments, the mixed water stream has a mixing ratio by mass of the substantially pure water stream to the clean brine stream of at least about 1:1, at least about 2:1, at least about 3:1, at least about 4:1, at least about 5:1, at least about 10:1, at least about 20:1, at least about 50:1, at least about 100:1, at least about 150:1, or at least about 200:1. In some embodiments, the mixed water stream has a mixing ratio by mass of the substantially pure water stream to the clean brine stream of about 1:1 or less, about 1:2 or less, about 1:3 or less, about 1:4 or less, about 1:5 or less, about 1:10 or less, about 1:20 or less, about 1:50 or less, about 1:100 or less, about 1:150 or less, or about 1:200 or less. In certain cases, the mixed water stream has a mixing ratio by mass of the substantially pure water stream to the clean brine stream in the range of about 1:200 to about 200:1, about 1:150 to about 150:1, about 1:100 to about 100:1, about 1:50 to about 50:1, about 1:20 to about 20:1, about 1:10 to about 10:1, about 1:5 to about 5:1, or about 1:2 to about 2:1. In some embodiments, the mixed water stream has a mixing ratio by mass of the substantially pure water stream to the clean brine stream in the range of about 1:1 to about 200:1, about 1:1 to about 150:1, about 1:1 to about 100:1, about 1:1 to about 50:1, about 1:1 to about 20:1, about 1:1 to about 10:1, about 1:1 to about 5:1, about 1:1 to about 4:1, about 1:1 to about 3:1, about 1:1 to about 2:1, about 2:1 to about 5:1, about 2:1 to about 4:1, about 2:1 to about 3:1, about 3:1 to about 10:1, about 3:1 to about 5:1, or about 5:1 to about 10:1. The mixing ratio by mass may be calculated by dividing the mass of the amount of substantially pure water by the mass of the amount of clean brine in a mixed water stream.

In some embodiments, the concentration of at least one salt (e.g., NaCl) in the mixed water stream is at least about 1,000 mg/L, at least about 2,000 mg/L, at least about 5,000 mg/L, at least about 10,000 mg/L, at least about 20,000 mg/L, at least about 50,000 mg/L, at least about 100,000 mg/L, or at least about 150,000 mg/L. In some embodiments, the concentration of at least one salt (e.g., NaCl) in the mixed water stream is about 150,000 mg/L or less, about 100,000 mg/L or less, about 50,000 mg/L or less, about 20,000 mg/L or less, about 10,000 mg/L or less, about 5,000 mg/L or less, about 2,000 mg/L or less, or about 1,000 mg/L or less. In certain cases, the concentration of at least one salt in the mixed water stream is in the range of about 1,000 mg/L to about 5,000 mg/L, about 1,000 mg/L to about 10,000 mg/L, about 1,000 mg/L to about 15,000 mg/L, about 1,000 mg/L to about 20,000 mg/L, about 1,000 mg/L to about 50,000 mg/L, about 1,000 mg/L to about 100,000 mg/L, about 1,000 mg/L to about 150,000 mg/L, about 5,000 mg/L to about 10,000 mg/L, about 5,000 mg/L to about 15,000 mg/L, about 5,000 mg/L to about 20,000 mg/L, about 5,000 mg/L to about 50,000 mg/L, about 5,000 mg/L to about 100,000 mg/L, about 5,000 mg/L to about 150,000 mg/L, about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 20,000 mg/L to about 50,000 mg/L, about 20,000 mg/L to about 100,000 mg/L, about 20,000 mg/L to about 150,000 mg/L, about 50,000 mg/L to about 100,000 mg/L, or about 50,000 mg/L to about 150,000 mg/L.

In some embodiments, the total salt concentration in the mixed water stream is at least about 10,000 mg/L, at least about 20,000 mg/L, at least about 50,000 mg/L, at least about 100,000 mg/L, at least about 110,000 mg/L, at least about 120,000 mg/L, at least about 150,000 mg/L, or at least about 200,000 mg/L. In some embodiments, the total salt concentration in the mixed water stream is about 200,000 mg/L or less, about 150,000 mg/L or less, about 120,000 mg/L or less, about 100,000 mg/L or less, about 100,000 mg/L or less, about 50,000 mg/L or less, about 20,000 mg/L or less, or about 10,000 mg/L or less. In certain cases, the total salt concentration in the mixed water stream is in the range of about 10,000 mg/L to about 20,000 mg/L, about 10,000 mg/L to about 50,000 mg/L, about 10,000 mg/L to about 100,000 mg/L, about 10,000 mg/L to about 110,000 mg/L, about 10,000 mg/L to about 120,000 mg/L, about 10,000 mg/L to about 150,000 mg/L, about 10,000 to about 200,000 mg/L, about 20,000 mg/L to about 50,000 mg/L, about 20,000 mg/L to about 100,000 mg/L, about 20,000 mg/L to about 150,000 mg/L, about 20,000 to about 200,000 mg/L, about 50,000 mg/L to about 100,000 mg/L, about 50,000 mg/L to about 150,000 mg/L, or about 50,000 mg/L to about 200,000 mg/L.

In some embodiments, the mixed water stream comprises at least one salt (e.g., NaCl) in an amount of at least about 0.1 wt %, at least about 0.5 wt %, at least about 1 wt %, at least about 2 wt %, at least about 5 wt %, at least about 10 wt %, or at least about 15 wt % (and/or, in certain embodiments, up to the solubility limit of the salt in the mixed water stream). In some embodiments, the mixed water stream comprises at least one salt in an amount in the range of about 0.1 wt % to about 1 wt %, about 0.1 wt % to about 2 wt %, about 0.1 wt % to about 5 wt %, about 0.1 wt % to about 10 wt %, about 0.1 wt % to about 15 wt %, about 1 wt % to about 5 wt %, about 1 wt % to about 10 wt %, about 1 wt % to about 15 wt %, about 2 wt % to about 5 wt %, about 2 wt % to about 10 wt %, about 2 wt % to about 15 wt %, about 5 wt % to about 10 wt %, about 5 wt % to about 15 wt %, or about 10 wt % to about 15 wt %.

In some embodiments, the mixed water stream has a total salt concentration of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt %. In some embodiments, the mixed water stream has a total salt concentration in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

The mixing apparatus may be any type of mixing apparatus known in the art. Non-limiting examples of suitable types of mixing apparatuses include static inline mixers, stirred tanks (e.g., tanks comprising an agitator), eductors, venturi mixers, plate-type mixers, and/or wafer inline static mixers.

Water Treatment System

FIG. 7 is a schematic diagram of an exemplary water treatment system 700, according to certain embodiments. The water treatment system shown in FIG. 7 includes a number of components that can be used to treat an aqueous stream containing at least one dissolved salt. According to FIG. 7, water treatment system 700 comprises optional separation apparatus 702 configured to receive aqueous input stream 704 comprising a suspended and/or emulsified immiscible phase. Optional separation apparatus 702 can be configured to remove at least a portion of the suspended and/or emulsified immiscible phase to produce immiscible-phase-diminished stream 706, which contains less of the suspended and/or emulsified immiscible phase than stream 704. Separation apparatus 702 can also be configured to produce stream 705, which is enriched in the suspended and/or emulsified water-immiscible phase relative to stream 704.

In FIG. 7, system 700 further comprises optional suspended solids removal apparatus 708, which can be configured to remove at least a portion of suspended solids from input stream 706 to produce a suspended-solids-diminished stream 710. Suspended solids removal apparatus 708 can be configured to produce stream 709, which is enriched in the suspended solids relative to stream 706.

According to FIG. 7, system 700 further comprises optional ion-removal apparatus 712. Ion-removal apparatus 712 can be configured, according to certain embodiments, to remove at least a portion of at least one scale-forming ion from stream 710 received by ion-removal apparatus 712. Ion-removal apparatus 712 can be configured to produce ion-diminished stream 714, which contains less of the scale-forming ion relative to input stream 710 received by ion-removal apparatus 712. Ion-removal apparatus 712 can also be configured to produce stream 713, which is enriched in at least one scale-forming ion relative to stream 710.

In FIG. 7, system 700 includes optional pH adjustment apparatus 716, which can be configured to receive aqueous input stream 714, which can comprise scale-forming ions. pH adjustment apparatus 716 can be configured to increase or decrease the pH of aqueous input stream 714 to produce a pH-adjusted stream 718. In certain cases, the pH of input stream 714 may be reduced to inhibit the precipitation of scale-forming ions. In some cases, the pH of input stream 714 can be increased or decreased, for example, by adding chemicals via stream 717, according to some embodiments. For example, an acidic composition can be added to the pH adjustment apparatus to reduce the pH of stream 714, in certain embodiments.

According to FIG. 7, system 700 further comprises optional VOM removal apparatus 720. VOM removal apparatus 720 can be configured to remove at least a portion of VOM from input stream 718 received by VOM removal apparatus 720 to produce a VOM-diminished stream 722, which contains less of the VOM relative to input stream 718 received by VOM removal apparatus 720. VOM removal apparatus 720 can be configured to produce stream 721, which is enriched in VOM relative to stream 718.

In FIG. 7, water treatment system 700 further comprises an optional desalination system 724, which is configured to remove water from aqueous stream 722 received by desalination system 724 to produce a concentrated brine stream 726 enriched in a dissolved salt relative to aqueous stream 722 received by desalination system 724.

Water treatment system 700 may also comprise optional precipitation apparatus 734. For example, in FIG. 7, precipitation apparatus 734 is fluidically connected to desalination system 724 and configured to receive concentrated brine stream 726 from desalination system 724. Precipitation apparatus 734 can be configured such that at least a portion of the dissolved salt within concentrated brine stream 726 precipitates within precipitation apparatus 734 to produce water-containing product stream 736, which contains less dissolved salt than concentrated brine stream 726, and solid salt stream 738.

According to FIG. 7, water treatment system 700 can comprise an optional disinfection unit 730. Disinfection unit 730 can be configured to receive at least a portion of water-containing stream 725 from desalination system 724. In some embodiments, disinfection unit 730 can be configured to receive disinfectant stream 731, which can contain, for example, chlorine. Disinfection unit 730 can be configured to produce disinfected water-containing stream 732.

FIG. 8 is a schematic illustration of an exemplary water treatment system 800, according to certain embodiments. In FIG. 8, aqueous input stream 804 is transported to optional tank 806. In some embodiments, chemicals are added to optional tank 806 via stream 808. The chemicals can be selected to aid in a downstream apparatus, according to certain embodiments. For example, in some embodiments, a skimmer (which can be part of a dissolved gas flotation apparatus, for example) can be positioned downstream of tank 806, and the chemicals added to tank 806 are selected to aid in operation of the skimmer (e.g., in a dissolved gas flotation process). Aqueous stream 810 can be transported out of tank 806. Aqueous stream 810 can be transported to skimmer 814. In some embodiments, skimmer 814 can be configured to remove at least a portion of a suspended and/or emulsified water-immiscible phase within stream 810 to produce an immiscible-phase-diminished stream 822 (and, in some embodiments, immiscible-phase-diminished stream 818). The water-immiscible phase from skimmer 814 can be transported, for example, to a recovery tank 826 via stream 820. In some embodiments, skimmer 814 is part of a dissolved gas flotation apparatus. In some such embodiments, compressed gas (e.g., air) can be added, via stream 812, to a tank containing the treated water, which can aid in the transport of immiscible material to the top of the tank. Gas can subsequently be transported out of the tank via stream 816.

In some embodiments, ion-removal apparatus 828 can be configured to receive at least a portion of immiscible-phase-diminished stream 822. In some embodiments, ion-removal apparatus 828 is configured to remove at least a portion of scale-forming ions within stream 822 to produce an ion-diminished stream 832. In some such embodiments, ion-removal apparatus 828 produces ion-diminished stream 832 using a chemical reagent. For example, in FIG. 8, chemical reagent can be transported to ion-removal apparatus 828 via stream 830. The chemical reagent can be, for example, soda ash, caustic soda, and the like.

In certain embodiments, a portion of the immiscible-phase-diminished stream produced by skimmer 814 can bypass ion-removal apparatus 828. For example, in FIG. 8, at portion of the immiscible-phase-diminished stream from skimmer 814 bypasses ion-removal apparatus 828 via stream 818. The contents of bypass stream 818 may be merged with the contents of stream 832 downstream of ion-removal apparatus 828.

In some embodiments, a filter is configured to receive at least a portion of the immiscible-phase-diminished stream and/or at least a portion of the ion-diminished stream. For example, in FIG. 8, filter 834 is configured to received ion-diminished stream 832 and/or immiscible-phase-diminished stream 818. In certain embodiments, filter 834 is configured to remove at least a portion of suspended solids from the immiscible-phase-diminished stream portion and/or the ion-diminished stream portion received by the filter to produce a suspended-solids-diminished stream. For example, in FIG. 8, filter 834 is configured to remove at least a portion of suspended solids from stream 832 to produce suspended-solids-diminished stream 838. In addition, in FIG. 8, filter 834 is configured to produce solids-containing stream 836.

In certain embodiments, a pH adjustment step can be included in the process. For example, in FIG. 8, optional tank 840 can be configured to receive suspended-solids-diminished stream 838 and to output pH-adjusted (e.g., pH-reduced) stream 844. Tank 840 can be configured, in some embodiments, to receive an acid and/or a base via stream 842. In some such embodiments, an acid and/or base may be added to tank 840 until the pH of the contents of tank 840 reaches a desired level. According to certain embodiments, the contents of tank 840 may be output via stream 844, once the pH has reached a desired level. In certain embodiments, tank 840 is a reactor, such as a continuous flow stirred tank reactor. In some such embodiments, acid and/or base can be constantly fed at a rate such that the reactor effluent reaches a desired pH level.

In some embodiments, optional filter 846 can be included in the system. Filter 846 can be used to remove one or more solid materials from pH-adjusted stream 844 to produce filtered stream 848.

According to certain embodiments, a carbon bed is configured to receive at least a portion of the filtered stream. For example, in FIG. 8, carbon bed 850 is configured to receive filtered stream 848 produced by filter 846. Carbon bed 850 can be configured to remove at least a portion of VOM from the filtered stream portion received by the carbon bed to produce a VOM-diminished stream. For example, in FIG. 8, carbon bed 850 is configured to produce VOM-diminished stream 852.

In some embodiments, a desalination system is configured to receive at least a portion of the VOM-diminished stream and to remove at least a portion of water from the VOM-diminished stream received by the desalination system. For example, in FIG. 8 desalination system 854 is configured to receive VOM-diminished stream 852. In addition, desalination system 854 is configured to produce concentrated brine stream 856, which is enriched in at least one dissolved salt (e.g., dissolved monovalent salt) relative to VOM-diminished stream 852. In some embodiments, the desalination system can also produce a water-containing stream that contains a lower concentration of the dissolved salt (e.g., dissolved monovalent salt) than the stream fed to the desalination system. For example, in FIG. 8, desalination system 854 can be configured to produce water-containing stream 858, which contains less of a dissolved salt (e.g., less of a dissolved monovalent salt) than stream 852 fed to desalination system 854.

In certain embodiments, the order of the desalination system and the carbon bed can be switched, relative to the order shown in FIG. 8. For example, in some embodiments, the desalination system is configured to receive at least a portion of the suspended-solids-diminished stream, and to remove at least a portion of water from the suspended-solids-diminished stream portion received by the desalination system to produce a concentrated brine stream enriched in a dissolved salt relative to the suspended-solids-diminished stream portion received by the desalination system. The desalination system can also be configured to produce a water-containing stream containing less of the dissolved salt than the suspended-solids-diminished stream. In some such embodiments, the carbon bed can be configured to receive at least a portion of the water-containing stream produced by the desalination system, and to remove at least a portion of VOM from the water-containing stream portion received by the carbon bed to produce a VOM-diminished stream.

FIG. 9 is a schematic illustration of another exemplary water treatment system 900, according to certain embodiments. In FIG. 9, aqueous input stream 904 is transported to optional tank 906. In some embodiments, chemicals are added to optional tank 906 via stream 908. The chemicals can be selected to aid in a downstream apparatus, according to certain embodiments. For example, in some embodiments, a skimmer (which can be part of a dissolved gas flotation apparatus, for example) can be positioned downstream of tank 906, and the chemicals added to tank 906 are selected to aid in operation of the skimmer (e.g., in a dissolved gas flotation process). Aqueous stream 910 can be transported out of tank 906. Aqueous stream 910 can be transported to skimmer 914. In some embodiments, skimmer 914 can be configured to remove at least a portion of suspended and/or emulsified water-immiscible phase within stream 910 to produce an immiscible-phase-diminished stream 922 (and, in some embodiments, immiscible-phase-diminished stream 918). The water-immiscible phase from skimmer 914 can be transported, for example, to a recovery tank 926 via stream 920. In some embodiments, skimmer 914 is part of a dissolved gas flotation apparatus. In some such embodiments, compressed gas (e.g., air) can be added, via stream 912, to a tank containing the treated water, which can aid in the transport of immiscible material to the top of the tank. Gas can subsequently be transported out of the tank via stream 916.

In some embodiments, electrocoagulation apparatus 928 can be configured to receive at least a portion of water-immiscible phase-diminished stream 922. Electrocoagulation apparatus 928 can be configured to remove at least a portion of scale-forming ions within stream 922 to produce an ion-diminished stream 932.

In certain embodiments, a portion of water-immiscible phase-diminished stream produced by skimmer 914 can bypass electrocoagulation apparatus 928. For example, in FIG. 9, a portion of the immiscible phase-diminished product from skimmer 914 bypasses electrocoagulation apparatus 928 via stream 918. The contents of bypass stream 918 may be merged with the contents of stream 932 downstream of electrocoagulation apparatus 928.

Filter 934 can be configured to receive ion-diminished stream 932 and/or immiscible-phase-diminished stream 918. Filter 934 can be configured to remove at least a portion of suspended solids from stream 932 to produce suspended-solids-diminished stream 938. In addition, filter 934 can be configured to produce solids-containing stream 936.

In certain embodiments, a pH adjustment step can be included in the process. For example, in FIG. 9, optional tank 940 can be configured to receive suspended-solids-diminished stream 938 and to produce pH-adjusted stream 944. Optional tank 940 can be configured, in some embodiments, to receive an acid and/or a base via stream 942. In some such embodiments, an acid and/or base may be added to tank 940 until the pH of the contents of tank 940 reaches a desired level. In certain embodiments, tank 940 is a reactor, such as a continuous flow stirred tank reactor. In some such embodiments, an acid and/or base can be constantly fed at a rate such that the reactor effluent reaches a desired pH level. According to certain embodiments, the contents of tank 940 may be output via stream 944, once the pH has reached a desired level.

In some embodiments, optional filter 946 can be included in the system. Filter 946 can be used to remove one or more solid materials from pH-adjusted stream 944 to produce filtered stream 948.

Carbon bed 950 can be configured to receive filtered stream 948 produced by filter 946. Carbon bed 950 can be configured to remove at least a portion of VOM from the filtered stream portion received by the carbon bed to produce a VOM-diminished stream 952.

Desalination system 954 can be configured to receive VOM-diminished stream 952. Desalination system 954 can be configured to produce concentrated brine stream 956, which is enriched in at least one dissolved salt (e.g., dissolved monovalent salt) relative to VOM-diminished stream 952. Desalination system 954 can also be configured to produce water-containing stream 958, which contains less of a dissolved salt (e.g., dissolved monovalent salt) than stream 952 fed to desalination system 954.

In certain embodiments, the order of the desalination system and the carbon bed can be switched, relative to the order shown in FIG. 9. For example, in some embodiments, the desalination system is configured to receive at least a portion of the suspended-solids-diminished stream, and to remove at least a portion of water from the suspended-solids-diminished stream portion received by the desalination system to produce a concentrated brine stream enriched in a dissolved salt (e.g., dissolved monovalent salt) relative to the suspended-solids-diminished stream portion received by the desalination system. The desalination system can also be configured to produce a water-containing stream containing less of the dissolved salt (e.g., dissolved monovalent salt) than the suspended-solids-diminished stream. In some such embodiments, the carbon bed can be configured to receive at least a portion of the water-containing stream produced by the desalination system, and to remove at least a portion of VOM from the water-containing stream portion received by the carbon bed to produce a VOM-diminished stream.

FIG. 10 is a schematic illustration of another exemplary water treatment system 1000, according to certain embodiments. In FIG. 10, aqueous input stream 1004 is transported to optional tank 1006. In some embodiments, chemicals are added to optional tank 1006 via stream 1008. The chemicals can be selected to aid in a downstream apparatus, according to certain embodiments. For example, in some embodiments, a skimmer (which can be part of a dissolved gas flotation apparatus, for example) can be positioned downstream of tank 1006, and the chemicals added to tank 1006 are selected to aid in operation of the skimmer (e.g., in a dissolved gas flotation process). Aqueous stream 1010 can be transported out of tank 1006. Aqueous stream 1010 can be transported to skimmer 1014. In some embodiments, skimmer 1014 can be configured to remove at least a portion of suspended and/or emulsified water-immiscible phase within stream 1010 to produce an immiscible-phase-diminished stream 1022 (and, in some embodiments, immiscible-phase-diminished stream 1018). The water-immiscible phase from skimmer 1014 can be transported, for example, to a recovery tank 1026 via stream 1020. In some embodiments, skimmer 1014 is part of a dissolved gas flotation apparatus. In some such embodiments, compressed gas (e.g., air) can be added, via stream 1012, to a tank containing the treated water, which can aid in the transport of immiscible material to the top of the tank. Gas can subsequently be transported out of the tank via stream 1016.

In certain embodiments, a portion of water-immiscible phase-diminished stream produced by skimmer 1014 can be transported to filter 1019, for example, via stream 1018. Filter 1019 can be configured to remove at least a portion of suspended solids from immiscible-phase-diminished stream portion 1018 received by filter 1019 to produce a suspended-solids-diminished stream 1024. Filter 1019 can also be configured to produce a solids-containing stream 1036.

In some embodiments, a portion of the water-immiscible phase-diminished stream produced by skimmer 1014 can bypass filter 1019. For example, in FIG. 10, a portion 1022 of the immiscible phase-diminished product from skimmer 1014 bypasses filter 1019 via stream 1022. The contents of bypass stream 1022 may be merged with the contents of stream 1024 downstream of filter 1019 and skimmer 1014 to produce stream 1023.

In certain embodiments, an optional pH adjustment step can be included in the process. For example, in FIG. 10, optional tank 1040 can be configured to receive suspended-solids-diminished stream 1023 and to produce pH-adjusted stream 1044. Optional tank 1040 can be configured, in some embodiments, to receive an acid and/or a base via stream 1042. In some such embodiments, an acid and/or base may be added to tank 1040 until the pH of the contents of tank 1040 reaches a desired level. In certain embodiments, tank 1040 is a reactor, such as a continuous flow stirred tank reactor. In some such embodiments, an acid and/or base can be constantly fed at a rate such that the reactor effluent reaches a desired pH level. According to certain embodiments, the contents of tank 1040 may be output via stream 1044, once the pH has reached a desired level.

In some embodiments, media filter 1034 can be configured to receive pH-adjusted stream 1044 (and/or suspended-solids-diminished stream 1023). Media filter 1034 can be configured to remove at least a portion of suspended solids from stream 1044 to produce stream 1038.

In some embodiments, a carbon bed can be included in the system. For example, referring to FIG. 10, carbon bed 1050 can be configured to receive stream 1038, which contains at least a portion of the stream produced by filter 1034. Carbon bed 1050 can be configured to remove at least a portion of VOM from the stream received by the carbon bed to produce a VOM-diminished stream 1052.

In some embodiments, a resin bed can be included in the system. For example, in FIG. 10, resin bed 1060 can be configured to receive at least a portion of VOM-diminished stream 1052. Resin bed 1060 can be configured to remove at least a portion of at least one scale-forming ion from VOM-diminished stream portion 1052 received by resin bed 1060 to produce ion-diminished stream 1062 containing less of the scale-forming ion relative to input stream 1052 received by resin bed 1060.

In some embodiments, desalination system 1054 can be configured to receive ion-diminished stream 1062. Desalination system 1054 can be configured to produce concentrated brine stream 1056, which is enriched in at least one dissolved salt (e.g., monovalent salt) relative to ion-diminished stream 1062. Desalination system 1054 can also be configured to produce water-containing stream 1058, which contains less of a dissolved salt (e.g., a dissolved monovalent salt) than stream 1062 fed to desalination system 1054.

In certain embodiments, the order of the desalination system and the carbon bed can be switched, relative to the order shown in FIG. 10. For example, in some embodiments, the desalination system is configured to receive at least a portion of the suspended-solids-diminished stream, and to remove at least a portion of water from the suspended-solids-diminished stream portion received by the desalination system to produce a concentrated brine stream enriched in a dissolved salt relative to the suspended-solids-diminished stream portion received by the desalination system. The desalination system can also be configured to produce a water-containing stream containing less of the dissolved salt than the suspended-solids-diminished stream. In some such embodiments, the carbon bed can be configured to receive at least a portion of the water-containing stream produced by the desalination system, and to remove at least a portion of VOM from the water-containing stream portion received by the carbon bed to produce a VOM-diminished stream.

Certain of the systems described herein can be configured to desalinate saline solutions entering at relatively high flow rates, and accordingly, can be configured to produce relative pure water streams at relatively high flow rates. For example, in some embodiments, the systems and methods described herein may be operated to receive an aqueous saline feed stream (e.g., streams 104 in FIG. 1, 804 in FIG. 8, 904 in FIG. 9, and/or 1004 in FIG. 10) at a flow rate of at least about 1 gallon/minute, at least about 10 gallons/minute, at least about 100 gallons/minute, or at least about 1000 gallons/minute (and/or, in certain embodiments, up to about 10,000 gallons/minute, or more).

Example 1

In this example, a water treatment system comprising a clean brine system, a desalination system, and a mixing apparatus is described.

As shown in FIG. 1, water treatment system 100 comprises clean brine system 102, humidification-dehumidification desalination system 110, and mixing apparatus 116. In operation, saline water input stream 104 (e.g., a produced water stream) having a dissolved NaCl concentration of 140,000 ppm enters clean brine system 102 at a flow rate of 12,000 barrels/day. In clean brine system 102, a first clean brine stream 106 having a dissolved NaCl concentration of 140,000 ppm is produced at a rate of 4,000 barrels/day. A second clean brine stream 108, which has a lower concentration of at least one scale-forming ion than first clean brine stream 106, is produced at a rate of about 8,000 barrels/day and is fed into desalination system 110. In desalination system 110, at least a portion of water is removed from clean brine stream 108 to produce a substantially pure water stream 112 and a concentrated brine stream 114. Substantially pure water stream 112, which has a dissolved NaCl concentration of less than about 500 ppm, is produced at a rate of about 4,000 barrels/day. Concentrated brine stream 114, which has a dissolved NaCl concentration of 260,000 ppm, is produced at a rate of about 4,000 barrels/day. Approximately 1,000 barrels/day of first clean brine stream 106 are mixed with about 3,000 barrels/day of substantially pure water stream 112 in mixing apparatus 116 to produce about 4,000 barrels/day of mixed water product 118 having a dissolved NaCl concentration of about 35,000 ppm.

Example 2

In this example, a water treatment system as in Example 1 was used to treat produced water from Midland, Tex. and obtain clean brine for direct use, clean brine for desalination, substantially pure water, and concentrated brine. Table 1 lists the concentrations of various constituents of the different water streams. Concentrations for a mixed water product comprising 3:1 pure water to clean brine for direct use were estimated based on the concentrations obtained for substantially pure water and clean brine for direct use. In Table 1, ND stands for "not detected." To calculate hardness, the molar concentration of various divalent ions was measured, then mg/L concentration was calculated as if each of those ions were a calcium ion.

Figure 11:
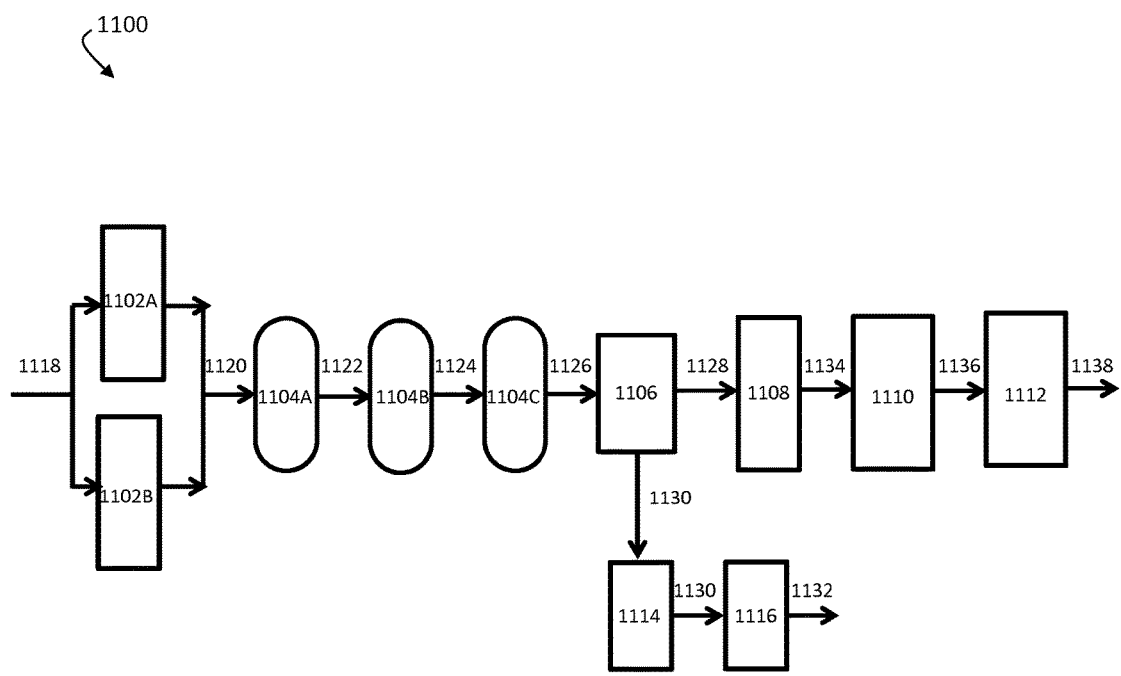
FIG. 11 shows a schematic flow diagram of an exemplary water treatment system, according to some embodiments.

FIG. 11 shows a schematic diagram of the clean brine system used. As shown in FIG. 11, clean brine system 1100 comprised buffer tanks 1102A and 1102B, reaction tanks 1104A, 1104B, and 1104C, clarifier 1106, polishing filter 1108, resin beds 1110, pH adjustment tank 1112, holding tank 1114, and filter 1116. In operation, aqueous feed stream 1118 (e.g., produced water) was pumped to buffer tanks 1102A and 1102B, each of which had a height of about 15 feet and a volume of about 3,000 gallons. The presence of buffer tanks 1102A and 1102B assisted in mitigating any unsteadiness in the flow rate of aqueous feed stream 1118. In buffer tanks 1102A and 1102B, a small amount of floating oil was removed by a belt oil skimmer. The residence time of aqueous feed stream 1118 in buffer tanks 1102A and 1102B was about 10 minutes. From buffer tanks 1102A and 1102B, a stream 1120 was directed to first reaction tank 1104A. In first reaction tank 1104A, soda ash and a coagulant comprising barium chloride were added to stream 1120 to produce stream 1122. The coagulant comprising barium chloride was added to precipitate sulfate ions present in the stream as barium sulfate. Stream 1122 was then directed to flow to second reaction tank 1104B. In second reaction tank 1104B, caustic soda was added to stream 1122 to produce stream 1124. Stream 1124 was then directed to flow to third reaction tank 1104C, where a polymer flocculent was added to stream 1124 to produce stream 1126. Stream 1126 was directed to flow to clarifier 1106. Clarifier 1106 was a lamella plate clarifier configured to remove solids by settling. An amount of oil was also removed (e.g., through entrapment of oil droplets by solid precipitates, through adhesion of oil droplets with solid precipitates as a result of collisions). As a result, clarifier 1106 produced a solid-diminished stream 1128 and a solid-containing stream 1130.

Solid-diminished stream 1128 was directed to flow to polishing filter 1108 to further remove solids from stream 1128 and produce filtered stream 1134. In this embodiment, the polishing filter was a multi-media filter. When too many particles collected in filter 1108, flow through filter 1108 slowed, and filter 1108 was automatically cleaned by backwashing. In the backwashing process, clean brine and hydrochloric acid were flushed through filter 1108 in opposite directions, fluidizing and suspending the media and freeing collected particles. Backwash was reintroduced into the aqueous stream upstream of filter 1108.

Filtered stream 1134 was then directed to flow to ion-exchange resin beds 1110 to form stream 1136. Stream 1136 was then flowed to pH adjustment tank 1112. In pH adjustment tank 1112, hydrochloric acid was added to stream 1136 to produce pH-adjusted stream 1138, which had a pH around 7. During the precipitation step in reaction tanks 1104A-C, the pH was raised to 10 or 11 to decrease the solubility of calcium carbonate and magnesium hydroxide.

In one case, at least a portion of pH-adjusted stream 1138 was discharged from system 1100 as a clean brine stream for reuse. In another case, at least a portion of pH-adjusted stream 1138 was subsequently flowed to a humidification-dehumidification desalination system to produce a substantially pure water stream and a concentrated brine stream. Significantly less (or substantially no) soda ash was added to the produced water to produce the clean brine stream for reuse compared to the amount of soda ash added to produce the clean brine stream for desalination. The concentrations of various constituents in the clean brine for reuse, clean brine for desalination, substantially pure water, and concentrated brine are shown in Table 1.

Solid-containing stream 1130 produced by clarifier 1106 was initially directed to flow from clarifier 1106 to holding tank 1114, and then from holding tank 1114 to filter 1116. Filter 1116 was a rotary vacuum drum filter comprising a round drum covered in a filter cloth. Diatomaceous earth was applied to the filter cloth as a precoat to aid filtration. The drum, covered in diatomaceous earth, was partially submerged in solid-containing stream 1130 and rotated slowly. A vacuum was applied to the interior of the drum, causing liquid to be drawn through the drum and solid material to form a cake around the outside of the drum. What the cake was sufficiently large, it was removed by scraping with a stationary blade. This process resulted in substantially solid material 1132.

TABLE 1

| Constituent | Produced Water | Clean Brine for Reuse | Clean Brine for Desalination | Pure Water | Concentrated Brine | Mixed Water |
|---|---|---|---|---|---|---|
| Barium | 3.78 mg/L | 16.1 mg/L | 6.55 mg/L | 0.017 mg/L | 1.51 mg/L | 4.04 mg/L |
| Bromide | 1390 mg/L | 1360 mg/L | 1350 mg/L | 2.78 mg/L | 3960 mg/L | 342 mg/L |
| Calcium | 2350 mg/L | 1720 mg/L | 121 mg/L | 1.85 mg/L | 345 mg/L | 431 mg/L |
| Chloride | 70100 mg/L | 76400 mg/L | 65800 mg/L | 130 mg/L | 159000 mg/L | 19200 mg/L |
| Sulfate | 282 mg/L | 222 mg/L | 255 mg/L | ND | 710 mg/L | 55.5 mg/L |
| Magnesium | 375 mg/L | 359 mg/L | ND | ND | 61.6 mg/L | 89.8 mg/L |
| Oil & Grease | 22.5 mg/L | ND | ND | ND | ND | ND |
| Sodium | 41700 mg/L | 43100 mg/L | 46000 mg/L | 89.3 mg/L | 96400 mg/L | 10800 mg/L |
| Strontium | 712 mg/L | 586 mg/L | 101 mg/L | 0.379 mg/L | 277 mg/L | 147 mg/L |

TABLE 1-continued

| Constituent | Produced Water | Clean Brine for Reuse | Clean Brine for Desalination | Pure Water | Concentrated Brine | Mixed Water |
|---|---|---|---|---|---|---|
| Benzene | 1960 µg/L | 1560 µg/L | 88.4 µg/L | ND | ND | 390 µg/L |
| Toluene | 1230 µg/L | 929 µg/L | 50.8 µg/L | ND | ND | 232 µg/L |
| pH | 6.55 | 7.15 | 7.75 | 8.18 | 5.55 | 8.03 |
| Hardness expressed as mg/L $Ca^{2+}$ | 7420 mg/L | 5780 mg/L | 303 mg/L | 4.61 mg/L | 1120 mg/L | 1450 mg/L |
| Total Dissolved Solids | 125000 mg/L | 121000 mg/L | 113000 mg/L | 234 mg/L | 320000 mg/L | 30400 mg/L |
| Total Suspended Solids | 535 mg/L | 410 mg/L | 246 mg/L | ND | 636 mg/L | 102.5 mg/L |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In cases where the present specification and a document incorporated by reference, attached as an appendix, and/or referred to herein include conflicting disclosure, and/or inconsistent use of terminology, and/or the incorporated/appended/referenced documents use or define terms differently than they are used or defined in the present specification, the present specification shall control.

What is claimed is:

1. A method for treating water, comprising:
supplying a first portion of a saline water input stream having a first concentration of a scale-forming ion to an ion-removal apparatus;
removing, within the ion-removal apparatus in a first ion-removal step, at least a portion of the scale-forming ion from the first portion of the saline water input stream by adding at least one ion-removal composition to the ion-removal apparatus to induce precipitation of the portion of the scale-forming ion within the first portion of the saline water input stream and produce a first ion-diminished stream having a second concentration of the scale-forming ion, wherein the second concentration is lower than the first concentration;
collecting a product stream comprising at least a portion of the first ion-diminished stream;
after removing, within the ion-removal apparatus in the first ion-removal step, at least a portion of the scale-forming ion from the first portion of the saline water input stream to produce the first ion-diminished stream, removing, within the ion-removal apparatus in a second ion-removal step, at least a portion of the scale-forming ion from a second portion of the saline water input stream by adding at least one ion-removal composition to the ion-removal apparatus to induce precipitation of the portion of the scale-forming ion within the second portion of the saline water input stream and produce a second ion-diminished stream having a third concentration of the scale-forming ion, wherein the third concentration is lower than the second concentration; and
feeding the second ion-diminished stream to a desalination system to produce a substantially pure water stream having a lower concentration of a dissolved salt than the second ion-diminished stream and a concentrated brine stream having a higher concentration of the dissolved salt than the second ion-diminished stream,
wherein the at least one ion-removal composition that is added to the ion-removal apparatus in the second ion-removal step comprises at least one chemical that:
induces precipitation of scale-forming ions in the second ion-removal step, and
was either not added to the ion-removal apparatus during the first ion-removal step or was added to the ion-removal apparatus during the first ion-removal step in an amount that is different from an amount of the chemical added during the second ion-removal step.

2. The method according to claim 1, further comprising mixing at least a portion of the first ion-diminished stream and at least a portion of the substantially pure water stream to produce a mixed water stream.

3. The method according to claim 2, wherein the mixing ratio by mass of the substantially pure water stream to the first ion-diminished stream is in the range of about 2:1 to about 4:1.

4. The method according to claim 2, wherein the product stream is a first product stream, and further comprising collecting a second product stream comprising at least a portion of the substantially pure water stream, collecting a third product stream comprising at least a portion of the concentrated brine stream, and/or collecting a fourth product stream comprising at least a portion of the mixed water stream.

5. The method according to claim 1, wherein at least about 5% of the scale-forming ion is removed from the saline water input stream within the ion-removal apparatus to produce the first ion-diminished stream.

6. The method according to claim 1, wherein the first ion-diminished stream contains the scale-forming ion in an amount of about 5000 mg/L or less.

7. The method according to claim 1, wherein the second ion-diminished stream contains the scale-forming ion in an amount of about 750 mg/L or less.

8. The method according to claim 1, further comprising removing, within a separation apparatus fluidically connected to the ion-removal apparatus, at least a portion of a suspended and/or emulsified immiscible phase from the saline water input stream, the first ion-diminished stream, and/or the second ion-diminished stream to form at least one immiscible-phase-diminished stream.

9. The method according to claim 8, wherein the separation apparatus comprises an induced air flotation (IAF) separator.

10. The method according to claim 8, further comprising removing, within a suspended solids removal apparatus fluidically connected to the ion-removal apparatus, at least a portion of suspended solids from the saline water input stream, the first ion-diminished stream, the second ion-diminished stream, and/or the at least one immiscible-phase-diminished stream to form at least one suspended-solids-diminished stream.

11. The method according to claim 10, further comprising increasing or decreasing the pH of the first ion-diminished stream, the second ion-diminished stream, the at least one immiscible-phase-diminished stream, and/or the at least one suspended-solids-diminished stream to form at least one pH-adjusted stream.

12. The method according to claim 11, further comprising removing, within a volatile organic material (VOM) removal apparatus fluidically connected to the ion-removal apparatus, at least a portion of VOM from the saline water input stream, the first ion-diminished stream, the second ion-diminished stream, the at least one immiscible-phase-diminished stream, the at least one suspended-solids-diminished stream, and/or the at least one pH-adjusted stream to form at least one VOM-diminished stream.

13. The method according to claim 1, further comprising precipitating at least a portion of the salt from the concentrated brine stream.

14. The method according to claim 1, wherein the desalination system is a humidification-dehumidification (HDH) desalination system.

15. The method according to claim 14, wherein the HDH system comprises a bubble column humidifier and/or a bubble column dehumidifier.

16. The method according to claim 1, wherein the dissolved salt is sodium chloride (NaCl).

17. The method of claim 1, wherein the at least one ion-removal composition that is added to the ion-removal apparatus in the second ion-removal step comprises at least one chemical that:
induces precipitation of scale-forming ions in the second ion-removal step, and
was not added to the ion-removal apparatus during the first ion-removal step.

18. The method of claim 1, wherein the at least one ion-removal composition that is added to the ion-removal apparatus in the second ion-removal step comprises at least one chemical that:

induces precipitation of scale-forming ions in the second ion-removal step, and was added to the ion-removal apparatus during the first ion-removal step in an amount that is different from an amount of the chemical added during the second ion-removal step.

19. The method of claim 1, wherein the ion-removal apparatus is part of a water treatment system, and further comprising discharging the collected product stream from the water treatment system to be used in an oil and gas extraction operation.

* * * * *